(12) United States Patent
Goodall

(10) Patent No.: US 6,825,307 B2
(45) Date of Patent: Nov. 30, 2004

(54) CATALYST AND METHODS FOR POLYMERIZING CYCLOOLEFINS

(75) Inventor: Brian L. Goodall, Baton Rouge, LA (US)

(73) Assignee: Promerus, LLC, Brecksville, OH (US)

(*) Notice: Subject to any disclaimer, the term of this patent is extended or adjusted under 35 U.S.C. 154(b) by 138 days.

(21) Appl. No.: 10/196,525

(22) Filed: Jul. 16, 2002

(65) Prior Publication Data

US 2003/0023013 A1 Jan. 30, 2003

Related U.S. Application Data

(62) Division of application No. 09/412,935, filed on Oct. 5, 1999, now Pat. No. 6,455,650.
(60) Provisional application No. 60/103,120, filed on Oct. 5, 1998, and provisional application No. 60/111,590, filed on Dec. 9, 1998.

(51) Int. Cl.[7] .................................................. C08F 32/08
(52) U.S. Cl. ...................... 526/280; 526/281; 526/283; 987/15
(58) Field of Search ................................. 526/280, 281, 526/283; 987/15

(56) References Cited

U.S. PATENT DOCUMENTS 3,494,897 A * 2/1970 Starcher et al. ............. 526/281

FOREIGN PATENT DOCUMENTS

| EP | 1 195 397 | 4/2002 |
| WO | WO 00/20472 | 4/2000 |
| WO | WO 02/10231 | 2/2002 |

OTHER PUBLICATIONS

XP002276662, Database Chemabs, Chemical Abstracts Service, JP 202 146145 filed May 22, 2002, Abstract.

* cited by examiner

Primary Examiner—William K. Cheung
(74) Attorney, Agent, or Firm—Hudak, Shunk & Farine Co.

(57) ABSTRACT

Methods for the addition polymerization of cycloolefins using a cationic Group 10 metal complex and a weakly coordinating anion of the formula:

$$[(R')_z M(L')_x (L'')_y]_b [WCA]_d$$

wherein $[(R')_z M(L')_x (L'')_y]$ is a cation complex where M represents a Group 10 transition metal; R' represents an anionic hydrocarbyl containing ligand; L' represents a Group 15 neutral electron donor ligand; L'' represents a labile neutral electron donor ligand; x is 1 or 2; and y is 0, 1, 2, or 3; and z is 0 or 1, wherein the sum of x, y, and z is 4; and [WCA] represents a weakly coordinating counteranion complex; and b and d are numbers representing the number of times the cation complex and weakly coordinating counteranion complex are taken to balance the electronic charge on the overall catalyst complex.

2 Claims, 3 Drawing Sheets

US 6,825,307 B2

CATALYST AND METHODS FOR POLYMERIZING CYCLOOLEFINS

CROSS-REFERENCE

This is a division of application Ser. No. 09/412,935, filed on Oct. 5, 1999, of John-Henry Lipian et al., for CATALYST AND METHODS FOR POLYMERIZING CYCLOOLEFINS, now U.S. Pat. No. 6,455,650 which claims benefit to U.S. Provisional Application Nos. 60/103,120 filed Oct. 5, 1998 and 60/111,590 filed Dec. 9, 1998.

TECHNICAL FIELD OF THE INVENTION

The present invention relates to methods for the addition polymerization of cycloolefins using a cationic Group 10 metal complex and a weakly coordinating counteranion.

BACKGROUND OF THE INVENTION

Polycyclic addition polymers having directly linked polycyclic repeating units without any internal backbone unsaturation are desirous from the standpoint of their inherent thermal oxidative stability and high glass transition temperature (Tg) profiles. Recent objectives in synthesis have focused on incorporating pendant functional substituents onto the polycyclic backbone, enabling this class of polymer to be utilized for a wide variety of uses. These objectives have been successfully met in part because of the advent of late transition metal catalysts and their tolerance to functional groups. An increasingly important use for such polymers has been in the manufacture of microelectronic and optical devices. An important consideration in the manufacturing of polymers for microelectronic and optical applications is polymer purity. While specific classes of transition metal catalysts are tolerant to functional groups, there is a trade off in that monomer to catalyst ratios must be high in order to overcome the poisoning effects of the functional group on the catalyst. Consequently, many polymers contain metallic residues as a result of the high catalyst loading in the reaction medium. Traces of transition metals have been shown to catalyze the thermal oxidative degradation of polymers. In addition, metal residues in the polymer also deleteriously affect the polymer properties by raising the dielectric constant of the polymer and interfere with light transmittance through the polymer matrix. In order to be useful the residual metals must be removed from the polymer to below an acceptable level.

One method of catalyzing the polymerization of cycloolefins is through the use of cationic transition metal complexes. Goodall et al. (U.S. Pat. No. 5,569,730) describe a method for polymerizing cycloolefinic monomers such as norbornene and hydrocarbyl substituted norbornene-type monomers in the presence of a chain transfer agent and a single or multicomponent catalyst system capable of providing a Group VIII transition metal cation source. The preferred single component catalyst consists of a transition metal cation complex containing an allyl ligand and a weakly coordinating counteranion. The multicomponent catalyst system employs a Group VIII transition metal ion source, an organoaluminum compound and an optional component selected from Lewis acids, strong Brønsted acids, electron donor compounds, and halogenated organic compounds. The monomer to Group VIII transition metal molar ratios are broadly disclosed to range from 1000:1 to 100,000:1, with a preferred range of 3000:1 to 10,000:1.

Goodall et al. (U.S. Pat. No. 5,705,503) and McIntosh et al. (WO 97/20871) disclose that norbornene-type monomers containing functional substituents can be successfully polymerized with single and multicomponent transition metal catalysts of the classes disclosed in the '730 patent supra. However, the molar ratio of monomer to Group VIII transition metal ranges from 20:1 to 100,000:1. In fact the highest monomer to Group VIII metal ratio actually employed is only about 5000:1 which is exemplified in Example 15 of the '503 specification.

In addition to the Group VIII single and multicomponent catalyst systems disclosed supra, Goodall et al. (WO 97/33198) disclose a single component catalyst system suitable for polymerizing functionally substituted norbornene-type monomers. The single component catalyst comprises nickel, a two electron donor ligand (preferably a π-arene ligand) and a pentafluorophenyl ligand. The disclosed molar ratio of monomer to nickel ranges from 2000:1 to 100:1.

In view of the foregoing it is apparent that a relatively high catalyst loading (based on the Group VIII metal content) is necessary for the polymerization reaction to proceed efficiently. A higher catalyst loading in the monomer at the onset of the polymerization reaction, however, means that a higher residual metal content will be present in the polymer product. Residual metals are difficult and expensive to remove. Therefore there is a need for a high activity transition metal catalyst system capable of polymerizing substituted and unsubstituted cycloolefin monomers.

SUMMARY OF THE INVENTION

Accordingly, it is a general object of the invention to provide a polymerizable polycycloolefin composition comprising a high activity catalyst system.

It is another object of the invention to provide polymers with low levels of residual Group 10 metals.

It is a further object of the invention to provide a process for polymerizing polycycloolefin monomers in contact with a high activity Group 10 catalyst.

It is another object of the invention to provide a process for polymerizing polycycloolefin monomers in solution in contact with a high activity Group 10 catalyst system.

It is still another object of the invention to provide a process for polymerizing polycycloolefin monomers in mass in contact with a high activity Group 10 catalyst system.

It is another object of the invention to provide a high activity single or multicomponent Group 10 catalyst system for the polymerization of polycycloolefin monomers.

It still is a further object of the invention to provide a two component catalyst Group 10 system comprising a procatalyst and an activator.

These and other objects of the invention are accomplished by contacting a polymerizable polycycloolefin monomer charge with a high activity catalyst system comprising a Group 10 metal cation complex and a weakly coordinating counteranion complex of the formula:

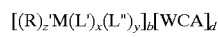

wherein M represents a Group 10 transition metal; R' represents an anionic hydrocarbyl containing ligand; L" represents a Group 15 neutral electron donor ligand; L represents a labile neutral electron donor ligand; z is 0 or 1; x is 1 or 2; y is 0, 1, 2, or 3; and the sum of x, y, and z equals 4; and b and d are numbers representing the number of times the cation complex and weakly coordinating counteranion complex (WCA), respectively, are taken to balance the electronic charge on the overall catalyst complex. The monomer charge can be neat or in solution, and is contacted with a preformed catalyst of the foregoing formula. Alternatively, the catalyst can be formed in situ by admixing the catalyst forming components in the monomer charge.

DETAILED DESCRIPTION OF THE INVENTION

Catalyst System

Figure 1:
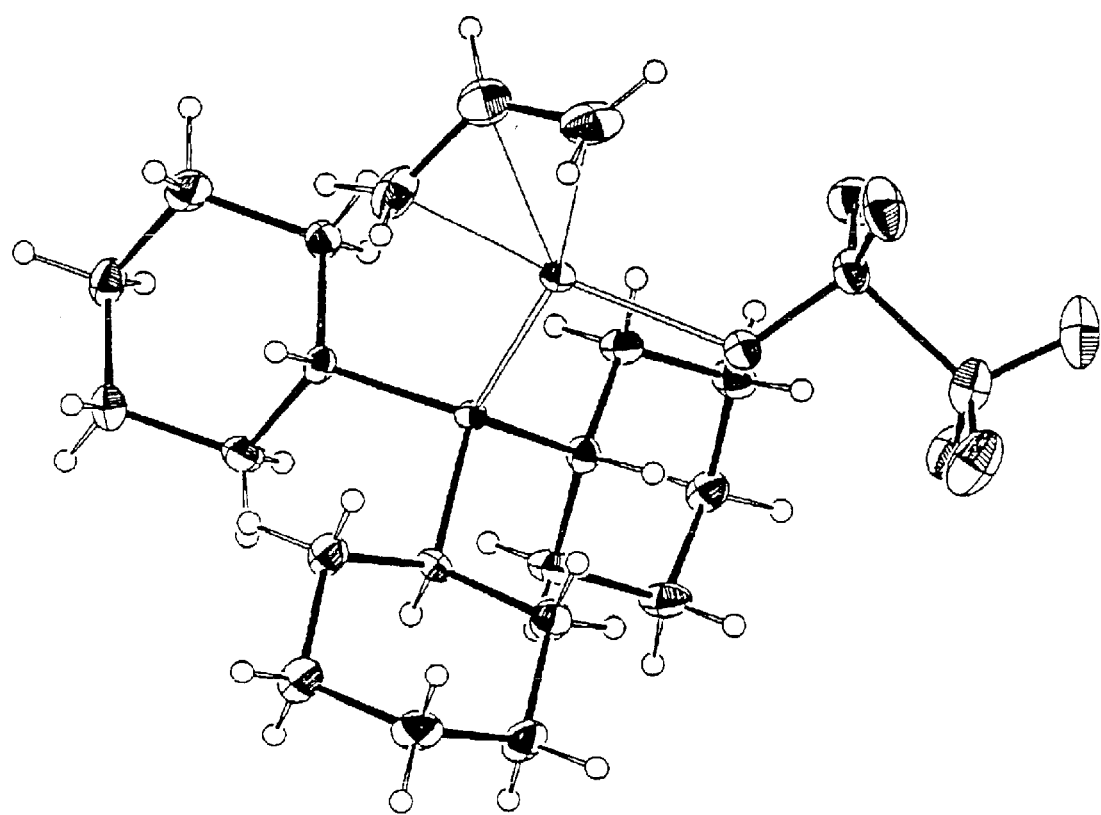
FIG. 1 represents an Oakridge Thermal Ellipsoid Plot (ORTEP) of (allyl)palladium(tricyclohexylphosphine) (triflate).

The catalyst of the invention comprises a Group 10 metal cation complex and a weakly coordinating counteranion complex represented by Formula I below:

wherein M represents a Group 10 transition metal; R' represents an anionic hydrocarbyl ligand; L' represents a Group 15 neutral electron donor ligand; L" represents a labile neutral electron donor ligand; x is 1 or 2; y is 0, 1, 2, or 3, wherein the sum of x, y, and z is 4; and b and d are numbers representing the number of times the cation complex and weakly coordinating counteranion complex (WCA), respectively, are taken to balance the electronic charge of the overall catalyst complex.

The weakly coordinating counteranion complex is an anion which is only weakly coordinated to the cation complex. It is sufficiently labile to be displaced by a neutral Lewis base, solvent or monomer. More specifically, the WCA anion functions as a stabilizing anion to the cation complex and does not transfer to the cation complex to form a neutral product. The WCA anion is relatively inert in that it is non-oxidative, non-reducing, and non-nucleophilic.

An anionic hydrocarbyl ligand is any hydrocarbyl ligand which when removed from the metal center M in its closed shell electron configuration, has a negative charge.

A neutral electron donor is any ligand which when removed from the metal center M in its closed shell electron configuration, has a neutral charge.

A labile neutral electron donor ligand is any ligand which is not as strongly bound to metal center M, is easily displaced therefrom, and when removed from the metal center in its closed shell electron configuration has a neutral charge.

In the cation complex above, M represents a Group 10 metal selected from nickel, palladium, and platinum, with palladium being the most preferred metal.

Representative anionic hydrocarbyl containing ligands defined under R' include hydrogen, linear and branched $C_1$–$C_{20}$ alkyl, $C_5$–$C_{10}$ cycloalkyl, linear and branched $C_2$–$C_{20}$ alkenyl, $C_6$–$C_{15}$ cycloalkenyl, allylic ligands or canonical forms thereof, $C_6$–$C_{30}$ aryl, $C_6$–$C_{30}$ heteroatom containing aryl, and $C_7$–$C_{30}$ aralkyl, each of the foregoing groups can be optionally substituted with hydrocarbyl and/or heteroatom substituents preferably selected from linear or branched $C_1$–$C_5$ alkyl, linear or branched $C_1$–$C_5$ haloalkyl, linear or branched $C_2$–$C_5$ alkenyl and haloalkenyl, halogen, sulfur, oxygen, nitrogen, phosphorus, and phenyl optionally substituted with linear or branched $C_1$–$C_5$ alkyl, linear or branched $C_1$–$C_5$ haloalkyl, and halogen, R' also represents anionic hydrocarbyl containing ligands of the formula R"C(O)O, R"C(O)CHC(O)R", R"C(O)S, R"C(S)O, R"C(S)S, R"O, R"$_2$N, wherein R" is the same as R' defined immediately above.

The foregoing cycloalkyl, and cycloalkenyl ligands can be monocyclic or multicyclic. The aryl ligands can be a single ring (e.g., phenyl) or a fused ring system (e.g., naphthyl). In addition, any of the cycloalkyl, cycloalkenyl and aryl groups can be taken together to form a fused ring system. Each of the monocyclic, multicyclic and aryl ring systems described above optionally can be monosubstituted or multisubstituted with a substituent independently selected from hydrogen, linear and branched $C_1$–$C_5$ alkyl, linear and branched $C_1$–$C_5$ haloalkyl, linear and branched $C_1$–$C_5$ alkoxy, halogen selected from chlorine, fluorine, iodine and bromine, $C_5$–$C_{10}$ cycloalkyl, $C_6$–$C_{15}$ cycloalkenyl, and $C_6$–$C_{30}$ aryl. An example of a multicycloalkyl moiety is a norbornyl ligand. An example of a multicycloalkenyl moiety is a norbornenyl ligand. Examples of aryl ligand groups include phenyl and naphthyl. For purposes of illustration Structure I below represents a cationic complex wherein R' is a cycloalkenyl ligand derived from 1,5-cyclooctadiene. Structures II and III illustrate cationic complexes wherein R' represents multicycloalkyl and multicycloalkenyl ligands, respectively. In Structure III the norbornenyl ligand is substituted with a alkenyl group.

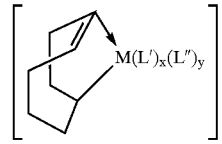

Structure I

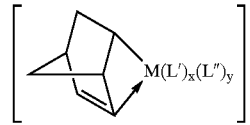

Structure II

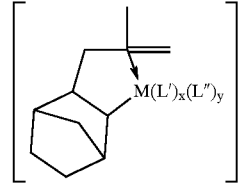

Structure III wherein M, L', L", x and y are as previously defined.

Additional examples of cationic complexes where R' represents a ring system is illustrated in Structures IV to IVc below.

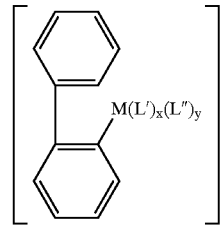

Structure IV

-continued

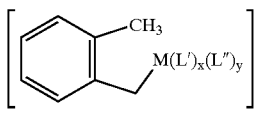
Structure IVa

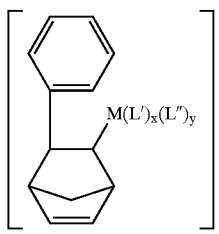
Structure IVb

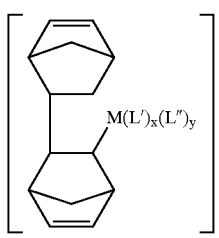
Structure IVc wherein M, L', L", x and y are as previously defined.

In another embodiment of the invention R' represents a hydrocarbyl ligand containing a terminal group that coordinates to the Group 10 metal. The terminal coordination group containing hydrocarbyl ligand are represented by the formula —$C_{d'}H_{2d'}X\rightarrow$, wherein d' represents the number of carbon atoms in the hydrocarbyl backbone and is an integer from 3 to 10, and X→ represents an alkenyl or heteroatom containing moiety that coordinates to the Group 10 metal center. The ligand together with the Group 10 metal forms a metallacycle or heteroatom containing metallacycle. Any of the hydrogen atoms on the hydrocarbyl backbone in the formulae above can be independently replaced by a substituent selected from $R^{1'}$, $R^{2'}$, and $R^{3'}$ which are defined below.

A cation complex of the terminal coordination group containing hydrocarbyl metallacycle embodiment is represented by Structure V shown below:

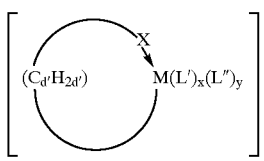
Structure V wherein M, L', L", d', x and y are as previously defined, and X represents a radical selected from the group —$CHR^{4'}$=$CHR^{4'}$, —$OR^{4'}$, —$SR^{4'}$, —$N(R^{4'})_2$, —N=$NR^{4'}$, —$P(R^{4'})_2$, —$C(O)R^{4'}$, —$C(R^{4'})$=$NR^{4'}$, —$C(O)OR^{4'}$, —OC(O)$OR^{4'}$, —OC(O)$R^{4'}$, and $R^{4'}$ represents hydrogen, halogen, linear and branched $C_1$–$C_5$ alkyl, linear and branched $C_1$–$C_5$ haloalkyl, $C_5$–$C_{10}$ cycloalkyl, linear or branched $C_2$–$C_5$ alkenyl, linear or branched $C_2$–$C_5$ haloalkenyl, substituted and unsubstituted $C_6$–$C_{18}$ aryl, and substituted and unsubstituted $C_7$–$C_{24}$ aralkyl.

The substituted terminal group containing hydrocarbyl metallacycles can be represented by structure Va, below.

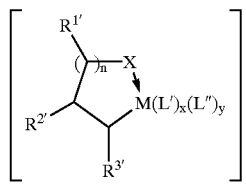
Structure Va wherein M, L', L", X, x and y are as previously defined, n represents an integer from 1 to 8 and $R^{1'}$, $R^{2'}$, and $R^{3'}$ independently represent hydrogen, linear and branched $C_1$–$C_5$ alkyl, linear and branched $C_1$–$C_5$ haloalkyl, linear or branched $C_2$–$C_5$ alkenyl, linear and branched $C_2$–$C_5$ haloalkenyl, substituted and unsubstituted $C_6$–$C_{30}$ aryl, substituted and unsubstituted $C_7$–$C_{30}$ aralkyl, and halogen. Any of $R^{1'}$, $R^{2'}$, and $R^{3'}$ can be taken together along with the carbon atoms to which they are attached can form a substituted or unsubstituted aliphatic $C_5$–$C_{20}$ monocyclic or polycyclic ring system, a substituted or unsubstituted $C_6$–$C_{10}$ aromatic ring system, a substituted and unsubstituted $C_{10}$–$C_{20}$ fused aromatic ring system, and combinations thereof. When substituted, the rings described above can contain monosubstitution or multisubstitution where the substituents are independently selected from hydrogen, linear and branched $C_1$–$C_5$ alkyl, linear and branched $C_1$–$C_5$ haloalkyl, linear and branched $C_1$–$C_5$ alkoxy, and halogen selected from chlorine, fluorine, iodine and bromine. In Structure Va above it should be noted that when n is 0, X is bonded to the carbon atom that contains the $R^{2'}$ substituent.

Representative terminal group containing hydrocarbyl metallacycle cation complexes wherein the substituents are taken together to represent aromatic and aliphatic ring systems are illustrated below under Structures Vb and Vc.

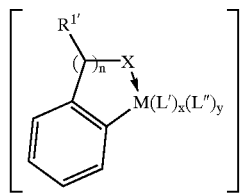
Structure Vb

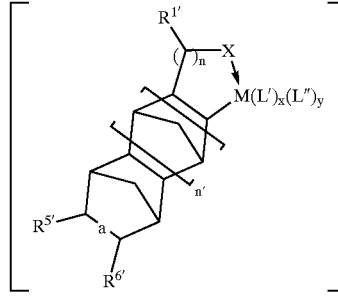
Structure Vc

Additional examples of terminal group containing hydrocarbyl metallacycle cation complexes wherein any of $R^{1'}$ to $R^{3'}$ can be taken together to form aromatic ring systems are set forth in Structures Vd to Vg below.

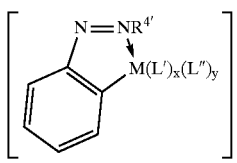

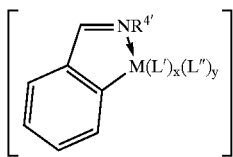

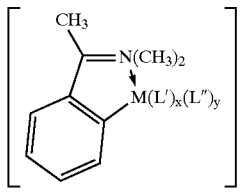

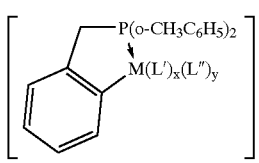

Illustrative examples of cation complexes containing polycyclic aliphatic ring systems are set forth under structures Vh, Vi, and Vj below:

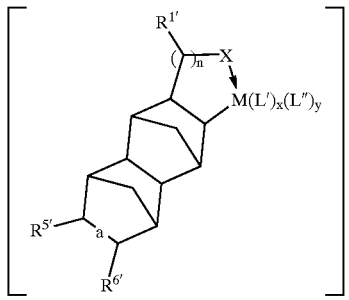

Structure Vh

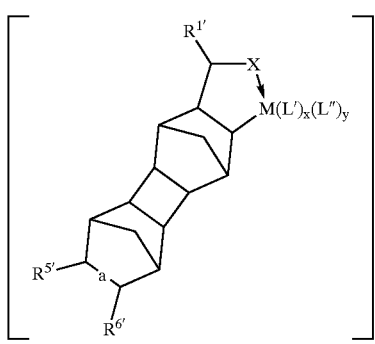

Structure Vi

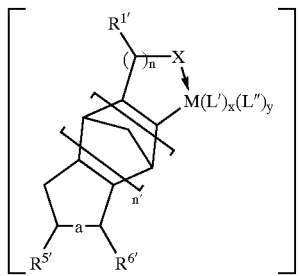

Structure Vd

Structure Ve

Structure Vf

Structure Vg

Structure Vj

In Structures V through Vj above, n' is an integer from 0 to 5; and X, M, L', L", "a", n, x, y, $R^{1'}$ and $R^{4'}$, are as previously defined, and $R^{5'}$ and $R^{6'}$ independently represent hydrogen, and linear and branched $C_1$–$C_{10}$ alkyl, $R^{5'}$ and $R^{6'}$ together with the carbon atoms to which they are attached can form a saturated and unsaturated cyclic group containing 5 to 15 carbon atoms.

Examples of heteroatom containing aryl ligands under R' are pyridinyl and quinolinyl ligands.

The allyl ligand in the cationic complex can be represented by the following structure:

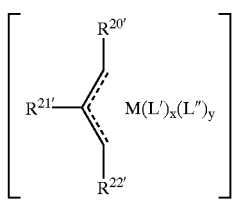

Structure VI wherein $R^{20'}$, $R^{21'}$, and $R^{22'}$ each independently represent hydrogen, halogen, linear and branched $C_1$–$C_5$ alkyl, $C_5$–$C_{10}$ cycloalkyl, linear and branched $C_1$–$C_5$ alkenyl, $C_6$–$C_{30}$ aryl, $C_7$–$C_{30}$ aralkyl, each optionally substituted with a substituent selected from linear and branched $C_1$–$C_5$ alkyl, linear and branched $C_1$–$C_5$ haloalkyl, halogen, and phenyl which can optionally be substituted with linear and branched $C_1$–$C_5$ alkyl, linear and branched $C_1$–$C_5$ haloalkyl, and halogen. Any two of $R^{20'}$, $R^{21'}$, and $R^{22'}$ can be linked together with the carbon atoms to which they are attached to form a cyclic or multicyclic ring, each optionally substituted with linear or branched $C_1$–$C_5$ alkyl, linear or branched $C_1$–$C_5$ haloalkyl, and halogen. Examples of allylic ligands suitable in the cationic complexes of the invention include but are not limited to allyl, 2-chloroallyl, crotyl, 1,1-dimethyl allyl, 2-methylallyl, 1-phenylallyl, 2-phenylallyl, and β-pinenyl.

Representative cationic complexes containing an allylic ligand are shown below.

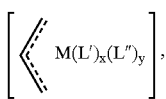

Structure VIa

Structure VIb

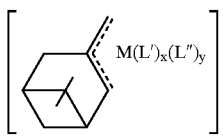

In Structures VI, VIa, and VIb M, L', L", x and y are as previously defined.

Additional examples of allyl ligands are found in R. G. Guy and B. L. Shaw, *Advances in Inorganic Chemistry and Radiochemistry*, Vol. 4, Academic Press Inc., New York, 1962; J. Birmingham, E. de Boer, M. L. H. Green, R. B. King, R. Köster, P. L. I. Nagy, G. N. Schrauzer, *Advances in Organometallic Chemistry*, Vol. 2, Academic Press Inc., New York, 1964; W. T. Dent, R. Long and A. J. Wilkinson, J. Chem. Soc., (1964) 1585; and H. C. Volger, Rec. Trav. Chim. Pay Bas, 88 (1969) 225; which are all hereby incorporated by reference.

Representative neutral electron donor ligands under L' include amines, pyridines organophosphorus containing compounds and arsines and stibines, of the formula:

$$E(R^{7'})_3$$

wherein E is arsenic or antimony, and $R^{7'}$ is independently selected from hydrogen, linear and branched $C_1$–$C_{10}$ alkyl, $C_5$–$C_{10}$ cycloalkyl, linear and branched $C_1$–$C_{10}$ alkoxy, allyl, linear and branched $C_2$–$C_{10}$ alkenyl, $C_6$–$C_{12}$ aryl, $C_6$–$C_{12}$ aryloxy, $C_6$–$C_{12}$ arylsufides (e.g., PhS), $C_7$–$C_{18}$ aralkyl, cyclic ethers and thioethers, tri(linear and branched $C_1$–$C_{10}$ alkyl)silyl, tri($C_6$–$C_{12}$ aryl)silyl, tri(linear and branched $C_1$–$C_{10}$ alkoxy)silyl, triaryloxysilyl, tri(linear and branched $C_1$–$C_{10}$ alkyl)siloxy, and tri($C_6$–$C_{12}$ aryl)siloxy, each of the foregoing substituents can be optionally substituted with linear or branched $C_1$–$C_5$ alkyl, linear or branched $C_1$–$C_5$ haloalkyl, $C_1$–$C_5$ alkoxy, halogen, and combinations thereof. Representative alkyl groups include but are not limited to methyl, ethyl, propyl, isopropyl, n-butyl, isobutyl, sec-butyl, tert-butyl, pentyl, neopentyl, hexyl, heptyl, octyl, nonyl, decyl, and dodecyl. Representative cycloalkyl groups include but are not limited to cyclopentyl and cyclohexyl. Representative alkoxy groups include but are not limited to methoxy, ethoxy, and isopropoxy. Representative cyclic ether and cyclic thioether groups include but are not limited to furyl and thienyl, respectively. Representative aryl groups include but are not limited to phenyl, o-tolyl, and naphthyl. Representative aralkyl groups include but are not limited to benzyl, and phenylethyl (i.e., —$CH_2CH_2PH$). Representative silyl groups include but are not limited to triphenylsilyl, trimethylsilyl, and trimethylsilyl. As in the general definition above each of the foregoing groups can be optionally substituted with linear or branched $C_1$–$C_5$ alkyl, linear or branched $C_1$–$C_5$ haloalkyl, and halogen.

Representative pyridines include lutidine (including 2,3-; 2,4-; 2,5-; 2,6-; 3,4-; and 3,5-substituted), picoline (including 2-,3-, or 4-substituted), 2,6-di-t-butylpyridine, and 2,4-di-t-butylpyridine.

Representative arsines include triphenylarsine, triethylarsine, and triethoxysilylarsine.

Representative stibines include triphenylstibine and trithiophenylstibine.

Suitable amine ligands can be selected from amines of the formula $N(R^{8'})_3$, wherein $R^{8'}$ independently represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_7$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative amines include but are not limited to ethylamine, triethylamine, diisopropylamine, tributylamine, N,N-dimethylaniline, N,N-dimethyl-4-t-butylaniline, N,N-dimethyl-4-t-octylaniline, and N,N-dimethyl-4-hexadecylaniline.

The organophosphorus containing ligands include phosphines, phosphites, phosphonites, phosphinites and phosphorus containing compounds of the formula:

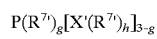

wherein X' is oxygen, nitrogen, or silicon, $R^{7'}$ is as defined above and each $R^{7'}$ substituent is independent of the other, g is 0, 1, 2, or 3, and h is 1, 2, or 3, with the proviso that when X' is a silicon atom, h is 3, when X' is an oxygen atom h is 1, and when X' is a nitrogen atom, h is 2. When g is 0 and X' is oxygen, any two or 3 of $R^{7'}$ can be taken together with the oxygen atoms to which they are attached to form a cyclic moiety. When g is 3 any two of $R^{7'}$ can be taken together with the phosphorus atom to which they are attached to represent a phosphacycle of the formula:

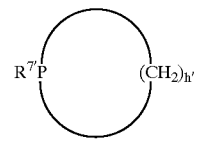

wherein $R^{7'}$ is as previously defined and h' is an integer from 4 to 11.

The organophosphorus compounds can also include bidentate phosphine ligands of the formulae:

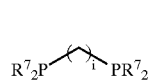 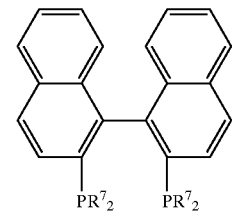

wherein $R^7$ is as previously defined and i is 0, 1, 2, or 3 are also contemplated herein.

Representative phosphine ligands include, but are not limited to trimethylphosphine, triethylphosphine, tri-n-propylphosphine, triisopropylphosphine, tri-n-butylphosphine, tri-sec-butylphosphine, tri-i-butylphosphine, tri-t-butylphosphine, tricyclopentylphosphine, triallylphosphine, tricyclohexylphosphine, triphenylphosphine, trinaphthylphosphine, tri-p-tolylphosphine, tri-o-tolylphosphine, tri-m-tolylphosphine, tribenzylphosphine, tri(p-trifluoromethylphenyl)phosphine, tris(trifluoromethyl) phosphine, tri(p-fluorophenyl)phosphine, tri(p-trifluoromethylphenyl)phosphine, allyldiphenylphosphine, benzyldiphenylphosphine, bis(2-furyl)phosphine, bis(4-methoxyphenyl)phenylphosphine, bis(4-methylphenyl) phosphine, bis(3,5-bis(trifluoromethyl)phenyl)phosphine, t-butylbis(trimethylsilyl)phosphine, t-butyldiphenylphosphine, cyclohexyldiphenylphosphine, diallylphenylphosphine, dibenzylphosphine, dibutylphenylphosphine, dibutylphosphine, di-t-butylphosphine, dicyclohexylphosphine, diethylphenylphosphine, di-i-butylphosphine, dimethylphenylphosphine, dimethyl(trimethylsilyl)phosphine, diphenylphosphine, diphenylpropylphosphine, diphenyl(p-tolyl)phosphine, diphenyl(trimethylsilyl)phosphine, diphenylvinylphosphine, divinylphenylphosphine, ethyldiphenylphosphine, (2-methoxyphenyl)methylphenylphosphine, tri-n-octylphosphine, tris(3,5-bis(trifluoromethyl)phenyl)phosphine, tris(3-chlorophenyl)phosphine, tris(4-chlorophenyl)phosphine, tris(2,6-dimethoxyphenyl)phosphine, tris(3-fluorophenyl)phosphine, tris(2-furyl)phosphine, tris(2-methoxyphenyl)phosphine, tris(3-methoxyphenyl)phosphine, tris(4-methoxyphenyl)phosphine, tris(3-methoxypropyl)phosphine, tris(2-thienyl)phosphine, tris(2,4,6-trimethylphenyl)phosphine, tris(trimethylsilyl)phosphine, isopropyldiphenylphosphine, dicyclohexylphenylphosphine, (+)-neomenthyldiphenylphosphine, tribenzylphosphine, diphenyl(2-methoxyphenyl)phosphine, diphenyl(pentafluorophenyl)phosphine, bis(pentafluorophenyl)phenylphosphine, and tris(pentafluorophenyl)phosphine.

Exemplary bidentate phosphine ligands include but are not limited to (R)-(+)-2,2'-Bis(diphenylphosphino)-1,1'-binaphthy; bis(dicyclohexylphosphino)methane; bis(dicyclohexylphosphino)ethane; bis(diphenylphosphino)methane; bis(diphenylphosphino)ethane.

The phosphine ligands can also be selected from phosphine compounds that are water soluble thereby imparting the resulting catalysts with solubility in aqueous media. Selected phosphines of this type include but are not limited to carboxylic substituted phosphines such as 4-(diphenylphosphine)benzoic acid, and 2-(diphenylphosphine)benzoic acid, sodium 2-(dicyclohexylphosphino)ethanesulfonate, 4,4'-(phenylphosphinidene)bis(benzene sulfonic acid) dipotassium salt, 3,3',3''-phosphinidynetris(benzene sulfonic acid)trisodium salt, 4-(dicyclohexylphosphino)-1,1-dimethylpiperidinium chloride, 4-(dicyclohexylphosphino)-1,1-dimethylpiperidinium iodide, quaternary amine-functionalized salts of phosphines such as 2-(dicyclohexylphosphino)-N,N,N-trimethylethanaminium chloride, 2,2'-(cyclohexylphosphinidene)bis[N,N,N-trimethylethanaminium dichloride, 2,2'-(cyclohexylphosphinidene)bis(N,N,N-trimethylethanaminium)diiodide, and 2-(dicyclohexylphosphino)-N,N,N-trimethylethanaminium iodide.

Examples of phosphite ligands include but are not limited to trimethylphosphite, diethylphenylphosphite, triethylphosphite, tris(2,4-di-t-butylphenyl)phosphite, tri-n-propylphosphite, triisopropylphosphite, tri-n-butylphosphite, tri-sec-butylphosphite, triisobutylphosphite, tri-t-butylphosphite, dicyclohexylphosphite, tricyclohexylphosphite, triphenylphosphite, tri-p-tolylphosphite, tris(p-trifluoromethylphenyl)phosphite, benzyldiethylphosphite, and tribenzylphosphite.

Examples of phosphinite ligands include but are not limited to methyl diphenylphosphinite, ethyl diphenylphosphinite, isopropyl diphenylphosphinite, and phenyl diphenylphosphinite.

Examples of phosphonite ligands include but are not limited to diphenyl phenylphosphonite, dimethyl phenylphosphonite, diethyl methylphosphonite, diisopropyl phenylphosphonite, and diethyl phenylphosphonite.

Representative labile neutral electron donor ligands (L") are reaction diluent, reaction monomers, DMF, DMSO, dienes including $C_4$ to $C_{10}$ aliphatic and $C_4$ to $C_{10}$ cycloaliphatic dienes representative dienes include butadiene, 1,6-hexadiene, and cyclooctadiene (COD), water, chlorinated alkanes, alcohols, ethers, ketones, nitriles, arenes, phosphine oxides, organic carbonates and esters.

Representative chlorinated alkanes include but are not limited to dichloromethane, 1,2-dichloroethane, and carbon tetrachloride.

Suitable alcohol ligands can be selected from alcohols of the formula $R^{9'}OH$, wherein $R^{9'}$ represents linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative alcohols include but are not limited to methanol, ethanol, n-propanol, isopropanol, butanol, hexainol, t-butanol, neopentanol, phenol, 2,6-di-i-propylphenol, 4-t-octylphenol, 5-norbornene-2-methanol, and dodecanol.

Suitable ether ligands and thioether ligands can be selected from ethers and thioethers of the formulae ($R^{10'}$—O—$R^{10'}$) and ($R^{10'}$—S—$R^{10'}$), respectively, wherein $R^{10}$ independently represents linear and branched $C_1$–$C_{10}$ alkyl radicals, linear and branched $C_1$–$C_{20}$ haloalkyl, substituted and unsubstituted $C_3$–$C_{20}$ cycloalkyl, linear and branched $C_1$–$C_{20}$ alkoxy substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine, taken together along with the oxygen or sulfur atom to which they are attached to form a cyclic ether or cyclic thioether. Representative ethers include but are not limited to dimethyl ether, dibutyl ether, methyl-t-butyl ether, di-i-propyl ether, diethyl ether, dioctyl ether, 1,4-dimethoxyethane, THF, 1,4-dioxane and tetrahydrothiophene.

Suitable ketone ligands are represented by ketones of the formula $R^{11'}C(O)R^{11'}$ wherein $R^{11'}$ independently represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative ketones include but are not limited to acetone, methyl ethyl ketone, cyclohexanone, and benzophenone.

The nitrile ligands can be represented by the formula $R^{12'}CN$, wherein $R^{12'}$ represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative nitriles include but are not limited to acetonitrile, propionitrile, benzonitrile, benzyl cyanide, and 5-norbornene-2-carbonitrile.

The arene ligands can be selected from substituted and unsubstituted $C_6$–$C_{12}$ arenes containing monosubstitution or multisubstitution, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative arenes include but are not limited to toluene, benzene, o-, m-, and p-xylenes, mesitylene, fluorobenzene, o-difluorobenzene, p-difluorobenzene, chlorobenzene, pentafluorobenzene, o-dichlorobenzene, and hexafluorobenzene.

Suitable trialkyl and triaryl phosphine oxide ligands can be represented by phosphine oxides of the formula $P(O)(R^{13'})_3$, wherein $R^{13'}$ independently represents linear and branched $C_1$–$C_{20}$ alkyl, linear and branched $C_1$–$C_{20}$ haloalkyl, substituted and unsubstituted $C_3$–$C_{20}$ cycloalkyl, linear and branched $C_1$–$C_{20}$ alkoxy, linear and branched $C_1$–$C_{20}$ haloalkoxy, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative phosphine oxides include but are not limited to triphenylphosphine oxide, tributylphosphine oxide, trioctylphosphine oxide, tributylphosphate, and tris(2-ethylhexyl)phosphate.

Representative carbonates include but are not limited to ethylene carbonate and propylene carbonate.

Representative esters include but are not limited to ethyl acetate and i-amyl acetate.

WCA Description

The weakly coordinating counteranion complex, [WCA], of Formula I can be selected from borates and aluminates, boratobenzene anions, carborane and halocarborane anions.

The borate and aluminate weakly coordinating counteranions are represented by Formulae II and III below:

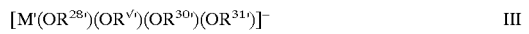

wherein in Formula II M' is boron or aluminum and $R^{24'}$, $R^{25'}$, $R^{26'}$, and $R^{27'}$ independently represent fluorine, linear and branched $C_1$–$C_{10}$ alkyl, linear and branched $C_1$–$C_{10}$ alkoxy, linear and branched $C_3$–$C_5$ haloalkenyl, linear and branched $C_3$–$C_{12}$ trialkylsiloxy, $C_{18}$–$C_{36}$ triarylsiloxy, substituted and unsubstituted $C_6$–$C_{30}$ aryl, and substituted and unsubstituted $C_6$–$C_{30}$ aryloxy groups wherein $R^{24'}$ to $R^{27'}$ can not all simultaneously represent alkoxy or aryloxy groups. When substituted the aryl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_5$ haloalkoxy, linear and branched $C_1$–$C_{12}$ trialkylsilyl, $C_6$–$C_{18}$ triarylsilyl, and halogen selected from chlorine, bromine, and fluorine, preferably fluorine.

Representative borate anions under Formula II include but are not limited to tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-i-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)ethyl]-5-(trifluoromethyl)phenyl]borate.

Representative aluminate anions under Formula II include but are not limited to tetrakis(pentafluorophenyl)aluminate, tris(perfluorobiphenyl)fluoroaluminate, (octyloxy)tris(pentafluorophenyl)aluminate, tetrakis(3,5-bis(trifluoromethyl)phenyl)aluminate, and methyltris(pentafluorophenyl)aluminate.

In Formula III M' is boron or aluminum, $R^{28'}$, $R^{29'}$, $R^{30'}$, and $R^{31'}$ independently represent linear and branched $C_1$–$C_{10}$ alkyl, linear and branched $C_1$–$C_{10}$ haloalkyl, $C_2$–$C_{10}$ haloalkenyl, substituted and unsubstituted $C_6$–$C_{30}$ aryl, and substituted and unsubstituted $C_7$–$C_{30}$ aralkyl groups, subject to the proviso that at least three of $R^{28'}$ to $R^{31'}$ must contain a halogen containing substituent. When substituted the aryl and aralkyl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine, preferably fluorine. The groups $OR^{28'}$ and $OR^{29'}$ can be taken together to form a chelating substituent represented by —O—$R^{32'}$—O—, wherein the oxygen atoms are bonded to M' and $R^{32'}$ is a divalent radical selected from substituted and unsubstituted $C_6$–$C_{30}$ aryl and substituted and unsubstituted $C_7$–$C_{30}$ aralkyl. Preferably, the oxygen atoms are bonded, either directly or through an alkyl group, to the aromatic ring in the ortho or meta position. When substituted the aryl and aralkyl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine, preferably fluorine. Representative structures of divalent $R^{32'}$ radicals are illustrated below:

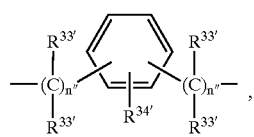

-continued

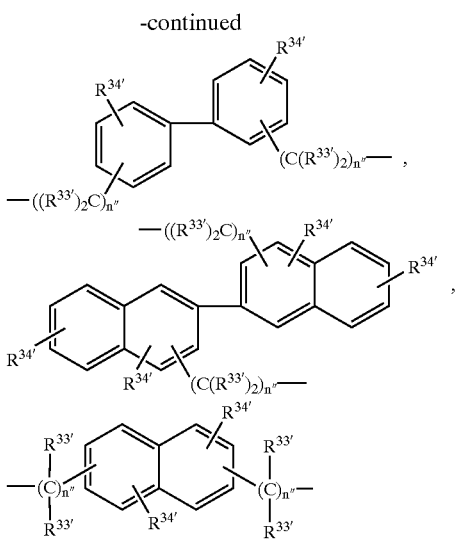

wherein $R^{33'}$ independently represents hydrogen, linear and branched $C_1$–$C_5$ alkyl, linear and branched $C_1$–$C_5$ haloalkyl, and halogen selected from chlorine, bromine, and fluorine, preferably fluorine; $R^{34'}$ can be a monosubstituent or taken up to four times about each aromatic ring depending on the available valence on each ring carbon atom and independently represents hydrogen, linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine, preferably fluorine; and n" independently represents an integer from 0 to 6. It should be recognized that when n" is 0 the oxygen atom in the formula —O—$R^{32'}$—O— is bonded directly to a carbon atom in the aromatic ring represented by $R^{32'}$. In the above divalent structural formulae the oxygen atom(s), i.e., when n" is 0, and the methylene or substituted methylene group(s), —(C($R^{33'}$)$_2$)$_{n''}$—, are preferably located on the aromatic ring in the ortho or meta positions. Representative chelating groups of the formula —O—$R^{32'}$—O— include but are not limited to are 2,3,4,5-tetrafluorobenzenediolate (—OC$_6$F$_4$O—), 2,3,4,5-tetrachlorobenzenediolate (—OC$_6$Cl$_4$O—), and 2,3,4,5-tetrabromobenzenediolate (—OC$_6$Br$_4$O—), and bis(1,1'-bitetrafluorophenyl-2,2'-diolate).

Representative borate and aluminate anions under Formula III include but are not limited to [B(OC(CF$_3$)$_3$)$_4$]$^-$, [B(OC(CF$_3$)$_2$(CH$_3$))$_4$]$^-$ [B(OC(CF$_3$)$_2$H)$_4$]$^-$, [B(OC(CF$_3$)(CH$_3$)H)$_4$]$^-$, [Al(OC(CF$_3$)$_2$Ph)$_4$]$^-$, [B(OCH$_2$(CF$_3$)$_2$)$_4$]$^-$, [Al(OC(CF$_3$)$_2$C$_6$H$_4$CH$_3$)$_4$]$^-$, [Al(OC(CF$_3$)$_3$)$_4$]$^-$, [Al(OC(CF$_3$)(CH$_3$)H)$_4$]$^-$, [Al(OC(CF$_3$)$_2$H)$_4$]$^-$, [Al(OC(CF$_3$)$_2$C$_6$H$_4$-4-i-Pr)$_4$]$^-$, [Al(OC(CF$_3$)$_2$C$_6$H$_4$-4-t-butyl)$_4$]$^-$, [Al(OC(CF$_3$)$_2$C$_6$H$_4$-4-SiMe$_3$)$_4$]$^-$, [Al(OC(CF$_3$)$_2$C$_6$H$_4$-4-Si-i-Pr$_3$)$_4$]$^-$, [Al(OC(CF$_3$)$_2$C$_6$H$_2$-2,6-(CF$_3$)$_2$-4-Si-i-Pr$_3$)$_4$]$^-$, [Al(OC(CF$_3$)$_2$C$_6$H$_3$-3,5-(CF$_3$)$_2$)$_4$]$^-$, [Al(OC(CF$_3$)$_2$C$_6$H$_2$-2,4,6-(CF$_3$)$_3$)$_4$]$^-$, and [Al(OC(CF$_3$)$_2$C$_6$F$_5$)$_4$]$^-$.

The boratobenzene anions useful as the weakly coordinating counteranion can be represented by Formula IV below:

$$\left[ \begin{array}{c} R^{35'} \\ R^{35'} \diagup \diagdown R^{35'} \\ R^{35'} \diagdown \diagup R^{35'} \\ B \\ R^{34'} \end{array} \right]^- \quad \text{IV}$$

wherein $R^{34'}$ is selected from fluorine, fluorinated hydrocarbyl, perfluorocarbyl, and fluorinated and perfluorinated ethers. As used here and throughout the specification, the term halohydrocarbyl means that at least one hydrogen atom on the hydrocarbyl radical, e.g., alkyl, alkenyl, alkynyl, cycloalkyl, aryl, and aralkyl groups, is replaced with a halogen atom selected from chlorine, bromine, iodine, and fluorine (e.g., haloalkyl, haloalkenyl, haloalkynyl, halocycloalkyl, haloaryl, and haloaralkyl). The term fluorohydrocarbyl means that at least one hydrogen atom on the hydrocarbyl radical is replaced by fluorine. The degree of halogenation can range from at least one hydrogen atom being replaced by a halogen atom (e.g., a monofluoromethyl group) to full halogenation (perhalogenation) wherein all hydrogen atoms on the hydrocarbyl group have been replaced by a halogen atom (e.g., perhalocarbyl such as trifluoromethyl (perfluoromethyl)). The fluorinated hydrocarbyl and perfluorocarbyl radicals preferably contain 1 to 24 carbon atoms, more preferably, 1 to 12 carbon atoms and most preferably 6 carbon atoms and can be linear or branched, cyclic, or aromatic. The fluorinated hydrocarbyl and perfluorocarbyl radicals include but are not limited to fluorinated and perfluorinated linear and branched $C_1$–$C_{24}$ alkyl, fluorinated and perfluorinated $C_3$–$C_{24}$ cycloalkyl, fluorinated and perfluorinated $C_2$–$C_{24}$ alkenyl, fluorinated and perfluorinated $C_3$–$C_{24}$ cycloalkenyl, fluorinated and perfluorinated $C_6$–$C_{24}$ aryl, and fluorinated and perfluorinated $C_7$–$C_{24}$ aralkyl. The fluorinated and perfluorocarbyl ether substituents are represented by the formulae —(CH$_2$)$_m$OR$^{36'}$, or —(CF$_2$)$_m$OR$^{36'}$ respectively, wherein $R^{36'}$ is a fluorinated or perfluorocarbyl group as defined above, m is and integer of 0 to 5. It is to be noted that when m is 0 the oxygen atom in the ether moiety is directly bonded attached to the boron atom in the boratobenzene ring.

Preferred $R^{34'}$ radicals include those that are electron withdrawing in nature such as, for example, fluorinated and perfluorinated hydrocarbyl radicals selected from trifluoromethyl, perfluoroethyl, perfluoropropyl, perfluoroisopropyl, pentafluorophenyl and bis(3,5-trifluoromethyl)phenyl.

$R^{35'}$ independently represents hydrogen, halogen, perfluorocarbyl, and silylperfluorocarbyl radicals, wherein the perfluorocarbyl and silylperfluorocarbyl are as defined previously. Preferred halogen groups are selected from chlorine, fluorine, with fluorine being especially preferred. When $R^{35'}$ is halogen, perfluorocarbyl, and/or silylperfluorocarbyl, the radical(s) are preferably ortho or para (more preferably para) to the boron atom in the boratobenzene ring.

Representative boratobenzene anions include but are not limited to [1,4-dihydro-4-methyl-1-(pentafluorophenyl)]-2-borate, 4-(1,1-dimethyl)-1,2-dihydro-1-(pentafluorophenyl)-2-borate, 1-fluoro-1,2-dihydro-4-(pentafluorophenyl)-2-borate, and 1-[3,5-bis(trifluoromethyl)phenyl]-1,2-dihydro-4-(pentafluorophenyl)-2-borate.

The carborane and halocarborane anions useful as the weakly coordinating counteranion include but are not limited to $CB_{11}(CH_3)_{12}^-$, $CB_{11}H_{12}^-$, $1\text{-}C_2H_5CB_{11}H_{11}^-$, $1\text{-}Ph_3SiCB_{11}H_{11}^-$, $1\text{-}CF_3CB_{11}H_{11}^-$, $12\text{-}BrCB_{11}H_{11}^-$, $12\text{-}BrCB_{11}H_{11}^-$, $7,12\text{-}Br_2CB_{11}H_{10}^-$, $12\text{-}ClCB_{11}H_{11}^-$, $7,12\text{-}Cl_2CB_{11}H_{10}^-$, $1\text{-}H\text{---}CB_{11}F_{11}^-$, $1\text{-}CH_3\text{---}CB_{11}F_{11}^-$, $1\text{-}CF_3\text{---}CB_{11}F_{11}^-$, $12\text{-}CB_{11}H_{11}F^-$, $7,12\text{-}CB_{11}H_{11}F_2^-$, $7,9,12\text{-}CB_{11}H_{11}F_3^-$, $CB_{11}H_6Br_6^-$, $6\text{-}CB_9H_9F^-$, $6,8\text{-}CB_9H_8F_2^-$, $6,7,8\text{-}CB_9H_7F_3^-$, $6,7,8,9CB_9H_6F_4^-$, $2,6,7,8,9\text{-}CB_9H_5F_5^-$, $CB_9H_5Br_5^-$, $CB_{11}H_6Cl_6^-$, $CB_{11}H_6F_6^-$, $CB_{11}H_6F_6^-$, $CB_{11}H_6I_6^-$, $CB_{11}H_6Br_6^-$, $6,7,9,10,11,12\text{-}CB_{11}H_6F_6^-$, $2,6,7,8,9,10\text{-}CB_9H_5F_5^-$, $1\text{-}H\text{---}CB_9F_9^-$, $12\text{-}CB_{11}H_{11}(C_6H_5)^-$, $1\text{-}C_6F_5\text{-}CB_{11}H_5Br_6^-$, $CB_{11}Me_{12}^-$, $CB_{11}(CF_3)_{12}^-$, $Co(B_9C_2H_{11})_2^-$, $CB_{11}(CH_3)_{12}^-$, $CB_{11}(C_4H_9)_{12}^-$, $CB_{11}(C_6H_{13})_{12}^-$, $Co(C_2B_9H_{11})_2^-$, $Co(Br_3C_2B_9H_8)_2^-$ and dodecahydro-1-carbadodecaborate.

Catalyst Preparation

The catalysts of Formula I can be prepared as a preformed single component catalyst in solvent or can be prepared in situ by admixing the catalyst precursor components in the desired monomer to be polymerized.

The single component catalyst of Formula I can be prepared by admixing the catalyst precursors in an appropriate solvent, allowing the reaction to proceed under appropriate temperature conditions, and isolating the catalyst product. In another embodiment, a Group 10 metal procatalyst is admixed with a Group 15 electron donor compound and/or a labile neutral electron donor compound, and a salt of a weakly coordinating anion in an appropriate solvent to yield the preformed catalyst complex set forth under Formula I above. In another embodiment a Group 10 metal procatalyst containing a Group 15 electron donor ligand is admixed with a salt of a weakly coordinating anion in an appropriate solvent to yield the preformed catalyst complex.

The catalyst preparation reactions are carried out in solvents that are inert under the reaction conditions. Examples of solvents suitable for the catalyst preparation reaction include but are not limited to alkane and cycloalkane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; ethers such as THF and diethylether; aromatic solvents such as benzene, xylene, toluene, mesitylene, chlorobenzene, and o-dichlorobenzene; and halocarbon solvents such as Freon® 112; and mixtures thereof. Preferred solvents include benzene, fluorobenzene, o-difluorobenzene, p-difluorobenzene, pentafluorobenzene, hexafluorobenzene, o-dichlorobenzene, chlorobenzene, toluene, o-, m-, and p-xylenes, mesitylene, cyclohexane, THF, and dichloromethane.

A suitable temperature range for carrying out the reaction is from about −80° C. to about 150° C., preferably from about −30° C. to about 100° C., more preferably from about 0° C. to about 65° C., and most preferably from about 10° C. to about 40° C. Pressure is not critical but may depend on the boiling point of the solvent employed, i.e. sufficient pressure to maintain the solvent in the liquid phase. Reaction times are not critical, and can range from several minutes to 48 hours. The reactions are preferably carried out under inert atmosphere such as nitrogen or argon.

The reaction is carried out by dissolving the procatalyst in a suitable solvent and admixing the appropriate ligand(s) and the salt of the desired weakly coordinating anion with the dissolved procatalyst, and optionally heating the solution until the reaction is complete. The preformed single component catalyst can be isolated or can be used directly by adding aliquots of the preformed catalyst in solution to the polymerization medium. Isolation of the product can be accomplished by standard procedures, such as evaporating the solvent, washing the solid with an appropriate solvent, and then recrystallizing the desired product. The molar ratios of catalyst components employed in the preparation the preformed single component catalyst of the invention is based on the metal contained in the procatalyst component. In a preferred embodiment the molar ratio of procatalyst/ Group 15 electron donor component/WCA salt is 1:1–10:1–100, more preferably, 1:1–5:1–20, and most preferably, 1:1–2:1–5. In embodiments of the invention where the procatalyst is ligated with a Group 15 electron donor ligand and/or a labile neutral electron donor ligand the molar ratio of procatalyst (based on the metal content) to WCA salt 1:1–100, preferably, 1:1–20, and more preferably, 1:1–5.

In one embodiment, a Group 10 metal procatalyst dimer of the formula $[R'MA']_2$ is admixed with a Group 15 electron donor compound, (L'), and a salt of a suitable weakly coordinating anion in an appropriate solvent to produce the single component catalyst product as shown in equation (1) below.

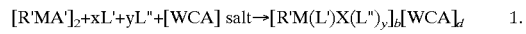

$$[R'MA']_2 + xL' + yL'' + [WCA]\text{ salt} \rightarrow [R'M(L')_x(L'')_y]_b[WCA]_d \quad 1.$$

Suitable procatalyst dimers of the formula $[R'MA']_2$ include but are not limited to the following compositions (allyl)palladiumtrifluoroacetate dimer, (allyl)palladiumchloride dimer, (crotyl)palladiumchloride dimer, (allyl)palladiumiodide dimer, (β-pinenyl)palladiumchloride dimer, methallylpalladium chloride dimer, 1,1-dimethylallylpalladium chloride dimer, and (allyl)palladiumacetate dimer.

In another embodiment, a ligated Group 10 metal procatalyst of the formula $[R'M(L'')_yA']$ is admixed with a Group 15 electron donor compound, (L'), and a salt of a suitable weakly coordinating anion in an appropriate solvent to produce the single component catalyst product as shown in equation (2) below.

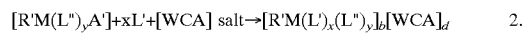

$$[R'M(L'')_yA'] + xL' + [WCA]\text{ salt} \rightarrow [R'M(L')_x(L'')_y]_b[WCA]_d \quad 2.$$

A representative procatalyst of the formula $[R'M(L'')_yA']$ includes but is not limited to (COD)palladium (methyl) chloride.

In a further embodiment, a Group 10 metal ligated procatalyst of the formula $[R'M(L')_xA']$ containing the Group 15 electron donor ligand (L') is admixed with a salt of a suitable weakly coordinating anion in an appropriate solvent to produce the single component catalyst product as shown in equation (3) below.

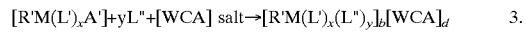

$$[R'M(L')_xA'] + yL'' + [WCA]\text{ salt} \rightarrow [R'M(L')_x(L'')_y]_b[WCA]_d \quad 3.$$

Suitable procatalysts of the formula $[R'M(L')_xA']$ include but are not limited to the following compositions:

(allyl)palladium(tricyclohexylphosphine)chloride,
(allyl)palladium(tricyclohexylphosphine)triflate,
(allyl)palladium(triisopropylphosphine)triflate,
(allyl)palladium(tricyclopentylphosphine)triflate,
(allyl)palladium(tricyclohexylphosphine)trifluoroacetate,
(allyl)palladium(tri-o-tolylphosphine)chloride, (allyl)palladium(tri-o-tolylphosphine)triflate,
(allyl)palladium(tri-o-tolylphosphine)nitrate,
(allyl)palladium(tri-o-tolylphosphine)acetate,
(allyl)palladium(triisopropylphosphine)triflimide,
(allyl)palladium(tricyclohexylphosphine)triflimide,
(allyl)palladium(triphenylphosphine)triflimide,
(allyl)palladium(trinaphthylphosphine)triflate,
(allyl)palladium(tricyclohexylphosphine)p-tolylsulfonate,
(allyl)palladium(triphenylphosphine)triflate,
(allyl)palladium(triisopropylphosphine)trifluoroacetate,
(allyl)platinum(tricyclohexylphosphine)chloride,
(allyl)platinum(tricyclohexylphosphine)triflate,
(1,1-dimethylallyl)palladium(triisopropylphosphine) trifluoroacetate.
(2-chloroallyl)palladium(triisopropylphosphine)trifluoroacetate,
(crotyl)palladium(triisopropylphosphine)triflate,
(crotyl)palladium(tricyclohexylphosphine)triflate,
(crotyl)palladium(tricyclopentylphosphine)triflate,
(methallyl)palladium(tricyclohexylphosphine)triflate,
(methallyl)palladium(triisopropylphosphine)triflate,
(methallyl)palladium(tricyclopentylphosphine)triflate,
(methallyl)palladium(tricyclohexylphosphine)chloride,
(methallyl)palladium(triisopropylphosphine)chloride,
(methallyl)palladium(tricyclopentylphosphine)chloride,
(methallyl)palladium(tricyclohexylphosphine)triflimide,
(methallyl)palladium(triisopropylphosphine)triflimide,
(methallyl)palladium(tricyclopentylphosphine)triflimide,
(methallyl)palladium(tricyclohexylphosphine) trifluoroacetate,
(methallyl)palladium(triisopropylphosphine) trifluoroacetate,
(methallyl)palladium(tricyclopentylphosphine) trifluoroacetate,
(methallyl)palladium(tricyclohexylphosphine)acetate,
(methallyl)palladium (triisopropylphosphine)acetate,
(methallyl)palladium(tricyclopentylphosphine)acetate,
(methallyl)nickel(tricyclohexylphosphine)triflate,
{2-[(dimethylamino)methyl]phenyl-C,N-}-palladium (tricyclohexyl-phosphine)chloride,
[(dimethylamino)methyl]phenyl-C,N-}-palladium (tricyclohexyl-phosphine)triflate,
(hydrido)palladium bis(tricyclohexylphosphine)triflate,
(hydrido)palladium bis(tricyclohexylphosphine)formate
(hydrido)palladium bis(tricyclohexylphosphine)chloride,
(hydrido)palladium bis(triisopropylphosphine)chloride,
(hydrido)palladium bis(tricyclohexylphosphine)nitrate,
(hydrido)palladium bis(tricyclohexylphosphine) trifluoroacetate, and
(hydrido)palladiumbis(triisopropylphosphine)triflate.

Other procatalyst components suitable for use in the foregoing process include $(Me_2NCH_2C_6H_4)Pd(O_3SCF_3)P(cyclohexyl)_3$ (i.e., ortho-metallatedphenylmethlyenedimethylamino palladium tricyclohexylphosphine), $(allyl)Pd(P-i-Pr_3)C_6F_5$, $(allyl)Pd(PCy_3)C_6F_5$, $(CH_3)Pd(PMe_3)_2Cl$, $(C_2H_5)Pd(PMe_3)_2Cl$ $(Ph)Pd(PMe_3)_2Cl$, $(CH_3)Pd(PMe_3)_2Br$, $(CH_3)Pd(PMe_2Ph)_2Cl$, $(C_2H_5)Pd(PMe_3)_2Br$, $(C_2H_5)Pd(PMe_3)_2Br$, $(Ph)Pd(PMe_3)_2Br$, $(CH_3)Pd(PMe_3)NO_3$, $(CH_3)Pd(P(i-Pr)_3)_2O_3SCCF_3$, $(\eta^1-benzyl)Pd(PEt_3)_2Cl$, $(allyl)Pd(PMe_3)OC(O)CH_2CH=CH_2$, $(allyl)Pd(AsPh_3)Cl$, $(allyl)Pd(PPh_3)Cl$, $(allyl)Pd(SbPh_3)Cl$, $(methylallyl)Pd(PPh_3)Cl$, $(methylallyl)Pd(AsPh_3)Cl$, $(methylallyl)Pd(SbPh_3)Cl$, $(methylallyl)Pd(PBu_3)Cl$, and $(methylallyl)Pd(P[(OCH_2)_3]CH)Cl$.

In another embodiment, the catalyst can be formed by protonating a procatalyst of the formula:

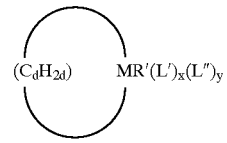

in the presence of a Brønsted acid based WCA salt or an equivalent reaction utilizing a carbonium or silylium based WCA salt to yield an active catalyst as illustrated in Eq. 4.

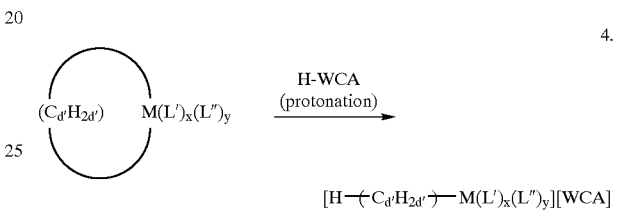

4.

In this embodiment R' is a divalent hydrocarbyl ligand of the formula —$(C_dH_{2d})$— that is taken together with the Group 10 metal center M to form a metallacycle where d' represents the number of carbon atoms in the divalent hydrocarbyl backbone and is an integer from 3 to 10. Any of the hydrogen atoms on the divalent hydrocarbyl backbone can be replaced by linear and branched $C_1$–$C_5$ alkyl, linear and branched $C_1$–$C_5$ haloalkyl, $C_5$–$C_{10}$ cycloalkyl, and $C_6$–$C_{10}$ aryl. The cycloalkyl and aryl moieties can optionally be substituted with a halogen substituent selected from bromine, chlorine, fluorine, and iodine, preferably fluorine. In addition, any two or three of the alkyl substituents taken together with the hydrocarbyl backbone carbon atoms to which they are attached can form an aliphatic or aromatic ring system. The rings can be monocyclic, polycyclic, or fused. Protonation occurs at one of the hydrocarbyl/metal center bond interfaces to yield a cation complex with a monovalent hydrocarbyl ligand coordinated to the metal center M.

In another embodiment a Group 10 metal ligated procatalyst of the formula $[R'M(L')_x(L'')_yA']$ containing a Group 15 electron donor ligand (L') and a labile neutral electron donor ligand (L'') is admixed with a salt of a suitable weakly coordinating anion in an appropriate solvent to produce the single component catalyst product as shown in equation (5) below.

$[R'M(L')_x(L'')_yA']+[WCA]$ salt→$[R'M(L')_x(L'')_y]_b[WCA]_d$    5.

Suitable procatalysts of the formula $[R'M(L')_x(L'')_yA']$ include but are not limited to the following compositions:

[(allyl)Pd(NCCH_3)(P-i-Pr_3)][B(O_2-3,4,5,6-Cl_4C_6)_2],
[(allyl)Pd(HOCH_3)(P-i-Pr_3)][B(O_2-3,4,5,6-Cl_4C_6)_2],
[(allyl)Pd(HOCH_3)(P-i-Pr_3)][B(O_2-3,4,5,6-Br_4C_6)_2],
[(allyl)Pd(HOCH_3)(P-i-Pr_3)][B(O_2C_6H_4)_2],
[(allyl)Pd(OEt_2)(P-i-Pr_3)][BPh_4], [(allyl)Pd(OEt_2)(P-i-Pr_3)],
[SbF_6][(allyl)Pd(OEt_2)(P-i-Pr_3)][BF_4], [(allyl)Pd(OEt_2)(PCy_3)][BF_4],

[(allyl)Pd(OEt$_2$)(PPh$_3$)][BF$_4$], [(allyl)Pd(OEt$_2$)(P-i-Pr$_3$)][PF$_6$],

[(allyl)Pd(OEt$_2$)(PCy$_3$)][PF$_6$], [(allyl)Pd(OEt$_2$)(PPh$_3$)][PF$_6$],

[(allyl)Pd(OEt$_2$)(P-i-Pr$_3$)][ClO$_4$], [(allyl)Pd(OEt$_2$)(PCy$_3$)][ClO$_4$],

[(allyl)Pd(OEt$_2$)(PPh$_3$)][ClO$_4$], [(allyl)Pd(OEt$_2$)(P-i-Pr$_3$)][SbF$_6$],

[(allyl)Pd(OEt$_2$)(PCy$_3$)][SbF$_6$], and [(allyl)Pd(OEt$_2$)(PPh$_3$)][SbF$_6$].

In another embodiment of the invention the catalyst of Formula I is generated by reacting a procatalyst of the formula [M(L')$_x$(L")$_y$(A')$_2$] with an organometallic compound of aluminum, lithium or magnesium, and a source of a weakly coordinating anion (WCA) or a strong Lewis Acid. In this embodiment the anionic hydrocarbyl ligand (R') on the group 10 metal center (M) is supplied via reaction with the organometallic compound to yield the active catalyst as shown below.

[M(L')$_x$(L")$_y$(A')$_2$]+[WCA] salt or Strong Lewis Acid+organometallic compound→[R'M(L')$_x$(L")$_y$]$_b$[WCA]$_d$    6.

Examples of procatalysts suitable for use in this embodiment include:

nickel acetylacetonate,
nickel carboxylates,
nickel(II)chloride,
nickel(II)bromide,
nickel ethylhexanoate,
nickel(II)trifluoroacetate,
nickel(II)hexafluoroacetylacetonate,
NiCl$_2$(PPh$_3$)$_2$,
NiBr$_2$P(p-tolyl)$_3$)$_2$,
trans-PdCl$_2$(PPh$_3$)$_2$,
palladium(II)bis(trifluoroacetate),
palladium(II)acetylacetonate,
(cyclooctadiene)palladium(II)dichloride,
Pd(acetate)$_2$(PPh$_3$)$_2$,
PdCl$_2$(PPh$_3$)$_2$
PdBr$_2$(PPh$_3$)$_2$
PdBr$_2$(P(p-tolyl)$_3$)$_2$,
PdCl$_2$(P(o-tolyl)$_3$)$_2$,
PdCl$_2$(P(cyclohexyl)$_3$)$_2$,
palladium(II)bromide,
palladium(II)chloride,
palladium(II)iodide,
palladium(II)ethylhexanoate,
dichloro bis(acetonitrile)palladium(II),
dibromo bis(benzonitrile)palladium(II),
platinum(II)chloride,
platinum(II)bromide, and
platinum bis(triphenylphosphine)dichloride.

In general the Group 10 metal procatalyst is a nickel(II), platinum(II) or palladium(II) compound containing two anionic leaving groups (A'), which can be readily displaced by the weakly coordinating anion that is provided by the WCA salt or strong Lewis acid described below and can be replaced by hydrocarbyl groups originating from the organometallic compound. The leaving groups can be the same or different. The Group 10 metal procatalyst may or may not be ligated.

When the procatalyst of this embodiment is not ligated with a Group 15 electron donor component (L'), the Group 15 electron donor ligand can be added to the reaction medium as shown in the following reaction scheme.

[M(L")$_y$(A')$_2$]+xL'+[WCA] salt or Strong Lewis Acid+organometallic compound→[R'M(L')$_x$(L")$_y$]$_b$[WCA]$_d$    7.

The strong Lewis acids suitable for use in this embodiment are selected from compounds of the formula:

M'(R$^{41'}$)$_3$ wherein M' represents aluminum or boron and R$^{41'}$ represents monosubstituted and multisubstituted C$_6$–C$_{30}$ aryl, wherein the substituents on the aryl group are independently selected from halogen, preferably fluorine, linear and branched C$_1$–C$_5$ haloalkyl, preferably trifluoromethyl, and halogenated and perhalogenated phenyl, preferably pentafluorophenyl. Examples of such strong Lewis acids include: tris(pentafluorophenyl)boron, tris(3,5-bis(trifluoromethyl)phenyl)boron, tris(2,2',2"-nonafluorobiphenyl)borane, and tris(pentafluorophenyl)aluminum.

The organometallic compound is a hydrocarbyl derivative of silicon, germanium, tin, lithium, magnesium or aluminum. Aluminum derivatives are preferred. The organoaluminum component of the catalyst system is represented by the formula:

AlR'$_{3-x"}$Q$_{x"}$ wherein R' independently represents hydrogen, linear and branched C$_1$–C$_{20}$ alkyl, C$_5$–C$_{10}$ cycloalkyl, linear and branched C$_2$–C$_{20}$ alkenyl, C$_6$–C$_{15}$ cycloalkenyl, allylic ligands or canonical forms thereof, C$_6$–C$_{20}$ aryl, and C$_7$–C$_{30}$ aralkyl, *Q is a halide or pseudohalide selected from chlorine, fluorine, bromine, iodine, linear and unbranched C$_1$–C$_{20}$ alkoxy, C$_6$–C$_{24}$ aryloxy; x" is 0 to 2.5, preferably 0 to 2, most preferably 0 to 1. Trialkylaluminum compounds are most preferred. Examples of suitable organometallic compounds include:

methyllithium, sec-butyllithium, n-butyllithium, phenyllithium, butylethylmagnesium, di-n-butylmagnesium, butyloctylmagnesium, trimethylaluminum, triethylaluminum, tri-n-propylaluminum, tri-i-propylaluminum, tri-i-butylaluminum, tri-2-methylbutylaluminum, tri-octylaluminum, diethylaluminum chloride, ethylaluminum dichloride, di-i-butylaluminum chloride, diethylaluminum bromide, ethylaluminum sesquichloride, diethylaluminum ethoxide, diethylaluminum(i-butylphenoxide), and diethylaluminum(2,4-di-tert-butylphenoxide).

Embodiments of the catalyst devoid of a hydrocarbyl containing ligand can be synthesized by reacting a procatalyst of the formula [M(A')$_2$] with the desired ligands and WCA salt in accordance with the following reaction scheme:

[M(A')$_2$]+xL'+2[WCA] salt→[M(L')$_x$][WCA]$_2$+2A' salt    8.

wherein x=1 or 2, M, L', and L" are as previously defined.

Examples of procatalyst compounds include palladium (II) bis(acetylacetonate, palladium (acetate)$_2$, Pd(NO$_3$)$_2$, PdCl$_2$, PdBr$_2$, and PdI$_2$.

The foregoing schematic equations (1 to 8) have been presented for illustrative purposes only. While they have been written in balanced form it should be recognized that an excess of reaction components can be employed without deviating from the spirit of invention. For example, an excess of L', L", A', or WCA salt containing components can be employed in the process of the invention so long as the process is not deleteriously affected.

In a preferred embodiment the molar ratio of the Group 10 metal/Group 15 electron donor compound/source of a weakly coordinating anion/organometallic compound is 1:1–10:1–100:2–200, more preferably 1:1–5:1–40:4–100, and most preferably 1:1–2:2–20:5–50.

In embodiments where the Group 10 metal ion source is an adduct containing a Group 15 electron donor compound, no additional Group 15 electron donor compound need be employed. In this embodiment the most preferred molar ratio of the Group 10 metal/Group 15 electron donor compound/source of a weakly coordinating anion/organometallic compound is 1:0:2–20:5–50.

In all of the forgoing embodiments the catalysts of Formula I can be prepared as a preformed single component catalyst in solvent or they can be prepared in situ by admixing the precursor components (ligated or non-ligated Group 10 metal component with leaving group(s), ligand component(s), and WCA source or strong Lewis acid source) in the desired monomer, monomer mixtures, or solutions thereof. It is also possible to admix two or even three of the catalyst precursor components and then add the mixture to the monomer or monomer solution containing the remaining catalyst precursor component(s).

In the equations and formulae set forth above and throughout the specification, R', M, L', L", [WCA], b, d, x, and y are as defined above unless otherwise defined, A' is an anionic leaving group which is defined below, [WCA] salt is a metal salt of the weakly coordinating anion [WCA], and the abbreviations Me, Et, Pr, Bu, Cy, and Ph, as used here and throughout the specification refer to methyl, ethyl, propyl, butyl, cyclohexyl, and phenyl, respectively.

The foregoing Group 10 metal procatalyst components are commercially available or can be synthesized by techniques well known in the art.

As discussed above catalyst complex of Formula I can be formed in situ by combining any of the Group 10 metal procatalysts with the desired catalyst system components in monomer. In cases where the Group 10 metal procatalyst already contains the desired ligand groups, the procatalyst is mixed in monomer along with the WCA salt or the alternative activators such as strong Lewis acids or Brønsted acids. The WCA salt, strong Lewis acid or Brønsted acid serves as the an activator for the procatalyst in the presence of monomer. The in situ reactions for preparing the catalysts of Formula I generally follow the same conditions and reaction schemes as outlined for the preparation of the preformed single component catalysts, the principal difference being that the catalysts are formed in monomer in lieu of solvent and that a polymer product is formed.

Leaving Groups

A' represents an anionic leaving group that can be readily displaced by the weakly coordinating anion that is provided by the WCA salt. The leaving group forms a salt with the cation on the WCA salt. Leaving group A' is selected from halogen (i.e., Br, Cl, I, and F), nitrate, triflate (trifluoromethanesulfonate), triflimide (bistrifluoromethanesulfonimide), trifluoroacetate, tosylate, $AlBr_4^-$, $AlF_4^-$, $AlCl_4^-$, $AlF_3O_3SCF_3^-$, $AsCl_6^-$, $SbCl_6^-$, $SbF_6^-$, $PF_6^-$, $BF_4^-$, $ClO_4^-$, $HSO_4^-$, carboxylates, acetates, acetylacetonates, carbonates, aluminates, and borates.

In another embodiment the leaving group can be a hydrocarbyl group or halogenated hydrocarbyl group when a Brønsted acid based WCA salt is utilized as the activator. In this embodiment the activator protonates the hydrocarbyl or halogenated hydrocarbyl forming a neutral moiety. The leaving group moiety is preferably selected from the hydride, linear and branched $C_1$–$C_5$ alkyl, linear and branched $C_1$–$C_5$ haloalkyl, $C_5$–$C_{10}$ cycloalkyl, and $C_6$–$C_{10}$ aryl. The cycloalkyl and aryl moieties can optionally be substituted with a halogen substituent selected from bromine, chlorine, fluorine, and iodine, preferably fluorine. In this embodiment, A' is protonated to yield the neutral moiety A'H. Methyl and pentafluorophenyl groups are representative examples of leaving groups under this embodiment.

Halogen leaving groups include chlorine, iodine, bromine and fluorine. The acetates include groups of the formula $R^{38'}C(O)O^-$, and the carbonates include groups of the formula $R^{38'}OC(O)O^-$, wherein $R^{38'}$ represents linear and branched $C_1$–$C_5$ alkyl, linear and branched $C_1$–$C_5$ haloalkyl (preferably fluorine), linear or branched $C_1$–$C_5$ alkenyl, $C_6$–$C_{12}$ aryl, optionally monosubstituted or independently multisubstituted with linear and branched $C_1$–$C_5$ alkyl, linear and branched $C_1$–$C_5$ haloalkyl, and halogen (preferably fluorine).

The aluminate and borate leaving groups can be represented by the formulae $M'(R^{39'})_4^-$, $M'(GR^{39'})_4^-$, $M'(-C\equiv CPh)_4^-$, or a moiety represented by the following structures:

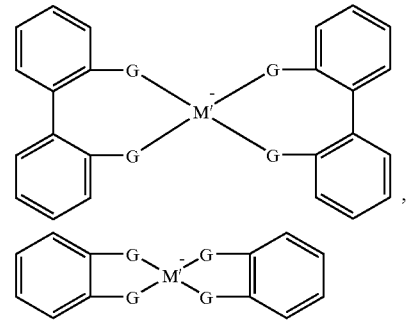

wherein G is a sulfur or oxygen atom Ph represents phenyl and substituted phenyl as defined below, and $R^{39'}$ independently represents linear and branched $C_1$–$C_{10}$ alkyl, linear and branched $C_1$–$C_{10}$ chloro- or bromoalkyl, $C_5$–$C_{10}$ cycloalkyl, substituted and unsubstituted aryl, preferably, phenyl and substituted phenyl, substituted and unsubstituted $C_7$–$C_{20}$ aralkyl, preferably, phenylalkyl and substituted phenylalkyl. By substituted is meant that the aryl or phenyl groups can contain one or more of linear and branched $C_1$–$C_5$ alkyl, linear and branched $C_1$–$C_5$ haloalkyl, chlorine, and bromine substituents, and combinations thereof.

Representative aluminate groups include but are not limited to tetraphenoxyaluminate, tetrakis(cyclohexanolato) aluminate, tetraethoxyaluminate, tetramethoxyaluminate, tetrakis(isopropoxy)aluminate, tetrakis(2-butanolato) aluminate, tetrapentyloxyaluminate, tetrakis(2-methyl-2-propanolato)aluminate, tetrakis(nonyloxy)aluminate, and bis(2-methoxyethanolate-O,O')bis(2-methoxyethanolate-O') aluminate, tetrakis(phenyl)aluminate, tetrakis(p-tolyl) aluminate, tetrakis(m-tolyl)aluminate, tetrakis(2,4-dimethylphenyl)aluminate, and tetrakis(3,5-dimethylphenyl)aluminate.

Representative borate groups include tetraphenylborate, tetrakis(4-methylphenyl)borate, tetrakis(4-chlorophenyl) borate, tetrakis(4-bromophenyl)borate, tetrakis(2-bromo-4-chlorophenyl)borate, butyltriphenylborate, tetrakis(4-methoxyphenyl)borate, tetrakis(phenylethynyl)borate, bis (1,2-benzenediolato)borate, triphenyl(phenylethynyl)borate, bis(tetrafluorobenzenediolate)borate, bis(tetrachlorobenzenediolate)borate, bis (tetrabromobenzenediolate)borate, bis(1,1'-biphenyl-2,2'-diolato)borate, tetrakis(thiophenolyl)borate, bis(3,5-di-tert-butylbenzenediolate)borate, tetrakis(2,4-dimethylphenyl) borate, tetrakis(p-tolyl)borate, tetrakis(3,5-dimethylphenyl) borate, and tetrakis(m-tolyl)borate.

In addition to the anionic leaving groups described above, A' can also be selected from highly fluorinated and perfluorinated alkylsulfonyl and arylsulfonyl containing anions of the formulae $(R^{40'}SO_2)_2CH^-$, $(R^{40'}SO_2)_3C^-$, and $(R^{40'}SO_2)_2N^-$, wherein $R^{40'}$ independently represents linear and branched $C_1$-$C_{20}$ highly fluorinated and perfluorinated alkyl, $C_5$-$C_{15}$ highly fluorinated and perfluorinated cycloalkyl, and highly fluorinated and perfluorinated $C_6$-$C_{22}$ aryl. Optionally, the alkyl and cycloalkyl groups can contain a heteroatom in the chain of cyclic structure, respectively. Preferred heteroatoms include divalent (non-peroxidic) oxygen (i.e., —O—), trivalent nitrogen, and hexavalent sulfur. Any two of $R^{40'}$ can be taken together to form a ring. When $R^{40'}$ is a cycloalkyl substituent, a heterocycloalkyl substituent, or is taken with another $R^{40'}$ group to form a ring, the ring structures preferably contain 5 or 6 atoms, 1 or 2 of which can be heteroatoms.

In the above formulae the term highly fluorinated means that at least 50 percent of the hydrogen atoms bonded to the carbon atoms in the alkyl, cycloalkyl, and aryl moieties are replaced by fluorine atoms. Preferably, at least 2 out of every 3 hydrogen atoms on the alkyl, cycloalkyl, and aryl moieties under $R^{40'}$ are replaced by fluorine. More preferably, at least 3 out of every 4 hydrogen atoms are replaced by fluorine, and most preferably all of the hydrogen atoms on the $R^{40'}$ substituent are replaced by fluorine to give the perfluorinated moiety. In addition to or in lieu of fluorine atom substitution on the aryl ring(s), the aryl groups can contain linear and branched $C_1$-$C_{10}$ highly fluorinated and perfluorinated alkyl groups, such as, for example, trifluoromethyl. In embodiments where hydrogen atoms remain on the alkyl, cycloalkyl, and aryl moieties, a portion or all of the remaining hydrogen atoms can be replaced with bromine and/or chlorine atoms.

Representative highly fluorinated and perfluorinated alkylsulfonyl and arylsulfonyl containing anions of the foregoing formulae include but are not limited to $(C_2F_5SO_2)_2N^-$, $(C_4F_9SO_2)_2N^-$, $(CF_3SO_2)_2N^-$, $(CF_3SO_2)(C_4F_9SO_2)N^-$, $((CF_3)_2NC_2F_4SO_2)_2N^-$, $(C_6F_5\ SO_2)(CF_3SO_2)N^-$, $(CF_3SO_2)(CHF_2SO_2)N^-$, $(C_2F_5SO_2)(CF_3SO_2)N^-$, $(C_3F_7SO_2)_2N^-$, $((CF_3)_2(F)CSO_2)_2N^-$, $(C_4F_8(CF_3)_2NSO_2)_2N^-$, $(C_8F_{17}SO_2)_3C^-$, $(CF_3SO_2)_3C^-$, $(CF_3SO_2)_2CH^-$, $(C_4F_9SO_2)_3C^-$, $(CF_3SO_2)_2(C_4F_9SO_2)C^-$, $((CF_3)_2NC_2F_4SO_2)C(SO_2CF_3)_2^-$, $(3,5$-bis$(CF_3)C_6H_3)SO_2N(SO_2CF_3)^-$, $(C_6F_5SO_2)C(SO_2CF_3)_2^-$, and the structures exemplified below:

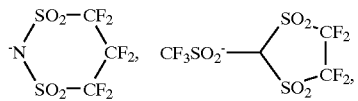

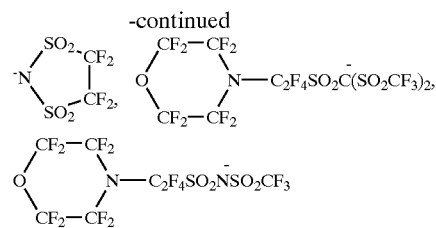

Additional highly fluorinated and perfluorinated alkylsulfonyl and arylsulfonyl anions suitable as leaving groups are described in Turowsky and Seppelt, *Inorganic Chemistry*, 1988, 27, 2135–2137, and in U.S. Pat. Nos. 4,387,222; 4,505,997; 5,021,308; 5,072,040; 5,162,177; and 5,273,840 the disclosures of which are hereby incorporated by reference.

WCA SALTS

The salt of the weakly coordinating anion employed in the process of the present invention can be represented by the formula $[C(L'')_z]_{b''}[WCA]_{d''}$, wherein C represents a proton ($H^+$), an alkaline earth metal cation, a transition metal cation or an organic group containing cation, L'' and WCA, are as defined above, z is an integer from 0 to 8, and b'' and d'' represent the number of times the cation complex and weakly coordinating counteranion complex (WCA), respectively, are taken to balance the electronic charge on the overall salt complex.

The alkali metal cations include Group 1 metals selected from lithium, sodium, potassium, rubidium, and cesium. The preferred Group 1 metal cations are lithium, sodium and potassium.

The alkali earth metal cations include Group 2 metals selected from beryllium, magnesium, calcium, strontium, and barium. The preferred Group 2 metal cations are magnesium, calcium, strontium, and barium. The transition metal cation is selected from zinc, silver, and thallium.

The organic group cation is selected from ammonium, phosphonium, carbonium and silylium cations, i.e., $[NHR^{41'}_3]^+$, $[NR^{41'}_4]^+$, $[PHR^{41'}_3]$, $[PR^{41'}_4]$, $[R^{41'}_3C]^+$, and $[R^{41'}_3Si]^+$, where $R^{41'}$ independently represents a hydrocarbyl, silylhydrocarbyl, or perfluorocarbyl group, each containing 1 to 24 carbon atoms, more preferably, from 1 to 12 carbons arranged in a linear, branched, or ring structure. By perfluorocarbyl is meant that all carbon bonded hydrogen atoms are replaced by a fluorine atom. Representative hydrocarbyl groups include but are not limited to linear and branched $C_1$-$C_{20}$ alkyl, $C_3$-$C_{20}$ cycloalkyl, linear and branched $C_2$ to $C_{20}$ alkenyl, $C_3$-$C_{20}$ cycloalkenyl, $C_6$-$C_{24}$ aryl, and $C_7$-$C_{24}$ aralkyl, and organometallic cations. The organic cations are selected from trityl, trimethylsilylium. triethylsilylium, tris(trimethylsilyl)silylium, tribenzylsilylium, triphenylsilylium, tricyclohexylsilylium, dimethyloctadecylsilylium, and triphenylcarbenium (i.e., trityl). In addition to the above cation complexes ferrocenium cations such as $[(C_5H_5)_2Fe]^+$ and $[(C_5(CH_3))_2Fe]^+$ are also useful as the cation in the WCA salts of the invention.

Examples of WCA salts having a weakly coordinating anion described under Formula II include but are not limited to lithium tetrakis(2-fluorophenyl)borate,
sodium tetrakis(2-fluorophenyl)borate,
silver tetrakis(2-fluorophenyl)borate,
thallium tetrakis(2-fluorophenyl)borate, lithium tetrakis(3-fluorophenyl)borate,
sodium tetrakis(3-fluorophenyl)borate,
silver tetrakis(3-fluorophenyl)borate,
thallium tetrakis(3-fluorophenyl)borate,
ferrocenium tetrakis(3-fluorophenyl)borate,
ferrocenium tetrakis(pentafluorophenyl)borate,
lithium tetrakis(4-fluorophenyl)borate,
sodium tetrakis(4-fluorophenyl)borate,
silver tetrakis(4-fluorophenyl)borate,
thallium tetrakis(4-fluorophenyl)borate,
lithium tetrakis(3,5-difluorophenyl)borate,
sodium tetrakis(3,5-difluorophenyl)borate,
thallium tetrakis(3,5-difluorophenyl)borate,
trityl tetrakis(3,5-difluorophenyl)borate,
2,6-dimethylanilinium tetrakis(3,5-difluorophenyl)borate,
lithium tetrakis(pentafluorophenyl)borate,
lithium(diethyl ether)tetrakis(pentafluorophenyl)borate,
lithium(diethyl ether)$_{2.5}$ tetrakis(pentafluorophenyl)borate,
lithium tetrakis(2,3,4,5-tetrafluorophenyl)borate,
lithium tetrakis(3,4,5,6-tetrafluorophenyl)borate,
lithium tetrakis(1,2,2-trifluoroethylenyl)borate,
lithium tetrakis(3,4,5-trifluorophenyl)borate,
lithium methyltris(perfluorophenyl)borate,
lithium phenyltris(perfluorophenyl)borate,
lithium tris(isopropanol)tetrakis(pentafluorophenyl)borate, lithium
tetrakis(methanol)tetrakis(pentafluorophenyl)borate,
silver tetrakis(pentafluorophenyl)borate,
tris(toluene)silver tetrakis(pentafluorophenyl)borate,
tris(xylene)silver tetrakis(pentafluorophenyl)borate,
trityl tetrakis(pentafluorophenyl)borate,
trityl tetrakis(4-triisopropylsilyltetrafluorophenyl)borate,
trityl tetrakis(4-dimethyl-tert-butylsilyltetrafluorophenyl)borate,
thallium tetrakis[3,5-bis(trifluoromethyl)phenyl]borate,
2,6-dimethylanilinium tetrakis(pentafluorophenyl)borate,
N,N-dimethylanilinium tetrakis(pentafluorophenyl)borate,
N,N-dimethylanilinium tetrakis[3,5-bis(trifluoromethyl)phenyl]borate
lithium (triphenylsiloxy)tris(pentafluorophenyl)borate,
sodium (triphenylsiloxy)tris(pentafluorophenyl)borate,
sodium tetrakis(2,3,4,5-tetrafluorophenyl)borate,
sodium tetrakis(3,4,5,6-tetrafluorophenyl)borate,
sodium tetrakis(1,2,2-trifluoroethylenyl)borate,
sodium tetrakis(3,4,5-trifluorophenyl)borate,
sodium methyltris(perfluorophenyl)borate,
sodium phenyltris(perfluorophenyl)borate,
thallium tetrakis(2,3,4,5-tetrafluorophenyl)borate,
thallium tetrakis(3,4,5,6-tetrafluorophenyl)borate,
thallium tetrakis(1,2,2-trifluoroethylenyl)borate,
thallium tetrakis(3,4,5-trifluorophenyl)borate,
sodium methyltris(perfluorophenyl)borate,
thallium phenyltris(perfluorophenyl)borate,
trityl tetrakis(2,3,4,5-tetrafluorophenyl)borate,
trityl tetrakis(3,4,5,6-tetrafluorophenyl)borate,
trityl tetrakis(1,2,2-trifluoroethylenyl)borate,
trityl tetrakis(3,4,5-trifluorophenyl)borate,
trityl methyltris(pentafluorophenyl)borate,
trityl phenyltris(perfluorophenyl)borate,
silver tetrakis[3,5-bis(trifluoromethyl)phenyl]borate,
silver(toluene)tetrakis[3,5-bis(trifluoromethyl)phenyl]borate,
thallium tetrakis[3,5-bis(trifluoromethyl)phenyl]borate,
lithium (hexyltris(pentafluorophenyl)borate,
lithium triphenylsiloxytris(pentafluorophenyl)borate,
lithium(octyloxy)tris(pentafluorophenyl)borate,
lithium tetrakis(3,5-bis(trifluoromethyl)phenyl)borate,
sodium tetrakis(pentafluorophenyl)borate,
trityl tetrakis(pentafluorophenyl)borate,
sodium(octyloxy)tris(pentafluorophenyl)borate,
sodium tetrakis(3,5-bis(trifluoromethyl)phenyl)borate,
potassium tetrakis(pentafluorophenyl)borate,
trityl tetrakis(pentafluorophenyl)borate,
potassium(octyloxy)tris(pentafluorophenyl)borate,
potassium tetrakis(3,5-bis(trifluoromethyl)phenyl)borate,
magnesium tetrakis(pentafluorophenyl)borate,
magnesium magnesium(octyloxy)tris(pentafluorophenyl)borate,
magnesium tetrakis(3,5-bis(trifluoromethyl)phenyl)borate,
calcium tetrakis(pentafluorophenyl)borate,
calcium (octyloxy)tris(pentafluorophenyl)borate,
calcium tetrakis(3,5-bis(trifluoromethyl)phenyl)borate,
lithium tetrakis[3,5-bis[1-methoxy-2,2,2-trifluoro-1-(trifluoromethyl)ethyl]phenyl]borate,
sodium tetrakis[3,5-bis[1-methoxy-2,2,2-trifluoro-1-(trifluoromethyl)ethyl]phenyl]borate,
silver tetrakis[3,5-bis[1-methoxy-2,2,2-trifluoro-1-(trifluoromethyl)ethyl]phenyl]borate,
thallium tetrakis[3,5-bis[1-methoxy-2,2,2-trifluoro-1-(trifluoromethyl)ethyl]phenyl]borate,
lithium tetrakis[3-[1-methoxy-2,2,2-trifluoro-1-(trifluoromethyl)ethyl]-5-(trifluoromethyl)phenyl]borate,
sodium tetrakis[3-[1-methoxy-2,2,2-trifluoro-1-(trifluoromethyl)ethyl]-5-(trifluoromethyl)phenyl]borate,
silver tetrakis[3-[1-methoxy-2,2,2-trifluoro-1-(trifluoromethyl)ethyl]-5-(trifluoromethyl)phenyl]borate,
thallium tetrakis[3-[1-methoxy-2,2,2-trifluoro-1-(trifluoromethyl)ethyl]-5-(trifluoromethyl)phenyl]borate,
lithium tetrakis[3-[2,2,2-trifluoro-1-(2,2,2-trifluoroethoxy)-1-(trifluoromethyl)ethyl]-5-(trifluoromethyl)phenyl]borate,
sodium tetrakis[3-[2,2,2-trifluoro-1-(2,2,2-trifluoroethoxy)-1-(trifluoromethyl)ethyl]-5-(trifluoromethyl)phenyl]borate,
silver tetrakis [3-[2,2,2-trifluoro-1-(2,2,2-trifluoroethoxy)-1-(trifluoromethyl)ethyl]-5-(trifluoromethyl)phenyl]borate,
thallium tetrakis[3-[2,2,2-trifluoro-1-(2,2,2-trifluoroethoxy)-1-(trifluoromethyl)ethyl]-5-(trifluoromethyl)phenyl]borate, trimethylsilylium tetrakis(pentafluorophenyl)borate,
trimethylsilylium etherate tetrakis(pentafluorophenyl)borate,
triethylsilylium tetrakis(pentafluorophenyl)borate, triphenylsilylium tetrakis(pentafluorophenyl)borate,
tris(mesityl)silylium tetrakis(pentafluorophenyl)borate, tribenzylsilylium tetrakis(pentafluorophenyl)borate,
trimethylsilylium methyltris(pentafluorophenyl)borate,
triethylsilylium methyltris(pentafluorophenyl)borate,
triphenylsilylium methyltris(pentafluorophenyl)borate,
tribenzylsilylium methyltris (pentafluorophenyl)borate,
trimethylsilylium tetrakis(2,3,4,5-tetrafluorophenyl)borate,
triethylsilylium tetrakis(2,,3,4,5-tetrafluorophenyl)borate,
triphenylsilylium tetrakis(2,3,4,5-tetrafluorophenyl)borate,
tribenzylsilylium tetrakis(2,3,4,5-tetrafluorophenyl)borate,
trimethylsilylium tetrakis(2,3,4,5-tetrafluorophenyl)borate,
triphenylsilylium tetrakis(2,3,4,5-tetrafluorophenyl)borate,
trimethylsilylium tetrakis(3,4,5-trifluorophenyl)borate,
tribenzylsilylium tetrakis(3,4,5-trifluorophenyl)aluminate,
triphenylsilylium methyltris(3,4,5-trifluorophenyl)aluminate,
triethylsilylium tetrakis(1,2,2-trifluoroethenyl)borate,
tricyclohexylsilylium tetrakis(2,3,4,5-tetrafluorophenyl)borate,
dimethyloctadecylsilylium tetrakis(pentafluorophenyl)borate,
tris(trimethyl)silyl)silylium methyltri(2,3,4,5-tetrafluorophenyl)borate,
2,2'-dimethyl-1,1'-binaphthylmethylsilylium tetrakis(pentafluorophenyl)borate,
2,2'-dimethyl-1,1'-binaphthylmethylsilylium tetrakis(3,5-bis(trifluoromethyl)phenyl)borate,
lithium tetrakis(pentafluorophenyl)aluminate,
trityl tetrakis(pentafluorophenyl)aluminate,
trityl (perfluorobiphenyl)fluoroaluminate,
lithium(octyloxy)tris(pentafluorophenyl)aluminate,
lithium tetrakis(3,5-bis(trifluoromethyl)phenyl)aluminate,
sodium tetrakis(pentafluorophenyl)aluminate,
trityl tetrakis(pentafluorophenyl)aluminate,
sodium(octyloxy)tris(pentafluorophenyl)aluminate,
sodium tetrakis(3,5-bis(trifluoromethyl)phenyl)aluminate,
potassium tetrakis(pentafluorophenyl)aluminate,
trityl tetrakis(pentafluorophenyl)aluminate,
potassium (octyloxy)tris(pentafluorophenyl)aluminate,
potassium tetrakis(3,5-bis(trifluoromethyl)phenyl)aluminate,
magnesium tetrakis(pentafluorophenyl)aluminate,
magnesium(octyloxy)tris(pentafluorophenyl)aluminate,
magnesium tetrakis(3,5-bis(trifluoromethyl)phenyl)aluminate,
calcium tetrakis(pentafluorophenyl)aluminate,
calcium (octyloxy)tris(pentafluorophenyl)aluminate, and calcium tetrakis(3,5-bis(trifluoromethyl)phenyl)aluminate.

Examples of WCA salts having a weakly coordinating anion described under Formula III include but are not limited to $LiB(OC(CF_3)_3)_4$, $LiB(OC(CF_3)_2(CH_3))_4$, $LiB(OC(CF_3)_2H)_4$,
$LiB(OC(CF_3)(CH_3)H)_4$, $TlB(OC(CF_3)_3)_4$, $TlB(OC(CF_3)_2H)_4$,
$TlB(OC(CF_3)(CH_3)H)_4$, $TlB(OC(CF_3)_2(CH_3))_4$, $(Ph_3C)B(OC(CF_3)_3)_4$,
$(Ph_3C)B(OC(CF_3)_2(CH_3))_4$, $(Ph_3C)B(OC(CF_3)_2H)_4$,
$(Ph_3C)B(OC(CF_3)(CH_3)H)_4$, $AgB(OC(CF_3)_3)_4$, $AgB(OC(CF_3)_2H)_4$,
$AgB(OC(CF_3)(CH_3)H)_4$, $LiB(O_2C_6F_4)_2$, $TlB(O_2C_6F_4)_2$,
$Ag(toluene)_2B(O_2C_6F_4)_2$, and $Ph_3CB(O_2C_6F_4)2$ $LiB(OCH_2(CF_3)_2)_4$,
$[Li(HOCH_3)_4]B(O_2C_6Cl_4)_2$, $[Li(HOCH_3)_4]B(O_2C_6F_4)_2$,
$[Ag(toluene)_2]B(O_2C_6C_4)_2$, $LiB(O_2C_6C_4)_2$, $(LiAl(OC(CF_3)_2Ph)_4)$,
$(TlAl(OC(CF_3)_2Ph)_4)$, $(AgAl(OC(CF_3)_2Ph)_4)$, $(Ph_3CAl(OC(CF_3)_2Ph)_4)$,
$(LiAl(OC(CF_3)_2C_6H_4CH_3)_4)$, $(ThAl(OC(CF_3)_2C_6H_4CH_3)_4)$,
$(AgAl(OC(CF_3)_2C_6H_4CH_3)_4)$, $(Ph_3CAl(OC(CF_3)_2C_6H_4CH_3)_4)$,
$LiAl(OC(CF_3)_3)_4$, $ThAl(OC(CF_3)_3)_4$, $AgAl(OC(CF_3)_3)_4$,
$Ph_3CAl(OC(CF_3)_3)_4$, $LiAl(OC(CF_3)(CH_3)H)_4$, $TlAl(OC(CF_3)(CH_3)H)_4$,
$AgAl(OC(CF_3)(CH_3)H)_4$, $Ph_3CAl(OC(CF_3)(CH_3)H)_4$, $LiAl(OC(CF_3)_2H)_4$,
$TlAl(OC(CF_3)_2H)_4$, $AgAl(OC(CF_3)_2H)_4$, $Ph_3CAl(OC(CF_3)_2H)_4$,
$LiAl(OC(CF_3)_2C_6H_4-4-i-Pr)_4$, $TlAl(OC(CF_3)_2C_6H_4-4-i-Pr)_4$,
$AgAl(OC(CF_3)_2C_6H_4-i-Pr)_4$, $Ph_3CAl(OC(CF_3)_2C_6H_4-4-i-Pr)_4$,
$LiAl(OC(CF_3)_2C_6H_4-t-butyl)_4$, $TlAl(OC(CF_3)_2C_6H_4-t-butyl)_4$,
$AgAl(OC(CF_3)_2C_6H_4-4-t-butyl)_4$,
$Ph_3CAl(OC(CF_3)_2C_6H_4-4-t-butyl)_4$, $LiAl(OC(CF_3)_2C_6H_4-4-SiMe_3)_4$,
$TlAl(OC(CF_3)_2C_6H_4-4-Si Me_3)_4$, $AgAl(OC(CF_3)_2C_6H_4-4-SiMe_3)_4$,
$Ph_3CAl(OC(CF_3)_2C_6H-4-Si Me_3)_4$, $LiAl(OC(CF_3)_2C_6H_4-4-Si-i-Pr_3)_4$,
$TlAl(OC(CF_3)_2C_6H_4-4-Si-i-Pr_3)_4$, $AgAl(OC(CF_3)_2C_6H_4-4-Si-i-Pr_3)_4$,
$Ph_3CAl(OC(CF_3)_2C_6H-4-Si-i-Pr_3)_4$,
$LiAl(OC(CF_3)_2C_6H_2-2,6-(CF_3)_2-4-Si-i-Pr_3)_4$,
$TlAl(OC(CF_3)_2C_6H_2-2,6-(CF_3)_2-4-Si-i-Pr_3)_4$,
$AgAl(OC(CF_3)_2C_6H_2-2,6-(CF_3)_2-4-Si-i-Pr_3)_4$,
$Ph_3CAl(OC(CF_3)_2C_6H_2-2,6-(CF_3)_2-4-Si-i-Pr_3)_4$,
$LiAl(OC(CF_3)_2C_6H_3-3,5-(CF_3)_2)_4$, $TlAl(OC(CF_3)_2C_6H_3-3,5-(CF_3)_2)_4$,
$AgAl(OC(CF_3)_2C_6H_3-3,5-(CF_3)_2)_4$, $Ph_3CAl(OC(CF_3)_2C_6H_3-3,5-(CF_3)_2)_4$,
$LiAl(OC(CF_3)_2C_6H_2-2,4,6-(CF_3)_3)_4$, $TlAl(OC(CF_3)_2C_6H_2-2,4,6-(CF_3)_3)_4$, AgAl(OC(CF$_3$)$_2$C$_6$H$_2$-2,4,6-(CF$_3$)$_3$)$_4$,
Ph$_3$CAl(OC(CF$_3$)$_2$C$_6$H$_2$-2,4,6-(CF$_3$)$_3$)$_4$, LiAl(OC(CF$_3$)$_2$C$_6$F$_5$)$_4$,
TlAl(OC(CF$_3$)$_2$C$_6$F$_5$)$_4$, AgAl(OC(CF$_3$)$_2$C$_6$F$_5$)$_4$, and
Ph$_3$CAl(OC(CF$_3$)$_2$C$_6$F$_5$)$_4$.

Examples of boratobenzene salts include but are not limited to [1,4-dihydro-4-methyl-1-(pentafluorophenyl)]-2-borinyl lithium, [1,4-dihydro-4-methyl-1-(pentafluorophenyl)]-2-borinyl triphenylmethylium, 4-(1,1-dimethyl)-1,2-dihydro-1-(pentafluorophenyl)-2-borinyl lithium, 4-(1,1-dimethyl)-1,2-dihydro-1-(pentafluorophenyl)-2-borinyl triphenylmethylium, 1-fluoro-1,2-dihydro-4-(pentafluorophenyl)-2-borinyl lithium, 1-fluoro-1,2-dihydro-4-(pentafluorophenyl)-2-borinyl triphenylmethylium, 1-[3,5-bis(trifluoromethyl)phenyl]-1,2-dihydro-4-(pentafluorophenyl)-2-borinyl lithium, and 1-[3,5-bis(trifluoromethyl)phenyl]-1,2-dihydro-4-(pentafluorophenyl)-2-borinyl triphenylmethylium.

Examples of WCA carborane and halocarborane salts include but are not limited to silver dodecahydro-1-carbadodecaborate, LiCB$_{11}$(CH$_3$)$_{12}$, LiCB$_{11}$H$_{12}$, (Me$_3$NH)[CB$_{11}$H$_{12}$],
(Me$_4$N)[1–C$_2$H$_5$CB$_{11}$H$_{11}$], (Me$_4$N)[1-Ph$_3$SiCB$_{11}$H$_{11}$],
(Me$_4$N)[1-CF$_3$CB$_{11}$H$_{11}$], Cs[12-BrCB$_{11}$H$_{11}$], Ag[12-BrCB$_{11}$H$_{11}$],
Cs[7,12-Br$_2$CB$_{11}$H$_{10}$], Cs[12-ClCB$_{11}$H11], Cs[7,12-Cl$_2$CB$_{11}$H$_{10}$], Cs[1-H—CB$_{11}$F$_{11}$], Cs[1-CH$_3$—CB$_{11}$F$_{11}$], (i-Pr$_3$)Si[1-CF$_3$—CB$_{11}$F$_{11}$],
Li[12-CB$_{11}$H$_{11}$F], Li[7,12-CB$_{11}$H$_{11}$F$_2$], Li[7,9,12-CB$_{11}$H$_{11}$F$_3$],
(i-Pr$_3$)Si[CB$_{11}$H$_6$Br$_6$], Cs[CB$_{11}$H$_6$Br$_6$], Li[6-CB$_9$H$_9$F], Li[6,8-CB$_9$H$_8$F$_2$],
Li[6,7,8-CB$_9$H$_7$F$_3$], Li[6,7,8,9-CB$_9$H$_6$F$_4$], Li[2,6,7,8,9-CB$_9$H$_5$F$_5$],
Li[CB$_9$H$_5$Br$_5$], Ag[CB$_{11}$H$_6$Cl$_6$], Tl[CB$_{11}$H$_6$Cl$_6$], Ag[CB$_{11}$H$_6$F$_6$],
Tl[CB$_{11}$H$_6$F$_6$], Ag[CB$_{11}$H$_6$I$_6$], Tl[CB$_{11}$H$_6$I$_6$], Ag[CB$_{11}$H$_6$Br$_6$],
Tl[CB$_{11}$H$_6$Br$_6$], Li[6,7,9,10,11,12-CB$_{11}$H$_6$F$_6$], Li[2,6,7,8,9,10-CB$_9$H$_5$F$_5$],
Li[1-H—CB$_9$F$_9$], Ti[12-CB$_{11}$H$_{11}$(C$_6$H$_5$)], Ag[1–C$_6$F$_5$—CB$_{11}$H$_5$Br$_6$],
Li[CB$_{11}$Me$_{12}$], Li[CB$_{11}$(CF$_3$)$_{12}$], Li[CB$_{11}$H$_6$I$_6$], Li[CB$_9$H$_5$Br$_5$],
Li[Co(B$_9$C$_2$H$_{11}$)$_2$], Li[CB$_{11}$(CH$_3$)$_{12}$], Li[CB$_{11}$(C$_4$H$_9$)$_{12}$],
Li[CB$_{11}$(C$_6$H$_{13}$)$_{12}$], Na[Co(C$_2$B$_9$H$_{11}$)$_2$], and Na[Co(Br$_3$C$_2$B$_9$H$_8$)$_2$].

Additional halocarborane salts are disclosed in International Patent Publication WO 98/43983.

Monomers

The catalysts of the present invention are suitable for the preparation of a wide range of polymers comprising cyclic repeating units. The cyclic polymers are prepared by the addition polymerization of a polycycloolefin monomer(s) in the presence of a catalytic amount of a catalyst of Formula I or the procatalyst components described above. The monomer(s) can be polymerized via solution or mass polymerization techniques. As stated herein the terms "polycycloolefin," "polycyclic," and "norbornene-type" monomer are used interchangeably and mean that the monomer contains at least one norbornene moiety as shown below:

The simplest polycyclic monomer of the invention is the bicyclic monomer, bicyclo[2.2.1]hept-2-ene, commonly referred to as norbornene. The term norbornene-type monomer is meant to include norbornene, substituted norbornene(s), and any substituted and unsubstituted higher cyclic derivatives thereof so long as the monomer contains at least one norbornene-type or substituted norbornene-type moiety. Preferred substituted norbornene-type monomers and higher cyclic derivatives thereof contain a pendant hydrocarbyl substituent(s) or a pendant functional substituent(s) containing an oxygen atom. The preferred norbornene-type or polycycloolefin monomers are represented by the structure below:

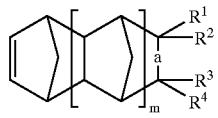

VII wherein "a" represents a single or double bond, $R^1$ to $R^4$ independently represents a hydrocarbyl or functional substituent, m is an integer from 0 to 5, and when "a" is a double bond one of $R^1$, $R^2$ and one of $R^3$, $R^4$ is not present.

When the substituent is a hydrocarbyl group, halohydrocarbyl, or perhalocarbyl group $R^1$ to $R^4$ independently represent hydrocarbyl, halogenated hydrocarbyl and perhalogenated hydrocarbyl groups selected from hydrogen, linear and branched $C_1$–$C_{10}$ alkyl, linear and branched, $C_2$–$C_{10}$ alkenyl, linear and branched $C_2$–$C_{10}$ alkynyl, $C_4$–$C_{12}$ cycloalkyl, $C_4$–$C_{12}$ cycloalkenyl, $C_6$–$C_{12}$ aryl, and $C_7$–$C_{24}$ aralkyl, $R^1$ and $R^2$ or $R^3$ and $R^4$ can be taken together to represent a $C_1$–$C_{10}$ alkylidenyl group. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, and decyl. Representative alkenyl groups include but are not limited to vinyl, allyl, butenyl, and cyclohexenyl. Representative alkynyl groups include but are not limited to ethynyl 1-propynyl, 2-propynyl, 1-butynyl, and 2-butynyl. Representative cycloalkyl groups include but are not limited to cyclopentyl, cyclohexyl, and cyclooctyl substituents. Representative aryl groups include but are not limited to phenyl, naphthyl, and anthracenyl. Representative aralkyl groups include but are not limited to benzyl, and phenethyl. Representative alkylidenyl groups include methylidenyl, and ethylidenyl, groups.

The preferred perhalohydrocarbyl groups include perhalogenated phenyl and alkyl groups. The halogenated alkyl groups useful in the invention are linear or branched and have the formula $C_zX''_{2z+1}$ wherein X" is a halogen as set forth above and z is selected from an integer of 1 to 10. Preferably X" is fluorine. Preferred perfluorinated substituents include perfluorophenyl, perfluoromethyl, perfluoroethyl, perfluoropropyl, perfluorobutyl, and perfluorohexyl. In addition to the halogen substituents, the cycloalkyl, aryl, and aralkyl groups of the invention can be further substituted with linear and branched $C_1$–$C_5$ alkyl and haloalkyl groups, aryl groups and cycloalkyl groups.

When the pendant group(s) is a functional substituent, $R^1$ to $R^4$ independently represent a radical selected from —(CH$_2$)$_n$C(O)NH$_2$, —(CH$_2$)$_n$C(O)Cl, —(CH$_2$)$_n$C(O)OR$^5$, —(CH$_2$)$_n$—OR$^5$, —(CH$_2$)$_n$—OC(O)R$^5$, —(CH$_2$)$_n$—C(O)R$^5$, —(CH$_2$)$_n$—OC(O)OR$^5$, —(CH$_2$)$_n$SiR$^5$, —(CH$_2$)$_n$Si(OR$^5$)$_3$, —(CH$_2$)$_n$C(O)OR$^6$, and the group:

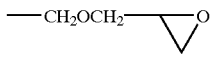

wherein n independently represents an integer from 0 to 10 and R$^5$ independently represents hydrogen, linear and branched C$_1$–C$_{10}$ alkyl, linear and branched, C$_2$–C$_{10}$ alkenyl, linear and branched C$_2$–C$_{10}$ alkynyl, C$_5$–C$_{12}$ cycloalkyl, C$_6$–C$_{14}$ aryl, and C$_7$–C$_{24}$ aralkyl. Representative hydrocarbyl groups set forth under the definition of R$^5$ are the same as those identified above under the definition of R$^1$ to R$^4$. As set forth above under R$^1$ to R$^4$ the hydrocarbyl groups defined under R$^5$ can be halogenated and perhalogenated. The R$^6$ radical represents an acid labile moiety selected from —C(CH$_3$)$_3$, —Si(CH$_3$)$_3$, —CH(R$^7$)OCH$_2$CH$_3$, —CH(R$^7$)OC(CH$_3$)$_3$ or the following cyclic groups:

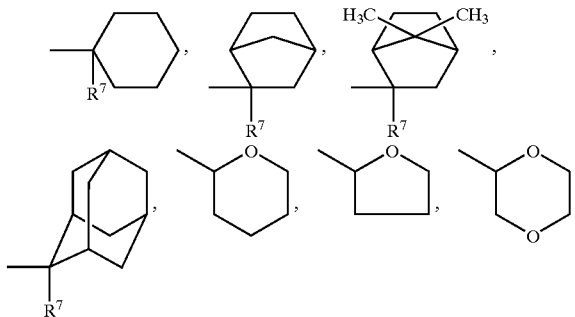

wherein R$^7$ represents hydrogen or a linear or branched (C$_1$–C$_5$) alkyl group. The alkyl groups include methyl, ethyl, propyl, i-propyl, butyl, i-butyl, t-butyl, pentyl, t-pentyl and neopentyl. In the above structures the single bond line projecting from the cyclic groups indicates the position where the cyclic protecting group is bonded to the acid substituent. Examples of R$^6$ radicals include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl.

The R$^6$ radical can also represent dicyclopropylmethyl (Dcpm), and dimethylcyclopropylmethyl (Dmcp) groups which are represented by the following structures:

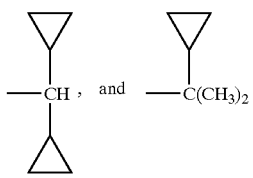

In Structure VII above, R$^1$ and R$^4$ together with the two ring carbon atoms to which they are attached can represent a substituted or unsubstituted cycloaliphatic group containing 4 to 30 ring carbon atoms or a substituted or unsubstituted aryl group containing 6 to 18 ring carbon atoms or combinations thereof. The cycloaliphatic group can be monocyclic or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, linear and branched C$_1$–C$_5$ alkyl, linear and branched C$_1$–C$_5$ haloalkyl, linear and branched C$_1$–C$_5$ alkoxy, halogen, or combinations thereof. R' and R$^4$ can be taken together to form the divalent bridging group, —C(O)—Q—(O)C—, which when taken together with the two ring carbon atoms to which they are attached form a pentacyclic ring, wherein Q represents an oxygen atom or the group N(R$^8$), and R$^8$ is selected from hydrogen, halogen, linear and branched C$_1$–C$_{10}$ alkyl, and C$_6$–C$_{18}$ aryl. A representative structure is shown in below.

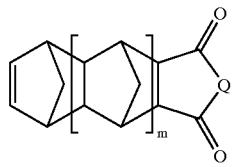

VIIa wherein m is an integer from 0 to 5.

Deuterium enriched norbornene-type monomers wherein at least one of the hydrogen atoms on the norbornene-type moiety and/or one at least one of the hydrogen atoms on a pendant hydrocarbyl substituent described under R$^1$ to R$^4$ have been replaced by a deuterium atom are contemplated within the scope of the present invention. Preferably at least 40 percent of the hydrogen atoms on the norbornene-type moiety and/or the hydrocarbyl substituent are replaced by deuterium, more preferably, at least about 50 percent, and still more preferably at least about 60 percent. Preferred deuterated monomers are represented by the structure below:

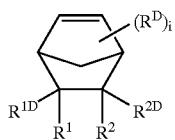

wherein R$^D$ is deuterium, "i" is an integer ranging from 0 to 6, with the proviso that when "i" is 0, at least one of R$^{1D}$ and R$^{2D}$ must be present, R$^1$ and R$^2$ independently represent a hydrocarbyl or functional substituent as defined above, and R$^{1D}$ and R$^{2D}$ may or may not be present and independently represent a deuterium atom or a deuterium enriched hydrocarbyl group containing at least one deuterium atom. Preferably the deuterated hydrocarbyl group is selected from linear and branched C$_1$–C$_{10}$ alkyl wherein at least 40 percent, preferably at least 50 percent and more preferably at least 60 percent of the hydrogen atoms on the carbon backbone are replaced by deuterium.

Crosslinked polymers can be prepared by copolymerizing the norbornene-type monomer(s) set forth under Structure VII above with a multifunctional norbornene-type or multifunctional polycycloolefin crosslinking monomer(s). By multifunctional norbornene-type or multifunctional polycycloolefin crosslinking monomer is meant that the crosslinking monomer contains at least two norbornene-type moieties, each functionality being addition polymerizable in the presence of the catalyst system of the present invention. The crosslinkable monomers include fused multicyclic ring systems and linked multicyclic ring systems. Examples of fused crosslinkers are illustrated in Structures VIIb to VIIg below. For brevity, norbornadiene is included as a fused multicyclic crosslinker.

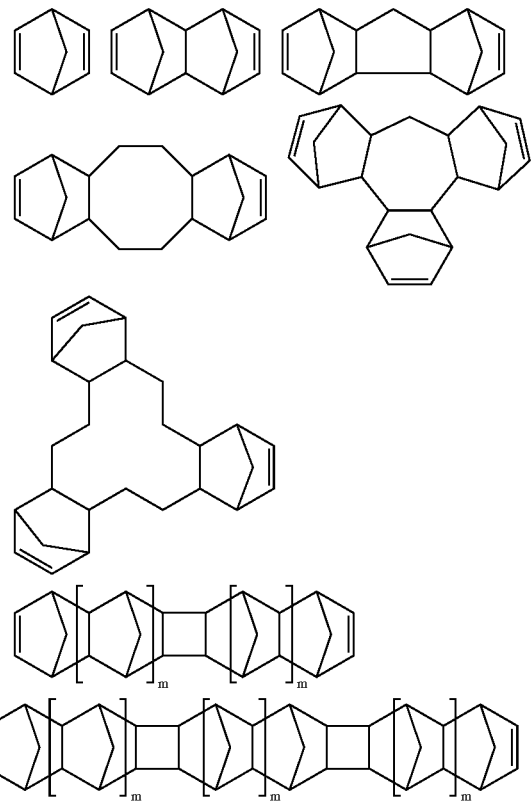

wherein m independently is an integer from 0 to 5.

A linked multicyclic crosslinker is illustrated generically in Structure VIII below.

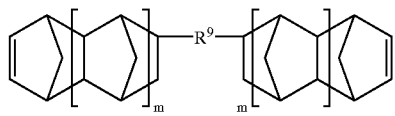

VIII wherein m independently is an integer from 0 to 5, $R^9$ is a divalent radical selected from divalent hydrocarbyl radicals and divalent ether radicals. By divalent is meant that a free valence at each terminal end of the radical is attached to a norbornene-type moiety. Preferred divalent hydrocarbyl radicals are alkylene radicals and divalent aromatic radicals. The alkylene radicals are represented by the formula —$(C_dH_{2d})$— where d represents the number of carbon atoms in the alkylene chain and is an integer from 1 to 10. The alkylene radicals are preferably selected from linear and branched ($C_1$–$C_{10}$) alkylene such as methylene, ethylene, propylene, butylene, pentylene, hexylene, heptylene, octylene, nonylene, and decylene. When branched alkylene radicals are contemplated, it is to be understood that a hydrogen atom in the alkylene backbone is replaced with a linear or branched ($C_1$ to $C_5$) alkyl group.

The divalent aromatic radicals are selected from divalent phenyl, and divalent naphthyl radicals. The divalent ether radicals are represented by the group —$R^{10}$—O—$R^{10}$—, wherein $R^{10}$ independently is the same as $R^9$. Examples of specific linked multicyclic crosslinkers are represented as in Structures VIIIa to VIIIe as follows.

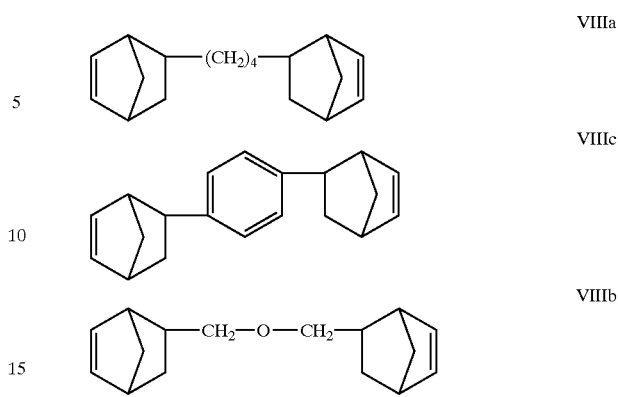

An economical route for the preparation of hydrocarbyl substituted and functionally substituted norbornene monomers relies on the Diels-Alder addition reaction in which CPD or substituted CPD is reacted with a suitable dienophile at elevated temperatures to form the substituted norbornene-type adduct generally shown by the following reaction scheme:

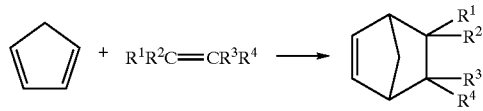

wherein $R^1$ to $R^4$ independently represent hydrogen, hydrocarbyl, and/or a functional group as previously described.

Other norbornene type adducts can be prepared by the thermal pyrolysis of dicyclopentadiene (DCPD) in the presence of a suitable dienophile. The reaction proceeds by the initial pyrolysis of DCPD to CPD followed by the Diels-Alder addition of CPD and the dienophile to give the adducts shown below:

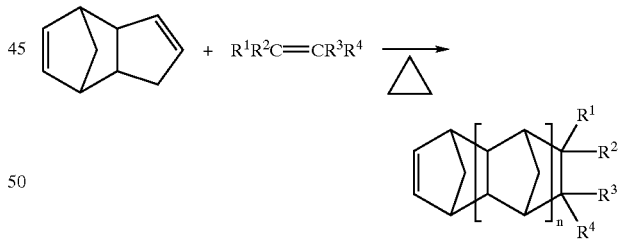

wherein n represents the number of cyclic units in the monomer and $R^1$ to $R^4$ independently represent hydrogen, hydrocarbyl, and/or a functional group as previously defined. Norbornadiene and higher Diels-Alder adducts thereof similarly can be prepared by the thermal reaction of CPD and DCPD in the presence of an acetylenic reactant as shown below.

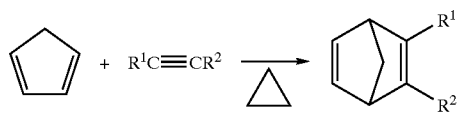

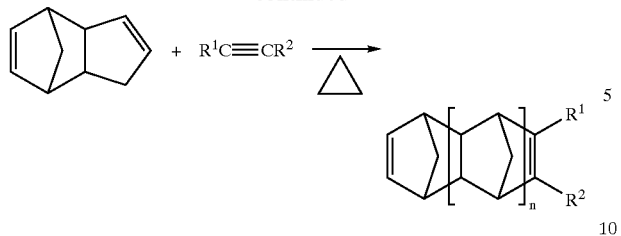

wherein n, $R^1$ and $R^2$ are as defined above.

Deuterium enriched norbornene-type monomers can be prepared by heating DCPD in the presence of $D_2O$ and a base such as NaOH to yield deuterated CPD which in turn can be reacted with a dienophile (Eq. 1) or a deuterated dienophile (Eq. 2) to give the respective deuterated norbornene containing a pendant deuterated hydrocarbyl substituent or a pendant hydrocarbyl substituent. In another embodiment non-deuterated CPD can be reacted with a deuterium enriched dienophile to yield norbornene containing a deuterium enriched hydrocarbyl pendant group (Eq. 3).

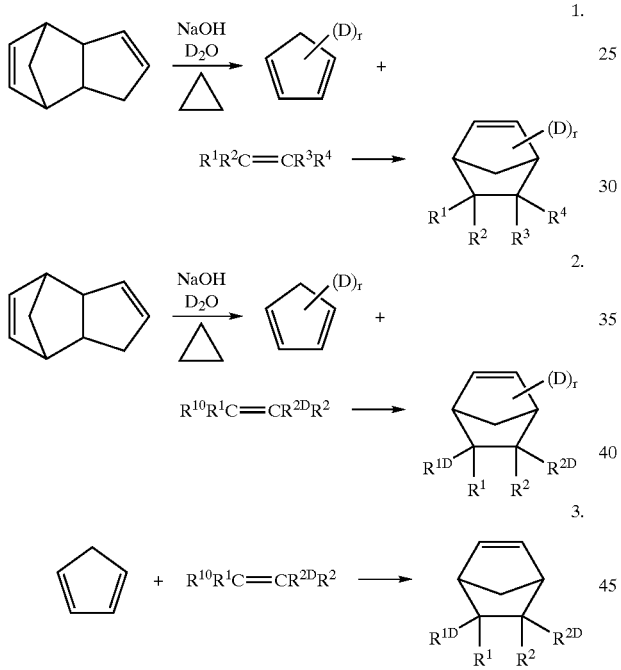

In Eq. 1 and Eq. 2 above, $R^1$ to $R^4$, $R^{1D}$ and $R^{2D}$ are as previously defined, and i' is an integer ranging from 1 to 6.

Examples of polymerizable norbornene-type monomers include but are not limited to norbornene (bicyclo[2.2.1]hept-2-ene), 5-ethylidenenorbornene,
dicyclopentadiene,
5tricyclo[5.2.1.0$^{2,6}$]deca-8-ene,
5-methoxycarbonylbicyclo[2.2.1]hept-2-ene,
5-methylbicyclo[2.2.1]hept-2-ene-5-carboxylic acid,
5-methylbicyclo[2.2.1]hept-2-ene,
5-ethylbicyclo[2.2.1]hept-2-ene,
5-ethoxycarbonylbicyclo[2.2.1]hept-2-ene,
5-n-propoxycarbonylbicyclo[2.2.1]hept-2-ene,
5-i-propoxycarbonylbicyclo[2.2.1]hept-2-ene,
5-n-butoxycarbonylbicyclo[2.2.1]hept-2-ene,
5-(2-methylpropoxy)carbonylbicyclo[2.2.1]hept-2-ene,
5-(1-methylpropoxy)carbonylbicyclo[2.2.1]hept-2-ene,
5-t-butoxycarbonylbicyclo[2.2.1]hept-2-ene,
5-cyclohexyloxycarbonylbicyclo[2.2.1]hept-2-ene,
5-(4'-t-butylcyclohexyloxy)carbonylbicyclo[2.2.1]hept-2-ene,
5-phenoxycarbonylbicyclo[2.2.1]hept-2-ene,
5-tetrahydrofuranyloxycarbonylbicyclo[2.2.1]hept-2-ene,
5-tetrahydropyranyloxycarbonylbicyclo[2.2.1]hept-2-ene,
bicyclo[2.2.1]hept-2-ene-5-carboxylic acid,
5-acetyloxybicyclo[2.2.1]hept-2-ene,
5-methyl-5-methoxycarbonylbicyclo[2.2.1]hept-2-ene,
5-methyl-5-ethoxycarbonylbicyclo[2.2.1]hept-2-ene,
5-methyl-5-n-propoxycarbonylbicyclo[2.2.1]hept-2-ene,
5-methyl-5-i-propoxycarbonylbicyclo[2.2.1]hept-2-ene,
5-methyl-5-n-butoxycarbonylbicyclo[2.2.1]hept-2-ene,
5-methyl-5-(2-methylpropoxy)carbonylbicyclo[2.2.1]hept-2-ene,
5-methyl-5-(1-methylpropoxy)carbonylbicyclo[2.2.1]hept-2-ene,
5-methyl-5-t-butoxycarbonylbicyclo[2.2.1]hept-2-ene,
5-methyl-5-cyclohexyloxycarbonylbicyclo[2.2.1]hept-2-ene,
5-methyl-5-(4'-t-butylcyclohexyloxy)carbonylbicyclo[2.2.1]hept-2-ene,
5-methyl-5-phenoxycarbonylbicyclo[2.2.1]hept-2-ene,
5-methyl-5-tetrahydrofaranyloxycarbonylbicyclo[2.2.1]hept-2-ene,
5-methyl-5-tetrahydropyranyloxycarbonylbicyclo[2.2.1]hept-2-ene,
5-methyl-5-acetyloxybicyclo[2.2.1]hept-2-ene,
5-methyl-5-cyanobicyclo[2.2.1]hept-2-ene,
5,6-di(methoxycarbonyl)bicyclo[2.2.1]hept-2-ene,
5,6-di(ethoxycarbonyl)bicyclo[2.2.1]hept-2-ene,
5,6-di(n-propoxycarbonyl)bicyclo[2.2.1]hept-2-ene,
5,6-di(i-propoxycarbonyl)bicyclo[2.2.1]hept-2-ene,
5,6-di(n-butoxycarbonyl)bicyclo[2.2.1]hept-2-ene,
5,6-di(t-butoxycarbonyl)bicyclo[2.2.1]hept-2-ene,
5,6-di(phenoxycarbonyl)bicyclo[2.2.1]hept-2-ene,
5,6-di(tetrahydrofuranyloxycarbonyl)bicyclo[2.2.1]hept-2-ene,
5,6-di(tetrahydropyranyloxycarbonyl)bicyclo[2.2.1]hept-2-ene, and
5,6-dicarboxyanhydridebicyclo[2.2.1]hept-2-ene,
8-methoxycarbonyltetracyclo[4.4.0.1$^{2,5}$.1$^{7,10}$]dodec-3-ene,
8-ethoxycarbonyltetracyclo[4.4.0.1$^{2,5}$.1$^{7,10}$]dodec-3-ene,
8-n-propoxycarbonyltetracyclo[4.4.0.1$^{2,5}$.1$^{7,10}$]dodec-3-ene,
8-i-propoxycarbonyltetracyclo[4.4.0.1$^{2,5}$.1$^{7,10}$]dodec-3-ene,
8-n-butoxycarbonyltetracyclo[4.4.0.1$^{2,5}$.1$^{7,10}$]dodec-3-ene,
8-(2-methylpropoxy)carbonyltetracyclo[4.4.0.1$^{2,5}$.1$^{7,10}$]dodec-3-ene,
8-(1-methylpropoxy)carbonyltetracyclo[4.4.0.1$^{2,5}$.1$^{7,10}$]dodec-3-ene.
8-t-butoxycarbonyltetracyclo[4.4.0.1$^{2,5}$.1$^{7,10}$]dodec-3-ene, 8-cyclohexyloxycarbonyltetracyclo[4.4.0.1$^{2,5}$.1$^{7,10}$]dodec-3-ene, 8-(4'-t-butylcyclohexyloxy)carbonyltetracyclo[4.4.0.1$^{2,5}$.1$^{7,10}$]dodec-3-ene.

8-phenoxycarbonyltetracyclo[4.4.0.1$^{2,5}$1.$^{7,10}$]dodec-3-ene, 8-tetrahydrofuranyloxycarbonyltetracyclo[4.4.0.1$^{2,5}$.1$^{7,10}$]-3-dodecene, 8-tetrahydropyranyloxycarbonyltetracyclo[4.4.0.1$^{2,5}$.1$^{7,10}$]dodec-3-ene, 8-acetyloxytetracyclo[4.4.0.1$^{2,5}$.1$^{7,10}$]dodec-3-ene 8-methyl-8-methoxycarbonyltetracyclo[4.4.0.1$^{2,5}$.1$^{7,10}$]dodec-3-ene, 8-methyl-8-ethoxycarbonyltetracyclo[4.4.0.1$^{2,5}$.1$^{7,10}$]dodec-3-ene, 8-methyl-8-n-propoxycarbonyltetracyclo[4.4.0.1$^{2,5}$.1$^{7,10}$]dodec-3-ene, 8-methyl-8-i-propoxycarbonyltetracyclo[4.4.0.1$^{2,5}$.1$^{7,10}$]dodec-3-ene, 8-methyl-8-n-butoxycarbonyltetracyclo[4.4.0.1$^{2,5}$.1$^{7,10}$]dodec-3-ene, 8-methyl-8-(2-methylpropoxy)carbonyltetracyclo[4.4.0.1$^{2,5}$.1$^{7,10}$]dodec-3-ene, 8-methyl-8-(1-methylpropoxy)carbonyltetracyclo[4.4.0.1$^{2,5}$.1$^{7,10}$]dodec-3-ene, 8-methyl-8-t-butoxycarbonyltetracyclo[4.4.0.1$^{2,5}$.1$^{7,10}$]dodec-3-ene, 8-methyl-8-cyclohexyloxycarbonyltetracyclo[4.4.0.1$^{2,5}$.1$^{7,10}$]dodec-3-ene, 8-methyl-8-(4'-t-butylcyclohexyloxy)carbonyltetracyclo[4.4.0.1$^{2,5}$.1$^{7,10}$]dodec-3-ene, 8-methyl-8-phenoxycarbonyltetracyclo[4.4.0.1$^{2,5}$.1$^{7,10}$]dodec-3-ene, 8-methyl-8-tetrahydrofuranyloxycarbonyltetracyclo[4.4.0.1$^{2,5}$.1$^{7,10}$]-dodecene, 8-methyl-8-tetrahydropyranyloxycarbonyltetracyclo[4.4.0.1$^{2,5}$.1$^{7,10}$]-3-dodecene, 8-methyl-8-acetyloxytetracyclo[4.4.0.1$^{2,5}$.1$^{7,10}$]dodec-3-ene, 8-methyl-8-cyanotetracyclo[4.4.0.1$^{2,5}$.1$^{7,10}$]dodec-3-ene, 8,9-di(methoxycarbonyl)tetracyclo[4.4.0.1$^{2,5}$.1$^{7,10}$]dodec-3-ene, 8,9-di(ethoxycarbonyl)tetracyclo[4.4.0.1$^{2,5}$.1$^{7,10}$]dodec-3-ene, 8,9-di(n-propoxycarbonyl)tetracyclo[4.4.0.1$^{2,5}$.1$^{7,10}$]dodec-3-ene, 8,9-di(i-propoxycarbonyl)tetracyclo[4.4.0.1$^{2,5}$.1$^{7,10}$]dodec-3-ene, 8,9-di(n-butoxycarbonyl)tetracyclo[4.4.0.1$^{2,5}$.1$^{7,10}$]dodec-3-ene, 8,9-di(t-butoxycarbonyl)tetracyclo[4.4.0.1$^{2,5}$.1$^{7,10}$]dodec-3-ene, 8,9-di(cyclohexyloxycarbonyl)tetracyclo[4.4.0.1$^{2,5}$.1$^{7,10}$]dodec-3-ene, 8,9-di(phenoxycarbonyl)tetracyclo[4.4.0.1$^{2,5}$.1$^{7,10}$]dodec-3-ene, 8,9-di(tetrahydrofuranyloxycarbonyl)tetracyclo[4.4.0.1$^{2,5}$.1$^{7,10}$]-3-dodecene, 8,9-di(tetrahydropyranyloxycarbonyl)tetracyclo[4.4.0.1$^{2,5}$.1$^{7,10}$]-dodecene, 8,9-dicarboxyanhydridetetracyclo[4.4.0.1$^{2,5}$.1$^{7,10}$]dodec-3-ene, tetracyclo[4.4.0.1$^{2,5}$.1$^{7,10}$]dodec-3-ene, tetracyclo[4.4.0.1$^{2,5}$.1$^{7,10}$]dodec-3-ene-8-carboxylic acid, 8-methyltetracyclo[4.4.0.1$^{2,5}$.1$^{7,10}$]dodec-3-ene-8-carboxylic acid, 8-methyltetracyclo[4.4.0.1.$^{2,5}$.1$^{7,10}$]dodec-3-ene, 8-ethyltetracyclo[4.4.0.1$^{2,5}$.1$^{7,10}$]dodec-3-ene, 8-fluorotetracyclo[4.4.0.1.$^{2,5}$.1$^{7,10}$]dodec-3-ene, 8-fluoromethyltetracyclo[4.4.0.1$^{2,5}$.1$^{7,10}$]dodec-3-ene, 8-difluoromethyltetracyclo[4.4.0.1$^{2,5}$.1$^{7,10}$]dodec-3-ene, 8-trifluoromethyltetracyclo[4.4.0.1$^{2,5}$.1$^{7,10}$]dodec-3-ene, 8-pentafluoroethyltetracyclo[4.4.0.1$^{2,5}$.1$^{7,10}$]dodec-3-ene, 8,8-difluorotetracyclo[4.4.0.1$^{2,5}$.1$^{7,10}$]dodec-3-ene, 8,9-difluorotetracyclo[4.4.0.1$^{2,5}$.1$^{7,10}$]dodec-3-ene, 8,8-bis(trifluoromethyl)tetracyclo[4.4.0.1$^{2,5}$.1$^{7,10}$]dodec-3-ene, 8,9-bis(trifluoromethyl)tetracyclo[4.4.0.1$^{2,5}$.1$^{7,10}$]dodec-3-ene, 8-methyl-8-trifluoromethyltetracyclo[4.4.0.1$^{2,5}$.1$^{7,10}$]dodec-3-ene, 8,8,9-trifluorotetracyclo[4.4.0.1$^{2,5}$.1$^{7,10}$]dodec-3-ene, 8,8,9-tris(trifluoromethyl)tetracyclo[4.4.0.1$^{2,5}$.1$^{7,10}$]dodec-3-ene, 8,8,9,9-tetrafluorotetracyclo[4.4.0.1$^{2,5}$.1$^{7,10}$]dodec-3-ene, 8,8,9,9-tetrakis(trifluoromethyl)tetracyclo[4.4.0.1$^{2,5}$.1$^{7,10}$]dodec-3-ene, 8,8-difluoro-9,9-bis(trifluoromethyl)tetracyclo[4.4.0.1$^{2,5}$.1$^{7,10}$]dodec-3-ene, 8,9-difluoro-8,9-bis(trifluoromethyl)tetracyclo[4.4.0.1$^{2,5}$.1$^{7,10}$]dodec-3-ene, 8,8,9-trifluoro-9-trifluoromethyltetracyclo[4.4.0.1$^{2,5}$.1$^{7,10}$]dodec-3-ene, 8,8,9-trifluoro-9-trifluoromethoxytetracyclo[4.4.0.1$^{2,5}$.1$^{7,10}$]dodec-3-ene.

8,8,9-trifluoro-9-pentafluoropropoxytetracyclo[4.4.0.1$^{2,5}$.1$^{7,10}$]dodec-3-ene, 8-fluoro-8-pentafluoroethyl-9,9-bis(trifluoromethyl)tetracyclo[4.4.0.1$^{2,5}$.1$^{7,10}$]dodec-3-ene, 8-9-difluoro-8-heptafluoroisopropyl-9-trifluoromethyltetracyclo[4.4.0.1$^{2,5}$.1$^{7,10}$]dodec-3-ene, 8-chloro-8,9,9-trifluorotetracyclo[4.4.0.1$^{2,5}$.1$^{7,10}$]dodec-3-ene, 8,9-dichloro-8,9-bis(trifluoromethyl)tetracyclo[4.4.0.1$^{2,5}$.1$^{7,10}$]dodec-3-ene, 8-(2,2,2-trifluorocarboxyethyl)tetracyclo[4.4.0.1$^{2,5}$.1$^{7,10}$]dodec-3-ene, 8-methyl-8-(2,2,2-trifluorocarboxyethyl)tetracyclo[4.4.0.1$^{2,5}$.1$^{7,10}$]dodec-3-ene, tricyclo[4.4.0.1$^{2,5}$]undeca-3-ene, tricyclo[6.2.1.0$^{18}$]undeca-9-ene, tetracyclo[4.4.0..1$^{2,5}$.1$^{7,10}$.0$^{1,6}$]dodec-3-ene, 8-methyltetracyclo[4.4.0.1$^{2,5}$.1$^{7,10}$.0$^{1,6}$]dodec-3-ene, 8-ethylidenetetracyclo[4.4.0.1$^{2,5}$.1$^{7,12}$]dodec-3-ene, 8-ethylidenetetracyclo[4.4.0.1$^{2,5}$.1$^{7,10}$.0$^{1,6}$]dodec-3-ene, pentacyclo[6.5.1.1$^{3,6}$.0$^{2,7}$.0$^{9,13}$]pentadeca-4-ene, and pentacyclo[7.4.0.1$^{2,5}$.1$^{9,12}$.0$^{8,13}$]pentadeca-3-ene In another embodiment of the invention the polymer can be crosslinked during a post polymerization curing step (latent crosslinking). In this embodiment a norbornene-type monomer containing a pendant post crosslinkable functional group is copolymerized into the polycyclic backbone whereupon the functional group is subsequently crosslinked via well known techniques. By post crosslinkable functional group is meant that the functional group is inert to the initial polymerization reaction but is receptive to subsequent chemical reactions to effect the crosslinking of adjacent polymer chains.

Suitable post crosslinkable monomers are set forth under Structure VII wherein at least one of $R^1$ to $R^4$ is selected from linear and branched, $C_2$–$C_{10}$ alkenyl, $C_4$–$C_{10}$ cycloalkenyl, —$(CH_2)_n Si(OR^5)_3$, wherein n and $R^5$ are as defined above, $R^1$ and $R^2$ or $R^3$ and $R^4$ can be taken together to represent a $C_1$–$C_{10}$ alkylidenyl radical, fused cyclic groups wherein $R^1$ and $R^4$ taken together with the two ring carbon atoms to which they are attached form an unsaturated $C_4$ to $C_8$ ring. Preferred post crosslinkable alkenyl functional groups include vinyl, butenyl, and cyclohexyl. Preferred alkylidenyl groups include methylidenyl and ethylidenyl substituents. Preferred alkoxysilyl groups include trimethoxysilyl and triethoxysilyl moieties. Preferred crosslinkers containing fused multicyclic ring systems include dicyclopentadiene (DCPD) and unsymmetrical trimer of cyclopentadiene (CPD).

The latent crosslinkable pendant groups can be reacted via a variety chemistries known to initiate the reaction of the various functional groups. For example, the alkenyl, cycloalkenyl, and alkylidenyl groups can be crosslinked via a free radical mechanism. The alkoxysilyl groups can be crosslinked via a cationic reaction mechanism. Representative monomers that contain post crosslinkable functional groups are represented below.

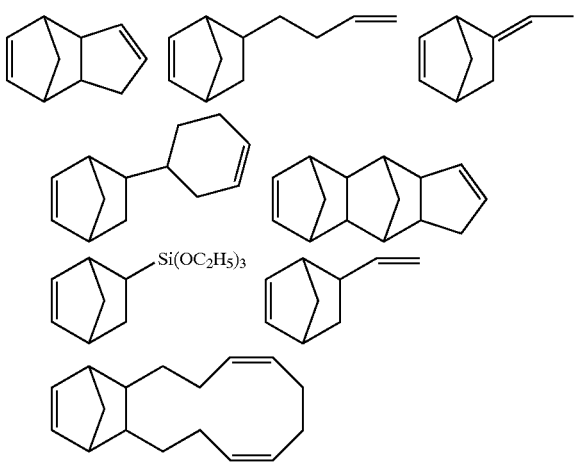

In the latent crosslinking embodiment of the invention the crosslinking reaction step can be induced by a free radical initiator. Suitable initiators are those that can be activated thermally or photochemically. The initiator is added to the reaction medium and the polymerization of the monomer mixture is allowed to proceed to completion. A key consideration, however, is that the radical generating compound employed be stable (does not decompose) at the polymerization temperature of the monomeric reaction medium. When utilizing thermally activated free radical generators, latent crosslinking is induced by exposing the polymer medium to temperatures above the decomposition temperature of the free radical generating compound. In embodiments utilizing photoinitiated free radical generators, latent crosslinking is induced by exposing the polymer medium to a radiation source such as e-beam and UV radiation. Suitable free radical generator compounds (crosslinking agents) include the organic peroxides and aliphatic azo compounds. The aliphatic azo compounds are suitable initiators for the thermal and photochemical activated crosslinking embodiments of the invention, while the organic peroxides are suitable for use in as thermally activated initiators only. The amount of crosslinking agent employed ranges from about 0.005 part by weight to about 5.0 parts by weight based on 100 parts by weight of monomer in the reaction medium.

Suitable organic peroxide include but are not limited to dibenzoyl peroxide, di(2,4-dichlorobenzoyl)peroxide, diacetyl peroxide, diisobutyryl peroxide, dilauroyl peroxide, t-butylperbenzoate, t-butylperacetate, 2,5-di(benzoylperoxy)-1,2-dimethylhexane, di-t-butyl diperoxyazelate, t-butyl peroxy-2-ethylhexanoate, t-amyl peroctoate, 2,5-di(2-ethylhexanoylperoxy)-2,5-dimethylhexane, t-butylperoxyneodecanoate, ethyl 3,3-di(t-butylperoxy)butyrate, 2,2-di(t-butylperoxy)butane, 1,1-di(t-butylperoxy)cyclohexane, 1,1-di(t-butylperoxy)-3,3,5-trimethylcyclohexane, 2,5-di(t-butylperoxy)-2,5-dimethylhex-3-yne, di-t-butyl peroxide, 2,5-di(t-butylperoxy)-2,5-dimethylhexane, dicumyl peroxide, n-propyl peroxydicarbonate, i-propyl peroxydicarbonate, cyclohexyl peroxydicarbonate, and acetyl peroxydicarbonate.

Suitable azo compounds include but are not limited to
2,2'-azobis[2,4-dimethyl]pentane,
2-(t-butylazo)-4-methoxy-2,4-dimethylpentanenitrile,
2,2'-azobis(i-butyronitrile), 2-(t-butylazo)-2,4-dimethylpentanenitrile,
2-(t-butylazo)i-butyronitrile, 2-(t-butylazo)-2-methylbutanenitrile,
1,1-azobis-cyclohexanecarbonitrile,
1-(t-amylazo)cyclohexanecarbonitrile, and
1-(t-butylazo)cyclohexanecarbonitrile.

The decomposition temperatures of the foregoing free radical generator compounds are well known in the art and can be selected on the basis of the polymerization temperatures employed in initial reaction. In other words the initiator compound must be stable at the polymerization temperatures so it is available for the post polymerization crosslinking reaction. As discussed above latent crosslinking is can be effected by thermal or photochemical means.

As discussed above, monomers containing trialkoxysilyl groups can be crosslinked by latent crosslinking in the presence of a cationic initiator agent. A polymerization stable cationic initiator can be can be thermally activated to induce the latent crosslinking of the silyl groups. Suitable cationic crosslinking initiators include, for example, dibutyltin diluarate, dimethyltin diluarate, and dioctyltin diluarate.

The amount of multifunctional norbornene-type crosslinkable monomers and post crosslinkable monomers that are optionally present in the reaction mixture can range from about 0.1 mole percent to about 50 mole percent based on the total monomer in the monomer mixture to be reacted. Preferably, the amount of crosslinker ranges from about 1 mole percent to about 25 mole percent of the total monomer mixture and most preferably from about 1 mole percent to about 10 mole percent.

Monomer Polymerization

The monomers of the invention are polymerized in solution or in mass. The catalyst is added to the reaction medium containing the desired monomer(s) as a preformed single component catalyst or the catalyst can be formed in situ by admixing the procatalyst component, the Group 15 electron donor component, and the WCA salt activator component in the reaction medium. When the procatalyst is ligated with the Group 15 electron donor component, it is not necessary to employ the Group 15 electron donor as a separate component. In one in situ embodiment the ligated procatalyst component (e.g., containing desired ligand group(s)) is admixed with the WCA salt activator component in the reaction medium. In another in situ embodiment a procatalyst component with or without ligands is admixed with a desired ligand containing component(s) and the WCA salt activator component in the reaction medium. The procatalyst components are generically exemplified in the preformed catalyst preparation equations (1) to (4) set forth above. The preferred molar ratio of procatalyst (based on the Group 10 metal):Group 15 electron donor component:WCA salt is 1:1–10:1–100, more preferably, 1:1–5:1–20, and most preferably, 1:1–2:1–5. In embodiments of the invention where the procatalyst is ligated with a Group 15 electron donor ligand and/or a labile neutral electron donor ligand, the molar ratio of procatalyst (based on the metal content) to WCA salt 1:1–100, preferably, 1:1–20, and more preferably, 1:1–5. The order of addition of the various catalyst components to the reaction medium is not important.

The polymers prepared by the process of the invention are addition polymers of polycycloolefinic repeating units linked through 2,3-enchainment. The repeating units are polymerized from a polycycloolefin monomer or combination of polycycloolefin monomers that contain at least one norbornene-type moiety as described herein.

Solution Process

In the solution process the polymerization reaction can be carried out by adding a solution of the preformed catalyst or individual catalyst components to a solution of the cycloolefin monomer or mixtures of monomers to be polymerized. The amount of monomer in solvent preferably ranges from 10 to 50 weight percent, and more preferably 20 to 30 weight percent. After the single component catalyst or catalyst components are added to the monomer solution, the reaction medium is agitated (e.g., stirred) to ensure complete mixing of catalyst and monomer components.

The polymerization reaction temperatures can range from about 0° C. to about 150° C., preferably from about 10° C. to about 100° C., and more preferably from about 20° C. to about 80° C.

Examples of solvents for the polymerization reaction include but are not limited to alkane and cycloakane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; aromatic solvents such as benzene, xylene, toluene, mesitylene, chlorobenzene, and o-dichlorobenzene, Freon® 112 halocarbon solvent, water; or mixtures thereof. Preferred solvents include cyclohexane, toluene, mesitylene, dichloromethane, 1,2-dichloroethane, and water.

Surprisingly, it has been found that the catalysts of the invention are highly active in the polymerization of cycloolefins. The catalysts exhibit activities at monomer to procatalyst or catalyst metal molar ratios of over 100,000:1. Preferred monomer to procatalyst or catalyst ratios range from about 100,500:1 to about 1,000,000:1, more preferably from about 110,000:1 to about 500,000:1 and most preferably from about 120,000:1 to about 250,000:1 While these catalysts have been found to be active at monomer to catalyst metal molar ratios of over 100,000:1, it is within the scope of this invention to utilize monomer to catalyst metal molar ratios of less than 100,000:1 depending on the use desired for the polymer.

When an aqueous polymerization medium is desired it is preferable that the Group 15 electron donor ligand or component be chosen from the water soluble phosphines set forth above. The polymerization reaction can be conducted in suspension or emulsion. In suspension, the monomers are suspended in an aqueous medium containing a suspension agent selected from one or more water soluble substances such as, for example, polyvinyl alcohol, cellulose ether, partially hydrolyzed polyvinyl acetate, or gelatin and then carrying out the reaction in the presence of the catalyst system of the invention.

The emulsion polymerization can in general be carried out by emulsifying the monomers in water or a mixed solvent of water and a water-miscible organic solvent (such as methanol, or ethanol), preferably in the presence of at least one emulsifying agent and then carrying out the emulsion polymerization in the presence of the catalyst of the invention. Emulsifying agents include, for example, mixed acid soaps containing fatty and rosin acids, alkyl sulfonate soaps and soaps of oligomeric naphthalene sulfonates.

Mass Process

In the mass polymerization process according to the invention a two component catalyst system is preferably employed in the polymerization of the cycloolefinic monomer(s). The term mass polymerization refers to a polymerization reaction which is generally carried out in the substantial absence of a solvent. In some cases, however, a small proportion of solvent is present in the reaction medium. Small amounts of solvent can be conveyed to the reaction medium via the introduction of the catalyst system components which are in some cases dissolved in solvent. Solvents also can be employed in the reaction medium to reduce the viscosity of the polymer at the termination of the polymerization reaction to facilitate the subsequent use and processing of the polymer. The amount of solvent that can be present in the reaction medium ranges from 0 to about 20 percent, preferably from 0 to about 10 percent and, more preferably from 0 to about 1 percent, based on the weight of the monomer(s) present in the reaction mixture. Preferred solvents are those that are utilized in dissolving the catalyst system components. Examples of solvents include but are not limited to alkane and cycloalkane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; esters such as ethylacetate, i-amylacetate; ethers such as THF and diethylether; aromatic solvents such as benzene, xylene, toluene, mesitylene, chlorobenzene, and o-dichlorobenzene; and halocarbon solvents such as Freon® 112; and mixtures thereof. Preferred solvents include benzene, fluorobenzene, o-difluorobenzene, p-difluorobenzene, pentafluorobenzene, hexafluorobenzene, o-dichlorobenzene, chlorobenzene, toluene, o-, m-, and p-xylenes, mesitylene, cyclohexane, ethylacetate, THF, and dichloromethane.

A ligated procatalyst containing a Group 15 electron donor ligand is prepared in solvent and then added to the desired monomer or mixture of monomers containing the dissolved WCA salt activator. The reaction mixture is mixed and the reaction is permitted to proceed from about 1 minute to about 2 hours. The reaction mixture can be optionally heated at a temperature ranging from about 20° C. to about 200° C. The polymerization temperature is not specifically limited, but is usually in the range of 20° C. to 120° C., preferably 20° C. to 90° C. The polymerization reaction can be carried out under an inert atmosphere such as nitrogen or argon. Advantageously, however, it has been found that the catalyst system components of the invention are moisture and oxygen insensitive, allowing for less stringent handling and processing conditions. Following the initial polymerization reaction a polymer cement is obtained. The cement can be applied to a desired substrate or conveyed into a mold and post cured to complete the polymerization reaction.

Without wishing to be bound by theory of invention it is believed that post curing is desirable from the standpoint of monomer to polymer conversion. In a mass process the monomer is essentially the diluent for the catalyst system components. As monomer is converted to polymer a plateau is reached beyond which conversion of monomer to polymer can go no higher (vitrification). This conversion barrier results from the loss of reactant mobility as the reaction medium becomes converted to a polymeric matrix. Consequently, the catalyst system components and unconverted monomer become segregated and can not react. It is well known that diffusivity within a polymer decreases dramatically as the polymer passes from the rubbery state to the glassy state. It is believed that post curing at elevated temperatures increases the mobility of the reactants in the matrix allowing for the further conversion of monomer to polymer.

Post curing of the polymers of the present invention is preferably conducted at elevated temperatures for a time period sufficient to reach a desired conversion of monomer to polymer. The post curing cycle is preferably conducted for 1 to 2 hours over a temperature range of from about 100° C. to about 300° C., preferably from about 125° C. to about 200° C., and more preferably from about 140° C. to about 180° C. The cure cycle can be effected at a constant temperature or the temperature can be ramped, e.g., incrementally increasing the curing temperature from a desired minimum curing temperature to a desired maximum curing temperature over the desired curing cycle time range. In one embodiment (A) the temperature ramping can be effected by following a gradual increasing slope on a temperature vs. time plot from the desired minimum temperature to the desired maximum temperature in the cure cycle. In this embodiment when the maximum temperature is reached, the temperature maximum can optionally be held for a desired period of time until the desired cure state is attained. In an alternate embodiment (B) the temperature ramping can follow a stepwise curve on a temperature vs. time plot. In this embodiment the temperature ramping proceeds in step fashion from the desired minimum cure temperature to the desired maximum cure temperature in the cure cycle. In another embodiment (C) the post cure can be effected by combining post cure embodiments (A and B) wherein the cure cycle encompasses a combination of steps and slopes from the desired minimum cure temperature to the desired maximum cure temperature. In still another embodiment (D and E) the cure cycle can follow a curve from the desired minimum cure temperature to the desired maximum cure temperature. In embodiments A, B, and C it should be noted that the rise and run of the slope do not have to be constant between the minimum and maximum cure temperatures of the cure cycle. In other words the rise and run can vary when proceeding from the desired minimum to desired maximum cure temperatures The foregoing cure cycle temperature ramping curves are illustrated below.

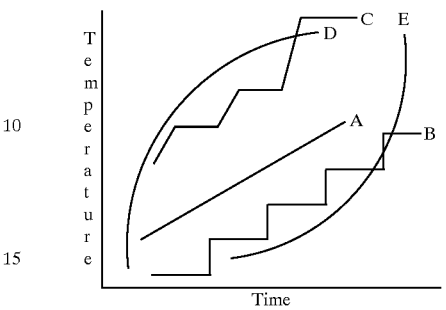

Ramping of the temperature during the cure cycle is preferable because it diminishes the potential for catalyst degradation and the boiling of unconverted monomer.

Optionally, additives include but not limited to those selected from of blowing agents, foaming agents, pigments, dyes, fillers such as mica, germania, titania, zirconia, boron nitrides, silicon nitrides, silicon carbides, barium titanate, lead magnesium niobate-lead titanate (Tamtron® Y5V183U dielectric filler available from Tam Ceramics), gold coated polymer latices, silver particles, plasticizers, lubricants, flame retardants, tackifiers, antioxidants, fibers, antioxidants, UV stabilizers, masking agents, odor absorbing agents, crosslinking agents, tougheners and impact modifiers, polymeric modifiers and viscosifiers and mixtures thereof, can be added by mixing one or more of them into the monomer medium before the polymerization reaction is initiated. The identity and relative amounts of such components are well known to those skilled in the art and need not be discussed in detail here.

The optional additives are employed to enhance the processing, appearance and/or the physical properties of the polymer. For example, the additives can be utilized to enhance and modify inter alia the coefficient of thermal expansion, stiffness, impact strength, dielectric constant, solvent resistance, color, and odor of the polymer product. The viscosifiers are employed to modify the viscosity and shrinkage of the monomeric mixture before the polymerization reaction is initiated. Suitable viscosity modifiers include elastomers and the norbornene-type polymers of the present invention. The viscosity modifiers can be dissolved in the polymerizable monomers of the invention to increase the viscosity of the monomer reaction mixture. As discussed above, crosslinking can be effected during the initial polymerization reaction of the monomer mixture or during a post polymerization thermal or photochemical curing step.

When employed in the mass polymerization system of the invention, the preferred molar ratio of monomer to procatalyst (based on metal content) to WCA salt activator ratios preferably ranges from about 500,000:1:1 to about 5,000:1:20, more preferably from about 250,000:1:5 to about 20,000:1:10, and most preferably from about 200,000:1:20 to about 100,000:1:1.

The polymers produced by the foregoing processes are useful inter alia in electronic and optical applications. In electronic applications uses include but are not limited to dielectric films (i.e., multichip modules and flexible circuits), chip attach adhesives, underfill adhesives, chip encapsulants, glob tops, near hermetic board and chip protective coatings, embedded passives, laminating adhesives, capacitor dielectrics, high frequency insulator/connectors, high voltage insulators, high temperature wire coatings, conductive adhesives, reworkable adhesives, photosensitive adhesives and dielectric film, resistors, inductors, capacitors, antennas and printed circuit board substrates. In optical applications uses include but are not limited to optical films, ophthalmic lenses, wave guides, optical fiber, photosensitive optical film, specialty lenses, windows, high refractive index film, laser optics, color filters, optical adhesives, and optical connectors.

Due to the high activity of the Group 10 catalysts of the present invention, the amount of Group 10 residual metal in the polymer product (absent any purification) is preferably less than about 100 ppm, more preferably less than about 50 ppm, even more preferably less than 10 ppm, and most preferably less than 5 ppm, wherein the residual metal to polymer is calculated on a weight to weight basis.

The following examples are detailed descriptions of methods of preparation and use of certain compositions of the present invention. The detailed preparation descriptions fall within the scope of, and serve to exemplify, the more generally described methods set forth above.

The examples are presented for illustrative purposes only, and are not intended as a restriction on the scope of the invention.

EXAMPLE 1

Procatalyst A. (Allyl)palladium(tricyclohexylphosphine) chloride. To (allyl)palladium chloride dimer (1.00 g, 2.73 mmol) was added about 75 ml of toluene to give a yellow solution with a small amount of insolubles. To this mixture was added tricyclohexylphosphine (1.55 g, 5.54 mmol) dissolved in about 20 ml of toluene. A clear yellow solution resulted which was allowed to stir at room temperature for 2 hours. The solvent was removed in vacuo to yield a pale yellow powder which was dissolved in THF and stirred overnight. The THF was then removed in vacuo to give an off-white powder which was washed with 50 ml of ether three times. The resulting free-flowing, off-white powder was dried in vacuo. Yield 1.6 g (63%). $^{31}$P NMR (CD$_2$Cl$_2$): δ 41.1(s). $^1$H NMR (CD$_2$Cl$_2$): δ 5.40 (m, 1H), 4.49 (br t, 1H), 3.49 (d of d, 1H), 3.42 (s, 1H), 2.59 (d, 1H), 2.14 (m, 3H), 1.90 (br s, 6H), 1.80 (s, 6H), 1.72 (s, 3H), 1.47 (br s, 6H), 1.27 (s, 9H).

EXAMPLE 2

Procatalyst B. (Allyl)palladium(tricyclohexylphosphine) triflate. A methylene chloride solution of (allyl)palladium (tricyclohexylphosphine)chloride (1.00 g, 2.16 mmol) was added to a methylene chloride solution of silver triflate (0.565 g, 2.20 mmol). The reaction mixture was shielded from room light and allowed to stir for 18 hours. The resulting slurry was filtered to yield a light yellow filtrate. The methylene chloride was removed in vacuo to give a free-flowing white powder. Yield 1.05 g (84%). $^{31}$P NMR (C$_6$D$_6$): 42.2 (s). $^1$H NMR (C$_6$D$_6$): δ 5.10 (t, 1H), 4.66 (m, 1H), 3.64 (d of d, 1H), 2.62 (s, 1H), 1.95 (d, 1H), and peaks from 1.9 to 1.0 due to tricyclohexylphosphine. Crystals of this material were grown from methylene chloride/pentane solution. The results of a x-ray crystal structure determination are presented in FIG. 1.

EXAMPLE 3

(Allyl)palladium trifluoroacetate dimer. Approximately 1.60 g (4.34 mmol) of (allyl)palladium chloride dimer was dissolved in methylene chloride. This solution was added to a methylene chloride solution of silver trifluoroacetate 2.02 g (9.14 mmol) which was cooled to −10° C. The mixture was allowed to stir for 3 hours. The resulting cloudy solution was filtered to yield a bright, yellow filtrate. Removal of solvent in vacuo gave a yellow powder. $^1$H NMR (CD$_2$Cl$_2$): δ 5.63 (br s, 1H), 4.13 (d, 2H), 3.08 (d, 2H).

EXAMPLE 4

Procatalyst C. (Allyl)palladium(tricyclohexylphosphine)trifluoroacetate. (Allyl)palladium trifluoroacetate dimer (1.00 g, 1.91 mmol) was dissolved in THF at −78° C. To this solution was added tricyclohexylphosphine (1.12 g, 4.00 mmol) in THF. The yellow solution became colorless. After 20 minutes the solution was allowed to warm to room temperature and stir for 2 hours. The solvent was removed in vacuo to give an off-white powder. Yield 0.96 g (47%). $^{31}$P NMR (CD$_2$Cl$_2$): δ 41.7 (s). $^1$H NMR (CD$_2$Cl$_2$): δ 5.47 (m, 1H), 4.78 (t, 1H), 3.82 (d of d, 1H), 3.24 (s, 1H), 2.50 (d, 1H), and peaks from 1.9 to 1.0 due to tricyclohexylphosphine.

EXAMPLE 5

Procatalyst D. {2-[(dimethylamino)methyl]phenyl-C,N-} palladium(tricyclohexylphosphine)chloride. Di-μ-chlorobis{2-[(dimethylamino)methyl]phenyl-C,N-} dipalladium (1.00 g, 1.81 mmol) was dissolved in THF (60 ml). To this solution was added tricyclohexylphosphine (1.00, 3.57 mmol) in 10 ml of THF. The mixture was allowed to stir overnight after which the solvents were removed in vacuo. The resulting solid was dissolved in methylene chloride and allowed to stir for 1 hour. The solvent was removed in vacuo. To the solid was added an 80:20 mixture of pentane:ether. The solvent was decanted. To this solid was added cyclohexane followed by filtration to yield a white solid which was dried in vacuo. Yield 0.96 g (48%). $^{31}$P NMR (CD$_2$C$_{12}$): δ 43.4 (s). $^1$H NMR (CD$_2$Cl$_2$): δ 7.22 (m, 1H), 6.98 (d, 1H), 6.90 (m, 2H), 3.93 (s, 2H), 2.58 (d, 6H), and peaks from 2.4 to 1.0 due to tricyclohexylphosphine.

EXAMPLE 6

Procatalyst E. {2-[(dimethylamino)methyl]phenyl-C,N-} palladium(tricyclohexylphosphine)triflate. {2-[(dimethylamino)methyl]phenyl-C,N-}palladium (tricyclohexylphosphine)chloride (0.500 g, 0.899 mmol) was dissolved in fluorobenzene. To this solution was added silver triflate (0.231 g, 0.899 mmol) in a fluorobenzene/ether solution. The reaction mixture turned yellow with precipitation of a white solid. The mixture was allowed to stir for 64 hours. The white solid was filtered off and the solvent was removed in vacuo from the yellow filtrate to give a white solid. $^{31}$P NMR (CD$_2$Cl$_2$): δ 42.1(s).

EXAMPLE 7

Procatalyst F. (Allyl)palladium(tri-o-tolylphosphine) chloride. To (allyl)palladium chloride dimer (1.50 g, 4.10 mmol) solution in about 25 ml of methylene chloride was added tri-o-tolylphosphine (2.50 g, 8.22 mmol) as a methylene chloride solution. The solution was allowed to stir overnight. The solvent was removed in vacuo to yield a pale yellow powder. Yield 3.50 g (88%). $^{31}$P NMR (CD$_2$Cl$_2$): δ 21.4 (s). $^1$H NMR (CD$_2$Cl$_2$): δ 7.58 (br t, 3H), 7.40 (t, 3H), 7.24 (m, 6H), 5.60 (m, 1H), 4.57 (t, 1H), 3.55 (d of d, 1H), 3.16 (br s, 1H), 2.19 (s, 9H).

EXAMPLE 8

Figure 2:
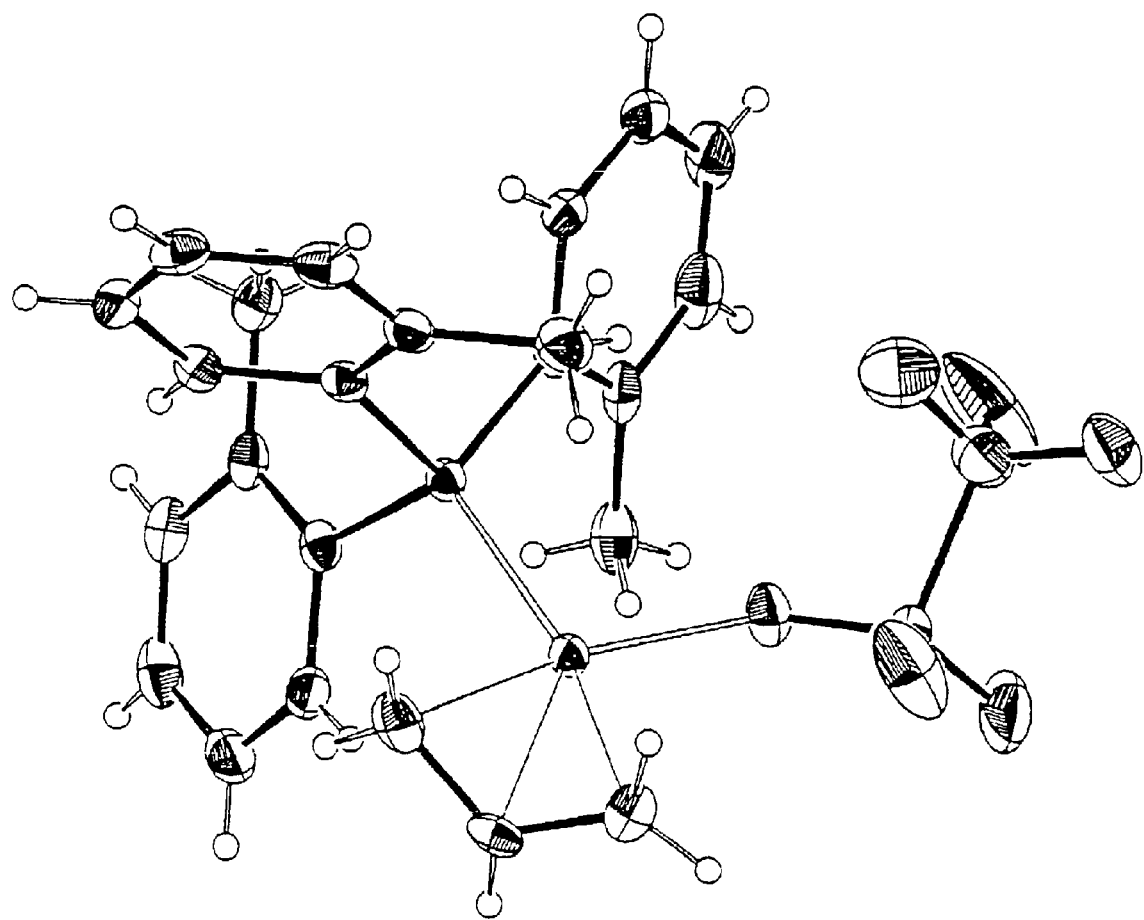
FIG. 2 represents an ORTEP of (allyl)palladium(tri-o-tolylphosphine)(triflate).

Procatalyst G. (Allyl)palladium(tri-o-tolylphosphine) triflate. To a methylene chloride solution (10 ml) of (allyl)

palladium chloride dimer (1.50 g, 4.10 mmol) was added a methylene chloride solution (10 ml) of tri-o-tolylphosphine (2.50 g, 8.22 mmol). This solution was added to a methylene chloride solution of silver triflate (1.81 g, 8.19 mmol). A precipitate formed immediately. The reaction mixture was shielded from room light and allowed to stir overnight. The resulting slurry was filtered through Celite® to yield an orange filtrate. The methylene chloride was removed in vacuo to give a yellow powder which was washed with pentane twice, an 80:20 mixture of pentane:ether, then dried in vacuo. Yield 4.05 g (91%). $^{31}$P NMR (CD$_2$Cl$_2$): 21.4 (s). $^1$H NMR (CD$_2$Cl$_2$): δ 7.44 (m, 6H), 7.26 (m, 6H), 5.70 (br s, 1H), 5.10 (br s, 1H), 3.95 (br s, 1H), 3.20 (br s, 1H), 2.37 (br s, 1H), 2.19 (s, 9H). Crystals of this material were grown from methylene chloride/pentane solution. The results of a x-ray crystal structure determination are presented in FIG. 2.

EXAMPLE 9

Procatalyst H. (Allyl)palladium(tri-o-tolylphosphine) nitrate. To a suspension of silver nitrate (0.935 g, 5.50 mmol) in methylene chloride was added a methylene chloride solution of (allyl)palladium chloride dimer (1.00 g, 2.73 mmol) and tri-o-tolylphosphine (1.66 g, 5.46 mmol). After stirring the mixture overnight, the mixture was filtered to give an orange filtrate. This solution was concentrated and layered with pentane. The resulting white solid was isolated. $^{31}$P NMR (CD$_2$Cl$_2$): 20.3 (s). $^1$H NMR (CD$_2$Cl$_2$): δ 7.50–7.20 (m, 12H), 5.70 (m, 1H), 4.85 (t, 1H), 3.95 (d of d, 1H), 2.60 (br s, 2H), 2.20 (s, 9H).

EXAMPLE 10

Procatalyst I. (Allyl)palladium(tri-o-tolylphosphine) acetate. To a suspension of silver acetate (0.919 g, 5.50 mmol) in methylene chloride was added a methylene chloride solution of (allyl)palladium chloride dimer (1.00 g, 2.73 mmol) and tri-o-tolylphosphine (1.66 g, 5.46 mmol). After stirring the mixture overnight, the mixture was filtered to give an orange filtrate. This solution was concentrated and layered with pentane. The resulting white solid was isolated. $^{31}$P NMR (CD$_2$Cl$_2$): 20.8 (s). $^1$H NMR (CD$_2$Cl$_2$): δ 7.50–7.20 (m, 12H), 5.60 (m, 1H), 4.67 (t, 1H), 3.80 (d of d, 1H), 2.50 (br s, 2H), 2.20 (s, 9H).

EXAMPLE 11

Procatalyst J. (β-pinenyl)palladium chloride dimer. To a slurry of palladium(II)trifluoroacetate (0.5 g, 1.5 mmol) in acetone was added β-pinene (0.23 ml, 1.5 mmol). After 45 minutes, NBu$_4$Cl (0.460 g, 1.65 mmol) in acetone was added and the reaction mixture was stirred for 10 minutes. Some black solid was filtered off and the solvent was removed in vacuo. The solid residue was dissolved in chloroform. Addition of pentane gave a brown oil and a yellow solution. From the yellow solution a yellow solid was obtained by removal of solvent in vacuo. Yield 0.2 g.

EXAMPLE 12

Procatalyst K. (Allyl)palladium iodide dimer. (Allyl) palladium chloride dimer (1.0 g, 2.7 mmol) was dissolved in acetone (25 ml). To this solution was added an aqueous solution (10 ml) of sodium iodide (2.0 g, 13.3 mmol). The solution immediately turned orange and a yellow solid formed. The mixture was stirred for 30 minutes and solution was isolated by decantation. The solvent was removed in vacuo to give a solid which was extracted with chloroform. The chloroform extract was dried in vacuo to give an orange-brown solid. Yield 0.66 g (44%). $^1$H NMR (C$_6$D$_6$): δ 4.32 (m, 1H), 3.78 (d, 2H), 2.40 (d, 2H). A peak was observed at 548 by FD-MS with the expected isotope pattern for two palladium and two iodine atoms.

EXAMPLE 13

Catalyst L. (Allyl)palladium(tricyclohexylphosphine)(ether)][tetrakis (bis(3,5-trifluoromethyl)phenyl)borate]. (Allyl)palladium (tricyclohexylphosphine)chloride (1.00 g, 2.73 mmol) was dissolved in ether and cooled to −78° C. Methylmagnesium bromide (720 μl of 3 m solution in ether, 2.16 mmol) was added drop wise. The mixture was stirred at −78° C. for 1 hour after which the solvent was removed in vacuo. The solid was extracted twice with pentane and filtered. The solution was stored at −20° C. overnight. A precipitate formed and the flask was further cooled to −78° C. The resulting solid was collected and dried. Yield 0.5 g (52%). NMR spectra are in agreement with the formation of (allyl) palladium(tricyclohexylphosphine)(methyl). $^{31}$P NMR (CD$_2$Cl$_2$): δ 42.3 (s). $^1$H NMR (CD$_2$Cl$_2$): δ 4.99 (m, 1H), 3.45 (d, 1H), 3.31 (br t, 1H), 2.39 (d of d, 1H), 2.33 (d, 1H), 2.00 (m, 31H), 1.86 (br s, 6H), 1.78 (br s, 6H), 1.71 (s, 3H), 1.39 (br s, 6H), 1.24 (br s, 9H).

A flask was charged with (allyl)palladium (tricyclohexylphosphine)(methyl) (0.26 g, 0.58 mmol) and H(Et$_2$O)$_2$[tetrakis(bis(3,5-trifluoromethyl)phenyl)borate] (0.59 g, 0.58 mmol). The contents of the flask were cooled to −78° C. and 15 ml of ether was added. The mixture was warmed slightly to facilitate dissolution and then cooled to −78° C. After stirring for 3 hours, the solvent was removed in vacuo to give a brown-yellow solid. After washing with pentane twice and drying in vacuo a beige crystalline solid was isolated. Yield 0.69 g (87%). $^{31}$P NMR (CD$_2$Cl$_2$): δ 43.1(s). $^1$H NMR (CD$_2$Cl$_2$): δ 7.72 (s, 8H), 7.56 (s, 4H), 5.83 (br m, 1H), 5.15 (br s, 1H), 4.05 (br s, 1H), 3.95 (br s, 1H), 3.44 (q, 4H), 3.20 (br s, 1H), 1.16 (t, 6H), and peaks from 2.05 to 1.1 due to tricyclohexylphosphine.

EXAMPLE 14

Procatalyst M. {2-[1-(dimethylamino)ethyl]phenyl-C,N-}palladium (tricyclohexylphosphine)chloride. (+)-Di-μ-chlorobis {2-[1-(dimethylamino)ethyl]phenyl-C,N-}dipalladium (0.65 g, 1.1mmol) was dissolved in methylene chloride. To this solution was added 10 ml of a methylene chloride solution of tricyclohexylphosphine (0.63 g, 2.2 mmol). After 10 hours, the solvent was removed in vacuo. To the yellow residue was added pentane. The yellow pentane solution was decanted from some insolubles. Then the pentane was pumped off from the solution to give a light yellow powder. $^{31}$P NMR (CD$_2$Cl$_2$): δ 41.8 (s). $^1$H NMR (CD$_2$Cl$_2$): δ 7.22 (m, 1H), 6.93 (m, 2H), 6.86 (m, 1H), 3.65 (m, 1H), 2.55 (d, 6H), 1.75 (d, 1H), and peaks from 2.5 to 1.1 due to tricyclohexylphosphine.

EXAMPLE 15

Procatalyst N. Preparation of bis(tricyclohexylphosphine) (hydrido)palladium(II)chloride.

To a slurry of (1,5-cyclooctadiene)palladium(II)chloride (2.0 g) in 20 ml methanol was added 1.67 g of a 25 wt. % solution of sodium methoxide in methanol diluted with 20 ml methanol. After 0.5 hours, (2-methoxy-3-cyclooctenyl) palladium chloride dimer was isolated as a white powder by filtration in air and dried under vacuum (1.67 g, 85%).

To a slurry of (2-methoxy-3-cyclooctenyl)palladium chloride dimer (500 mg) in 25 ml methanol was added tricyclohexylphosphine (1.0 g) as a solid. The reaction was stirred until it became homogeneous. Stirring was stopped and the solution was cooled in a −20° C. freezer. The product was isolated as a gray crystalline solid by filtration in air and dried under vacuum (900 mg, 72%).

EXAMPLE 16

Catalyst O. Preparation of bis(tricyclohexylphosphine)(hydrido)palladium(II)nitrate.

To a slurry of tricyclohexylphosphine (4.86 g) in 75 ml ethanol was added palladium(II)nitrate (2.0 g) as a solid at −35° C. A yellow precipitate formed immediately. After 1.5 hours, toluene (150 ml) was added and the reaction warmed to −5° C. Sodium borohydride (0.33 g) was added in 25 ml ethanol, and the reaction was allowed to warm to room temperature. After 40 hours, the reaction was filtered and the solvent removed to give a tan solid. The product was washed with 75 ml ethyl ether and several times with hexane. Recrystallization from toluene/hexane gave the product as tan crystals (3.3 g, 53%).

EXAMPLE 17

Catalyst P. Synthesis of (allyl)platinum chloride tetramer. (Allyl)platinum chloride tetramer was synthesized according to J. Lukas in *Inorganic Synthesis* 1974, 15, 79.

EXAMPLE 18

Procatalyst Q. Synthesis of (methallyl)nickel (tricyclohexylphosphine)(triflate). (Methallyl) nickelchloride dimer (2.0 g, 0.0066 mmol) was added to a flask along with tricyclohexylphosphine (3.42 g, 0.0133 mmol). Methylene chloride (25 ml) was added to the flask to give an orange-yellow solution. Silver triflate (3.72 g, 0.0133 mmol) was mixed with methylene chloride (10 ml) in an amber vial. The nickel solution was added to the silver mixture. Immediate precipitation of silver chloride was noted. The mixture was allowed to stir for 3 hours at room temperature. The mixture was filtered through Celite® to give an orange-yellow filtrate. The solvent was removed in vacuo to give a yellow solid. Yield 5.44 g (75%). $^{31}$P NMR (CDCl$_3$): δ 33.2 (s). $^1$H NMR (CDCl$_3$): δ 4.49 (s, 1H), 3.19 (s, 1H), 2.24 (s, 3H), 2.11 (s, 1H), and peaks from 2.0 to 1.1 due to tricyclohexylphosphine.

EXAMPLE 19

Procatalyst R. Synthesis of (allyl)platinum (tricyclohexylphosphine)(chloride). (Allyl)platinum chloride tetramer (0.20 g, 0.18 mmol) was suspended in 25 ml of methylene chloride. Tricyclohexylphosphine (0.21 g, 0.74 mmol) was dissolved in methylene chloride and added to the platinum solution. A yellow solution resulted with some insolubles. The mixture was allowed to stir for 2 days. A tan solution and solid resulted. The volatiles were pumped away to give a tan solid. Yield 0.25 g (63%).

EXAMPLE 20

Procatalyst S. Synthesis of (allyl)platinum (tricyclohexylphosphine)(triflate). (Allyl)platinum (tricyclohexylphosphine)(chloride) (0.25 g, 0.45 mmol) was dissolved in toluene and filtered to remove small amount of insolubles. The resulting filtrate was added to a toluene slurry of silver triflate (0.11 g, 0.45 mmol). The mixture was stirred for 2 hours, then filtered to give a yellow filtrate. The solvent was removed in vacuo to give a tan solid.

EXAMPLE 21

Figure 3:
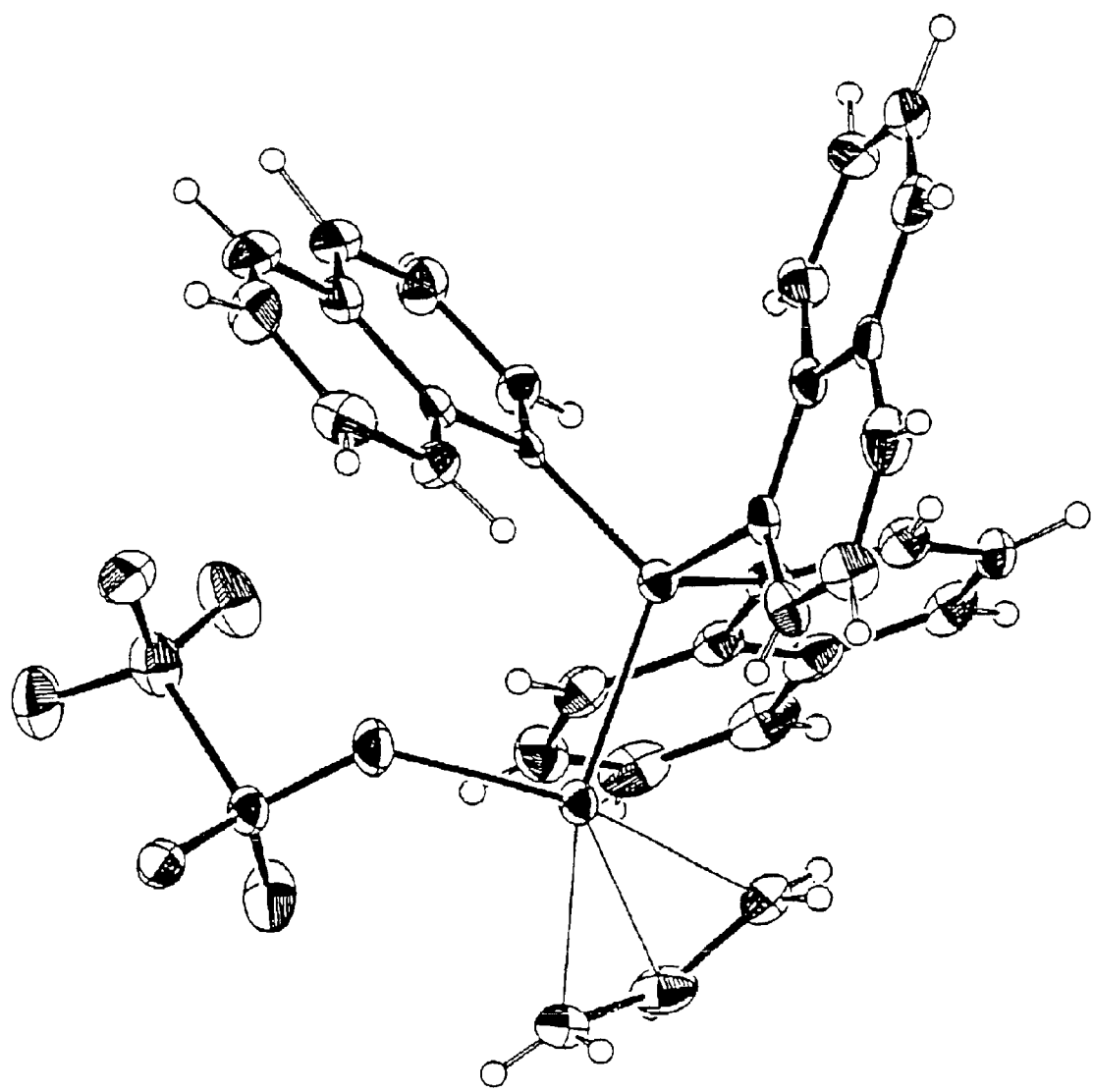
FIG. 3 represents an ORTEP of (allyl)palladium(tri-naphthylphosphine)(triflate)

Procatalyst T. Synthesis of (allyl)palladium (trinaphthylphosphine)(triflate). Trinaphthylphosphine (1.6 g, 3.5 mmol, 90%) and (allyl)palladium chloride dimer (0.61 g, 1.7 mmol) were added to a flask that was cooled to −10° C. To this mixture was added methylene chloride (25 ml) drop-wise to give a light yellow mixture. The slurry was warmed at room with stirring. The mixture turned orange-brown. After 6 hours, the solution was added to a suspension of silver triflate (0.85 g, 3.3 mmol) in 25 ml of methylene chloride. A white precipitate formed. After 16 hours the mixture was filtered. The filtrate was pumped to dryness giving a brown solid. Yield 2.3 g (96%). The solid was recrystallized from methylene chloride/pentane. $^{31}$P NMR (CDCl$_3$): δ 20.7 (br s). $^1$H NMR (CDCl$_3$): δ 8.3–7.3 (m, 21H), 5.54 (br s, 1H), 5.18 (br t, 1H), 3.91 (m, 1H), 3.03 (br s, 1H), 2.25 (br s, 1H). Crystals of this material were grown from methylene chloride/pentane solution. The results of a x-ray crystal structure determination are presented in FIG. 3.

EXAMPLE 22

Procatalyst U. A suspension of (allyl)palladium (trinaphthylphosphine)(triflate) (0.50 g, 0.70 mmol) in 100 ml of toluene was added to a slurry of ether-free lithium tetrakiis(pentafluorophenyl)borate (0.48 g, 0.70 mmol) in toluene. After stirring the mixture for 30 minutes, the solution was filtered through Celite® to give a yellow filtrate. The solution was concentrated in vacuo and layered with pentane to give an orange oil. The solvent was decanted and the oil was washed with pentane and then dried in vacuo and then washed twice more with pentane and dried to give an light orange solid.

EXAMPLE 23

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 Et$_2$O (0.6 mg, 0.0006 mmol). This mixture was diluted with 38 ml of toluene. Approximately 10 μl of a toluene solution of (allyl)palladium chloride dimer (6.23 mMol) and 10 μl of a toluene solution of tricyclohexylphosphine (12.5 mMol) was diluted to about 1 ml total with toluene and added to the monomer solution. The mixture was heated to 65° C. for 4 hours. The resulting viscous mixture was poured into acetone to precipitate the polymer which was redissolved into toluene and reprecipitated into methanol which was filtered and dried in vacuo overnight. Yield 6.2 g (62%).

EXAMPLE 24

To a mixture of butylnorbornene (8.41 g, 56.1mmol) and 5-triethoxysilylnorbornene (1.59 g, 6.21 mmol) was added lithium tetrakis(pentafluorophenyl)borate·2.5 Et$_2$O (0.6 mg, 0.0006 mmol). This mixture was diluted with 38 ml of toluene. Approximately 10 μl of a toluene solution of (allyl)palladium chloride dimer (6.23 mMol) and 50 μl of a toluene solution of tricyclohexylphosphine (12.5 mMol) was diluted to about 1 ml total with toluene and added to the monomer solution. The mixture was heated to 65° C. for 4 hours. The resulting viscous mixture was poured into acetone to precipitate the polymer which was redissolved into toluene and reprecipitated into methanol which was filtered and dried in vacuo overnight. Yield 6.4 g (64%).

EXAMPLE 25

To a mixture of butylnorbornene (8.41 g, 56.1 mmol) and 5-triethoxysilylnorbornene (1.59 g, 6.2 mmol) was added lithium tetrakis(pentafluorophenyl)borate·2.5 Et$_2$O (0.3 mg, 0.0004 mmol). This mixture was diluted with 38 ml of toluene. Approximately 10 μl of a toluene solution of (allyl)palladium chloride dimer (6.23 mMol) and 10 μl of a toluene solution of tricyclohexylphosphine (12.5 mMol) was diluted to about 1 ml total with toluene and added to the monomer solution. The mixture was heated to 65° C. for 4 hours. The resulting viscous mixture was poured into acetone to precipitate the polymer which was redissolved into toluene and reprecipitated into methanol, filtered and dried in vacuo overnight. Yield 6.1 g (61%).

EXAMPLE 26

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (0.1 mg, 0.00006 mmol). This mixture was diluted with 3 8 ml of toluene. Approximately 10 μl of a toluene solution of (allyl)palladium chloride dimer (6.23 mMol) and 10 μl of a toluene solution of tricyclohexylphosphine (12.5 mMol) was diluted to about 1 ml total with toluene and added to the monomer solution. The mixture was heated to 65° C. for 4 hours. The resulting viscous mixture was poured into acetone to precipitate the polymer which was redissolved into toluene and reprecipitated into methanol, filtered and dried in vacuo overnight. Yield 2.4 g (24%).

EXAMPLE 27

Comparative

To a mixture of butylnorbornene (8.41 g, 56.1 mmol) and 5-triethoxysilylnorbornene (1.59 g, 6.21 mmol) was added lithium tetrafluoroborate (0.1 mg, 0.0006 mmol). This mixture was diluted with 38 ml of toluene. Approximately 10 μl of a toluene solution of (allyl)palladium chloride dimer (6.23 mMol) and 10 μl of a toluene solution of tricyclohexylphosphine (12.5 mMol) was diluted to about 1 ml total with toluene and added to the monomer solution. The mixture was heated to 65° C. for 4 hours. The solution did not become viscous and, upon addition to acetone, no polymer was observed.

EXAMPLE 28

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1 mg, 0.0013 mmol). This mixture was diluted with 32 ml of toluene. Approximately 20 μl of a toluene solution of (allyl)palladium chloride dimer (0.623 mMol) and 20 μl of a toluene solution of triphenylphosphine (12.5 mMol) was diluted to about 1 ml total with toluene and added to the monomer solution. The mixture was heated to 65° C. for 4 hours. The resulting viscous mixture was poured into acetone to precipitate the polymer which was filtered and dried in vacuo overnight. Yield 5.2 g (52%).

EXAMPLE 29

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1 mg, 0.0012 mmol). This mixture was diluted with 32 ml of toluene. Approximately 10 μl of a toluene solution of (allyl)palladium chloride dimer (12.5 mMol) and 20 μl of a toluene solution of tricyclohexylphosphine (12.5 mMol) was diluted to about 1 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 8.2 g (82%).

EXAMPLE 30

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1mg, 0.0012 mmol). This mixture was diluted with 32 ml of toluene. Approximately 80 μl of a toluene solution of (allyl)palladium trifluoroacetate dimer (1.6 mMol) and 20 μl of a toluene solution of tricyclohexylphosphine (12.5 mMol) was diluted to about 1 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 9.3 g (93%).

EXAMPLE 31

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1 mg, 0.0012 mmol). This mixture was diluted with 32 ml of toluene. Approximately 40 μl of a toluene solution of (allyl)palladium trifluoroacetate dimer (1.6 mMol) and 20 μl of a toluene solution of tricyclohexylphosphine (12.5 mMol) was diluted to about 1 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 8.3 g (83%).

EXAMPLE 32

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1 mg, 0.0012 mmol). This mixture was diluted with 32 ml of toluene. Approximately 20 μl of a toluene solution of (allyl)palladium trifluoroacetate dimer (1.6 mMol) and 20 μl of a toluene solution of tricyclohexylphosphine (12.5 mMol) was diluted to about 1 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 3.9 g (39%).

EXAMPLE 33

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1 mg, 0.0012 mmol). This mixture was diluted with 24 ml of toluene and 8 ml of ethanol. Approximately 0.1 mg (0.0003 mmol) of (allyl)palladium(tricyclohexylphosphine)chloride (Catalyst A) to about 1 ml total with toluene and added to the monomer solution. The mixture was heated to 65° C. for 4 hours. The resulting mixture was diluted with toluene and poured into methanol to precipitate the polymer which was filtered and dried in vacuo overnight. Yield 0.72 g (7.2%).

EXAMPLE 34

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 $Et_2O$ (1.1 mg, 0.0012 mmol). This mixture was diluted with 32 ml of toluene. Approximately 0.1 mg (0.0003 mmol) of (allyl) palladium(tricyclohexylphosphine)chloride (Catalyst A) to about 1 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 7.8 g (78%).

EXAMPLE 35

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 Et$_2$O (1.1 mg, 0.0012 mmol). This mixture was diluted with 32 ml of toluene. Approximately 50 µl of a toluene solution of (allyl)palladium chloride dimer (2.5 mMol) and 20 µl of a toluene solution of tribenzylphosphine (12.5 mMol) was diluted to about 1 ml total with toluene and added to the monomer solution. The mixture was heated to 65° C. for 4 hours. The resulting viscous mixture was diluted with toluene and poured into acetone to precipitate the polymer which was filtered and dried in vacuo overnight. Yield 2.1 g (21%).

EXAMPLE 36

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 Et$_2$O (1.1 mg, 0.0012 mmol). This mixture was diluted with 32 ml of toluene. Approximately 50 µl of a toluene solution of (allyl)palladium chloride dimer (2.5 mMol) and 20 µl of a toluene solution of tributylphosphine (12.5 mMol) was diluted to about 1 ml total with toluene and added to the monomer solution. The mixture was heated to 65° C. for 4 hours. The resulting viscous mixture was diluted with toluene and poured into acetone to precipitate the polymer which was filtered and dried in vacuo overnight. Yield 4.1 g (41%).

EXAMPLE 37

To a mixture of butylnorbornene (8.41 g, 56.1 mmol) and 5-triethoxysilylnorbornene (1.59 g, 6.21 mmol) was added sodium tetrakis(3,5-bis(trifluoromethyl)phenyl)borate (1.1 mg, 0.0004 mmol). This mixture was diluted with 32 ml of toluene. Approximately 50 µl of a toluene solution of (allyl)palladium chloride dimer (2.5 mMol) and 20 µl of a toluene solution of tricyclohexylphosphine (12.5 mMol) was diluted to about 1 ml total with toluene and added to the monomer solution. The mixture was heated to 65° C. for 4 hours. The resulting viscous mixture was diluted with toluene and poured into acetone to precipitate the polymer which was filtered and dried in vacuo overnight. Yield 9.3 g (93%).

EXAMPLE 38

To a mixture of butylnorbornene (8.41 g, 56.1 mmol) and 5-triethoxysilylnorbornene (1.59 g, 6.21 mmol) was added trityl tetrakis(pentafluorophenyl)borate (1.1 mg, 0.0012 mmol). This mixture was diluted with 32 ml of toluene. Approximately 50 µl of a toluene solution of (allyl)palladium chloride dimer (2.5 mMol) and 20 µl of a toluene solution of tricyclohexylphosphine (12.5 mMol) was diluted to about 1 ml total with toluene and added to the monomer solution. The mixture was heated to 65° C. for 4 hours. The resulting viscous mixture was diluted with toluene and poured into acetone to precipitate the polymer which was filtered and dried in vacuo overnight. Yield 1.0 g (10%).

EXAMPLE 39

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol). This mixture was diluted with 16 ml of toluene. Approximately 20 µl of a toluene solution of {2-[(dimethylamino)methyl]phenyl-C,N-}palladium (tricyclohexylphosphine)chloride (Catalyst D, 6.52 mMol) was added to the monomer solution. The mixture was heated to 65° C. for 4 hours. The resulting viscous mixture was diluted with toluene and poured into acetone to precipitate the polymer which was filtered and dried in vacuo overnight. Yield 3.8 g (76%).

EXAMPLE 40

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol). This mixture was diluted with 16 ml of toluene. Approximately 20 µl of a toluene solution of {2-[(dimethylamino)methyl]-phenyl-C,N-}palladium (tricyclohexylphosphine)triflate (Catalyst E, 6.52 mMol) was added to the monomer solution. The mixture was heated to 65° C. for 4 hours. The resulting viscous mixture was diluted with toluene and poured into acetone to precipitate the polymer which was filtered and dried in vacuo overnight. Yield 5.0 g (100%).

EXAMPLE 41

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol). This mixture was diluted with 16 ml of toluene. Approximately 10 µl of a toluene solution of (allyl)palladium chloride dimer (3.26 mMol) and 10 µl of a toluene solution of triallylphosphine (6.52 mMol) was diluted to about 3 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 1.6 g (32%). Mw=2,460,000 and Mn=1,230,000 as determined by GPC methods.

EXAMPLE 42

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol). This mixture was diluted with 16 ml of toluene. Approximately 10 µl of a toluene solution of (allyl)palladium chloride dimer (3.26 mMol) and 10 µl of a toluene solution of tricyclopentylphosphine (6.52 mMol) was diluted to about 3 ml total with toluene and added to the monomer solution. The mixture was heated to 65° C. for 4 hours. The resulting viscous mixture was diluted with toluene and poured into methanol to precipitate the polymer, filtered and dried in vacuo overnight. Yield 4.8 g (96%).

EXAMPLE 43

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol). This mixture was diluted with 16 ml of toluene. Approximately 10 µl of a toluene solution of (allyl)palladium chloride dimer (3.26 mMol) and 10 µl of a toluene solution of triisopropylphosphite (6.52 mMol) was diluted to about 3 ml total with toluene and added to the monomer solution. The mixture was heated to 65° C. for 4 hours. The resulting viscous mixture was diluted with toluene and poured into methanol to precipitate the polymer which was filtered and dried in vacuo overnight. Yield 0.2 g (4%).

EXAMPLE 44

To a mixture of butylnorbornene (4.58 g, 30.5 mmol) and 5-triethoxysilylnorbornene (0.420 g, 1.64 mmol) was added lithium tetrakis{tris(trifluoromethyl)-tert-butoxy}aluminate (1.1 mg, 0.0011 mmol). This mixture was diluted with 16 ml of toluene. Approximately 200 µl of a toluene solution of (allyl)palladium(tricyclohexylphosphine)triflate (1.08 mMol) was added to the monomer solution. The mixture was heated to 65° C. for 4 hours. The resulting viscous mixture was diluted with toluene and poured into methanol to precipitate the polymer which was filtered and dried in vacuo overnight. Yield 5 g (100%).

EXAMPLE 45

To a mixture of butylnorbornene (4.58 g, 30.5 mmol) and 5-triethoxysilylnorbornene (0.420 g, 1.64 mmol) was added the fluorinated tetraalkoxyaluminate, $Li[Al(OC(CF_3)_3)_4]$ (1.1 mg, 0.0011 mmol). This mixture was diluted with 16 ml of toluene. Approximately 200 µl of a toluene solution of {2-(dimethylamino)methyl]-phenyl-C,N-}palladium (tricyclohexylphosphine)triflate (Catalyst E, 1.08 mMol) was added to the monomer solution. The mixture was heated to 65° C. for 4 hours. The resulting viscous mixture was diluted with toluene and poured into methanol to precipitate the polymer which was filtered and dried in vacuo overnight. Yield 5 g (100%).

EXAMPLE 46

To a mixture of butylnorbornene (4.58 g, 30.5 mmol) and 5-triethoxysilylnorbornene (0.420 g, 1.64 mmol) was added the fluorinated tetraalkoxyaluminate, $Li[Al(OC(CF_3)_2Ph)_4]$ (1.1 mg, 0.0011 mmol). This mixture was diluted with 32 ml of toluene. Approximately 100 µl of a toluene solution of {2-(dimethylamino)methyl]-phenyl-C,N-}palladium (tricyclohexylphosphine)triflate (Catalyst E, 2.16 mMol) was added to the monomer solution. The mixture was heated to 65° C. for 4 hours. The resulting viscous mixture was diluted with toluene and poured into methanol to precipitate the polymer which was filtered and dried in vacuo overnight. Yield 4.6 g (92%).

EXAMPLE 47

To a mixture of butylnorbornene (4.58 g, 30.5 mmol) and 5-triethoxysilylnorbornene (0.420 g, 1.64 mmol) was added the fluorinated carborane salt, $LiCB_{11}F_{11}H$ (0.4 mg, 0.001 mmol). This mixture was diluted with 32 ml of toluene. Approximately 100 µl of a toluene solution of {2-(dimethylamino)methyl]-phenyl-C,N-}palladium (tricyclohexylphosphine)triflate (Catalyst E, 2.16 mMol) was added to the monomer solution. The mixture was heated to 65° C. for 4 hours. The resulting viscous mixture was diluted with toluene and poured into methanol to precipitate the polymer which was filtered and dried in vacuo overnight. Yield 2.7 g (54%).

EXAMPLE 48

To a mixture of butylnorbornene (4.58 g, 30.5 mmol) and 5-triethoxysilylnorbornene (0.420 g, 1.64 mmol) was added the brominated carborane salt, $LiCB_{11}H_6Br_6$ (0.7 mg, 0.001 mmol). This mixture was diluted with 32 ml of toluene. Approximately 100 µL of a toluene solution of {2-(dimethylamino)methyl]-phenyl-C,N-}palladium (tricyclohexylphosphine)triflate (Catalyst E, 2.16 mMol) was added to the monomer solution. The mixture was heated to 65° C. for 4 hours. The resulting viscous mixture was diluted with toluene and poured into methanol to precipitate the polymer which was filtered and dried in vacuo overnight. Yield 1.5 g (31%). Mw=417,000 and Mn=212,000 as determined by GPC methods.

EXAMPLE 49

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (0.6 mg, 0.0006 mmol). This mixture was diluted with 38 ml of toluene. Approximately 20 µl of a toluene solution of (allyl)palladium chloride dimer (3.28 mMol) and 20 µl of a toluene solution of trifurylphosphine (6.57 mMol) was diluted with toluene and added to the monomer solution. The mixture was heated to 65° C. for 4 hours. The resulting viscous mixture was poured into acetone to precipitate the polymer which was redissolved into toluene and reprecipitated into methanol which was filtered and dried in vacuo overnight. Yield 1.9 g (37%).

EXAMPLE 50

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (0.6 mg, 0.0006 mmol). This mixture was diluted with 38 ml of toluene. Approximately 20 µl of a toluene solution of (allyl)palladium chloride dimer (3.28 mMol) and 20 µl of a toluene solution of tri-m-methoxyphenylphosphine (6.57 mMol) was diluted with toluene and added to the monomer solution. The mixture was heated to 65° C. for 4 hours. The resulting viscous mixture was poured into acetone to precipitate the polymer which was redissolved into toluene and reprecipitated into methanol which was filtered and dried in vacuo overnight. Yield 0.5 g (10%).

EXAMPLE 51

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (0.6 mg, 0.0006 mmol). This mixture was diluted with 38 ml of toluene. Approximately 20 µl of a toluene solution of (allyl)palladium chloride dimer (3.28 mMol) and 20 µl of a toluene solution of tri-p-methoxyphosphine (6.57 mMol) was diluted with toluene and added to the monomer solution. The mixture was heated to 65° C. for 4 hours. The resulting viscous mixture was poured into acetone to precipitate the polymer which was redissolved into toluene and reprecipitated into methanol which was filtered and dried in vacuo overnight. Yield 3.6 g (72%).

EXAMPLE 52

To a clean, dry 500 ml stainless steel reactor was added 45.8 g butylnorbornene (305 mmol) and 4.2 g of 5-triethoxysilylnorbornene (16.4 mmol) diluted with toluene to a total volume of 320 ml. The mixture was heated to 65° C. with agitation. To this mixture was added lithium tetrakis (pentafluorophenyl)borate·2.5 $Et_2O$ (9.4 mg, 0.011 mmol) in 4 ml of toluene. Approximately 1.3 mg of (allyl)palladium (tri-o-tolylphosphine)triflate (Catalyst G, 0.0022 mmol) in 3 ml of toluene was added to the reactor. After 4 hours the reaction mixture was poured into acetone to precipitate the polymer which was filtered and dried in vacuo overnight. Yield 16.2 g (33%). Mw=165,000 and Mn=71,000 as determined by GPC methods.

EXAMPLE 53

To a mixture of butylnorbornene (4.58 g, 30.5 mmol) and 5-triethoxysilylnorbornene (0.420 g, 1.64 mmol) was added lithium tetrakis(pentafluorophenyl)borate e 2.5 $Et_2O$ (1.0 mg, 0.00011 mmol). This mixture was diluted with 16 ml of toluene. Approximately 100 µl of a toluene solution of trans-di-(µ-acetato)-bis[o-(di-o-tolylphosphino)benzyl] dipalladium (1.1 mMol) and 100 µl of a toluene solution of tricyclohexylphosphine (2.1 mMol) was diluted with a small amount of toluene and was added to the monomer solution. The mixture was heated to 65° C. for 4 hours. The resulting mixture was diluted with toluene and poured into methanol to precipitate the polymer which was filtered and dried in vacuo overnight. Yield 5 g (100%).

EXAMPLE 54

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (1.0 mg, 0.00011 mmol) and triphenylphosphine supported on 20% crosslinked polystyrene (0.71 mg, 0.8 weight percent phosphorus) This mixture was diluted with 16 ml of toluene. Approximately 100 µl of a toluene solution of allylpalladium chloride dimer (1.1 mMol) was added to the mixture. The mixture was heated to 65° C. After 4 hours the mixture was poured into an excess of acetone to precipitate the polymer which was filtered and dried in vacuo. Yield 0.15 g (3%).

EXAMPLE 55

To a mixture of butylnorbornene (4.58 g, 30.5 mmol) and 5-triethoxysilylnorbornene (0.420 g, 1.64 mmol) was added N,N-dimethylanilinium tetrakis(pentafluorophenyl)borate (1.0 mg, 0.00011 mmol). This mixture was diluted with 16 ml of toluene. Approximately 100 µl of a toluene solution is (1,5-cyclooctadiene)(dimethyl)platinum (2.3 mMol) and 200 µl of a toluene solution of tricyclohexylphosphine (2.1 mMol) was diluted with a small amount of toluene and was added to the monomer solution. The mixture was heated to 65° C. for 4 hours. The resulting mixture was diluted with toluene and poured into methanol to precipitate the polymer which was filtered and dried in vacuo overnight. Yield 0.11 g (2%).

EXAMPLE 56

Comparative

A mixture of butylnorbornene (4.58 g, 30.5 mmol) and 5-triethoxysilylnorbornene (0.420 g, 1.64 mmol) was diluted with 16 ml of toluene. A solution of (allyl)palladium chloride dimer (0.00011 mmol) and tricyclohexylphosphine (0.00022 mmol) in toluene was added to the monomer solution. No WCA salt activator was employed. The mixture was heated to 65° C. for 4 hours. The mixture was then poured into an excess of acetone. No polymer precipitated.

EXAMPLE 57

Comparative

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (1.0 mg, 0.0011 mmol). This mixture was diluted with 16 ml of toluene. A solution of (allyl)palladium chloride dimer (0.00011 mmol) in toluene was added to the monomer solution. No neutral Group 15 electron donor ligand providing compound was added. The mixture was heated to 65° C. for 4 hours. The mixture was then poured into an excess of acetone. No polymer precipitated.

EXAMPLE 58

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (1.0 mg, 0.0011 mmol). This mixture was diluted with 16 ml of toluene. A solution of (allyl)palladium chloride dimer (0.00011 mmol) and tricyclohexylphosphine (0.00022 mmol) in toluene was added to the monomer solution. The mixture was heated to 65° C. for 4 hours. The resulting viscous mixture was diluted in toluene then poured into an excess of acetone to precipitate the polymer. The polymer was filtered and dried in vacuo. Yield 4.25 g (85%).

EXAMPLE 59

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (1.0 mg, 0.0011 mmol). This mixture was diluted with 16 ml of toluene. Approximately 100 µl of a toluene solution of {2-[1-(dimethylamino)-ethyl]phenyl-C,N-}palladium (tricyclohexylphosphine chloride (Catalyst M, 1.1 mMol) was added to the monomer solution. The mixture was heated to 65° C. for 4 hours. The resulting viscous mixture was diluted with toluene and poured into acetone to precipitate the polymer which was filtered and dried in vacuo overnight. Yield 5.0 g (100%).

EXAMPLE 60

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (1.0 mg, 0.0011 mmol) and 5-butenylnorbornene (0.060 g, 0.00033 mol) as a chain transfer agent and comonomer. The mixture was diluted with 32 ml of toluene. To this solution was added 100 µl of a toluene solution of allylpalladium (tricyclohexylphosphine)triflate (Catalyst B, 1.3 mMol). After heating the mixture for 4 hours at 65° C., the mixture was poured into an excess of acetone. The resulting polymer was filtered and dried in vacuo. Yield 3.9 g (77%). Mw=1,372,000 and Mn=427,000 as determined by GPC methods.

EXAMPLE 61

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 $Et_2O$ (1.0 mg, 0.0011 mmol) and 5-butenylnorbornene (0.180 g, 0.0010 mol) as a chain transfer agent and comonomer. The mixture was diluted with 32 ml of toluene. To this solution was added 100 µL of a toluene solution of allylpalladium (tricyclohexylphosphine)triflate (Catalyst B, 1.3 mMol). After heating the mixture for 4 hours at 65° C., the mixture was poured into an excess of acetone. The resulting polymer was filtered and dried in vacuo. Yield 3.7 g (73%). Mw=750,000 and Mn=230,000 as determined by GPC methods.

EXAMPLE 62

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol) and 5-butenylnorbornene (0.30 g, 0.0017 mol) as a chain transfer agent and comonomer. The mixture was diluted with 32 ml of toluene. To this solution was added 100 μl of a toluene solution of allylpalladium (tricyclohexylphosphine)triflate (Catalyst B, 1.3 mMol). After heating the mixture for 4 hours at 65° C., the mixture was poured into an excess of acetone. The resulting polymer was filtered and dried in vacuo. Yield 3.5 g (70%). Mw=428,000 and Mn=121,000 as determined by GPC methods.

EXAMPLE 63

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.6 mg, 0.0007 mmol) and 5-butenylnorbornene (1.01 g, 0.0058 mol) as a chain transfer agent and comonomer. The mixture was diluted with 32 ml of toluene. Approximately 100 μl of a toluene solution of trans-di-(μ-acetato)-bis[o-(di-o-tolylphosphino)benzyl]dipalladium (1.3 mMol) and 100 μl of a toluene solution of tricyclohexylphosphine (2.6 mMol) was added to the monomer solution. After heating the mixture for 4 hours at 65° C., the mixture was poured into an excess of acetone. The resulting polymer was filtered and dried in vacuo. Yield 2.5 g (51%). Mw=180,000 and Mn=63,000 as determined by GPC methods.

EXAMPLE 64

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol). This mixture was diluted with 32 ml of toluene. To this mixture was added 100 μl of a toluene solution of bis(tricyclohexylphosphine) palladiumhydridochloride (Catalyst N, 1.3 mMol). The mixture was heated to 65° C. for 4 hours after which the mixture became so viscous that it could not be stirred. The polymer was precipitated into acetone, filtered and dried in vacuo. Yield 3.0 g (61%).

EXAMPLE 65

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol). This mixture was diluted with 32 ml of toluene. To this mixture was added 100 μl of a toluene solution of bis(tricyclohexylphosphine) palladiumhydridonitrate (Catalyst O, 1.3 mMol). The mixture was heated to 65° C. for 4 hours after which the mixture became so viscous that it could not be stirred. The polymer was precipitated into acetone, filtered and dried in vacuo. Yield 5 g (100%).

EXAMPLE 66

To a mixture of norbornene (5.0 g, 53 mmol was added lithium tetrakis(pentafluorophenyl)borate·2.5 Et$_2$O (1.0 mg, 0.0011 mmol). This mixture was diluted with 16 ml of toluene. To this mixture was added 200 μl of a toluene solution of allylpalladium(tricyclohexylphosphine)triflate (Catalyst B, 0.27 mMol). The mixture was allowed to stir at room temperature for 18 hours. After precipitation, filtering and drying a yield of 0.68 g of polymer was obtained. Yield 14%.

EXAMPLE 67

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol) and 5-butenylnorbornene (0.05 g, 0.00033 mol). This mixture was diluted with 16 ml of toluene. To this mixture was added 50 μL of a toluene solution of (allyl)palladium(tricyclohexylphosphine)triflate (Catalyst B, 1.3 mMol). The mixture was heated to 65° C. for 18 hours. The viscous solution was diluted with toluene and then the polymer was precipitated into an excess of acetone. After filtering and drying in vacuo overnight a conversion of 4.75 g of polymer was obtained. Yield 95%. Mw=2,115,000 and Mn=608,000 as determined by GPC methods.

EXAMPLE 68

To a mixture of butylnorbornene (4.58 g, 30.5 mmol) and 5-triethoxysilylnorbornene (0.420 g, 1.64 m-mol) was added lithium tetrakis(pentafluorophenyl)borate·2.5 Et$_2$O (1.0 mg, 0.0011 mmol) and 5-butenylnorbornene (0.15 g, 0.0010 mol). This mixture was diluted with 16 ml of toluene. To this mixture was added 50 μL of a toluene solution of (allyl) palladium(tricyclohexylphosphine)triflate (Catalyst B, 1.3 mMol). The mixture was heated to 65° C. for 18 hours. The viscous solution was diluted with toluene and then the polymer was precipitated into an excess of acetone. After filtering and drying in vacuo overnight a conversion of 4.54 g of polymer was obtained. Yield 91%. Mw=973,000 and Mn=146,000 as determined by GPC methods.

EXAMPLE 69

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol) and 5-butenylnorbornene (0.25 g, 0.0017 mol). This mixture was diluted with 16 ml of toluene. To this mixture was added 50 μL of a toluene solution of (allyl) palladium(tricyclohexylphosphine)triflate (Catalyst B, 1.3 mMol). The mixture was heated to 65° C. for 18 hours. The viscous solution was diluted with toluene and then the polymer was precipitated into an excess of acetone. After filtering and drying in vacuo overnight a conversion of 4.03 g of polymer was obtained. Yield 81%. Mw=690,000 and Mn=120,000 as determined by GPC methods.

EXAMPLE 70

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol) and 5-butenylnorbornene (0.54 g, 0.0036 mol). This mixture was diluted with 16 ml of toluene. To this mixture was added 50 μl of a toluene solution of (allyl) palladium(tricyclohexylphosphine)triflate (Catalyst B, 1.3 mMol). The mixture was heated to 65° C. for 18 hours. The viscous solution was diluted with toluene and then the polymer was precipitated into an excess of acetone. After filtering and drying in vacuo overnight a conversion of 3.91 g of polymer was obtained. Yield 78%. Mw=379,000 and Mn=120,000 as determined by GPC methods. The polymer contained approximately 5% 5 butenylnorbornene according to $^1$H NMR analysis.

EXAMPLE 71

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol) and 5-butenylnorbornene (1.21 g, 0.0082 mol). This mixture was diluted with 16 ml of toluene. To this mixture was added 50 µl of a toluene solution of (allyl) palladium(tricyclohexylphosphine)triflate (Catalyst B, 1.3 mMol). The mixture was heated to 65° C. for 18 hours. The viscous solution was diluted with toluene and then the polymer was precipitated into an excess of acetone. After filtering and drying in vacuo overnight a conversion of 3.70 g of polymer was obtained. Yield 74%. Mw=202,000 and Mn=68,000 as determined by GPC methods. The polymer contained approximately 12% 5-butenylnorbornene according to $^1$H NMR analysis.

EXAMPLE 72

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (1.0 mg, 0.0011 mmol) and 5-butenylnorbornene (3.26 g, 0.022 mol). This mixture was diluted with 16 ml of toluene. To this mixture was added 50 µl of a toluene solution of (allyl) palladium(tricyclohexylphosphine)triflate (Catalyst B, 1.3 mMol). The mixture was heated to 65° C. for 18 hours. The viscous solution was diluted with toluene and then the polymer was precipitated into an excess of acetone. After filtering and drying in vacuo overnight a conversion of 2.85 g of polymer was obtained. Yield 57%. Mw=154,000 and Mn=59,000 as determined by GPC methods. The polymer contained approximately 25% 5-butenylnorbornene according to $^1$H NMR analysis.

EXAMPLE 73

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016M solution in toluene, 0.00016 mmol) and 5-butenylnorbornene (0.05 g, 0.33 mmol). This mixture was diluted with 16 ml of toluene. To this mixture was added 50 µl of a toluene solution of (allyl)palladium (tricyclohexylphosphine)triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 4.28 g of polymer was obtained. Yield 86%. Mw=1,886,000 and Mn=328,000 as determined by GPC methods.

EXAMPLE 74

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016M solution in toluene, 0.00016 mmol) and 5-butenylnorbornene (0.15 g, 1.0 mmol). This mixture was diluted with 16 ml of toluene. To this mixture was added 50 µl of a toluene solution of (allyl)palladium (tricyclohexylphosphine)triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 4.00 g of polymer was obtained. Yield 80%. Mw=957,000 and Mn=267,000 as determined by GPC methods.

EXAMPLE 75

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016 M solution in toluene, 0.00016 mmol) and 5-butenylnorbornene (0.25 g, 1.7 mmol). This mixture was diluted with 16 ml of toluene. To this mixture was added 50 µl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 4.32 g of polymer was obtained. Yield 86%. Mw=460,000 and Mn=119,000 as determined by GPC methods.

EXAMPLE 76

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016 M solution in toluene, 0.00016 mmol), and hexene-1 (0.31 g, 3.6 mmol). This mixture was diluted with 16 ml of toluene. To this mixture was added 50 µl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 3.13 g of polymer was obtained. Yield 63%. Mw=2,050,000 and Mn=682,000 as determined by GPC methods.

EXAMPLE 77

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016 M solution in toluene, 0.00016 mmol), and hexene-1 (0.69 g, 8.2 mmol). This mixture was diluted with 16 ml of toluene. To this mixture was added 50 µl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 2.01 g of polymer was obtained. Yield 40%. Mw=1,275,000 and Mn=548,000 as determined by GPC methods.

EXAMPLE 78

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016 M solution in toluene, 0.00016 mmol), and hexene-1 (1.83 g, 22.0 mmol). This mixture was diluted with 16 ml of toluene. To this mixture was added 50 µl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was no precipitated into an excess of acetone. After filtering and drying in vacuo overnight a conversion of 1.28 g of polymer was obtained. Yield 26%.

Mw=532,000 and Mn=190,000 as determined by GPC methods.

EXAMPLE 79

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 µl of a 0.0016 M solution in toluene, 0.00016 mmol), and 5-vinylnorbornene (0.21 g, 1.7 mmol). This mixture was diluted with 16 ml of toluene. To this mixture was added 50 μl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 1.28 g of polymer was obtained. Yield 14%.

EXAMPLE 80

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 μl of a 0.0016 M solution in toluene, 0.00016 mmol), and 5-ethylidenenorbornene (0.21 g, 1.7 mmol). This mixture was diluted with 16 ml of toluene. To this mixture was added 50 μl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 1.7 g of polymer was obtained. Yield 34%.

EXAMPLE 81

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (100 μl of a 0.0016 M solution in toluene, 0.00016 mmol), and 5-ethylidenenorbornene (0.43 g, 3.6 mmol). This mixture was diluted with 16 ml of toluene. To this mixture was added 50 μl of a toluene solution of (allyl)palladium (tricyclohexylphosphine) triflate (Catalyst B, 0.65 mMol). The mixture was heated to 65° C. for 18 hours. The viscous solution was diluted with toluene and then the polymer was precipitated into an excess of acetone. After filtering and drying in vacuo overnight a conversion of 1.4 g of polymer was obtained. Yield 28%.

EXAMPLE 82

To a mixture of butylnorbornene (4.58 g, 30.5 mmol) and 5-triethoxysilylnorbornene (0.420 g, 1.64 mmol) was added lithium tetrakis(pentafluorophenyl)borate·2.5 Et$_2$O (0.0010 g, 0.0012 mmol). This mixture was diluted with 16 ml of toluene. To this mixture was added (allyl)platinum chloride tetramer (Catalyst P, 100 μl of a 0.054 mMol solution in toluene) and tricyclohexylphosphine (100 μl of a 0.11 mMol solution in toluene). The mixture was heated to 65° C. for 64 hours. The poured into an excess of acetone. After filtering and drying in vacuo overnight a conversion of 0.11 g of polymer was obtained. Yield 2%.

EXAMPLE 83

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 Et$_2$O (0.5 mg, 0.0006 mmol). This mixture was diluted with 18 ml of toluene. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 2.6 g (26%).

EXAMPLE 84

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 Et$_2$O (1.1 mg, 0.0013 mmol). This mixture was diluted to a total volume 18 ml with toluene. A mixture of (allyl)palladium chloride dimer (0.00013 mmol) and triphenylphosphine (0.00025 mmol) in toluene and added to the monomer solution. The mixture was heated to 65° C. for 4 hours. The resulting mixture was poured into acetone to precipitate the polymer which was filtered and dried in vacuo overnight. Yield 8.8 g (88%).

EXAMPLE 85

To a mixture of butylnorbornene (8.41 g, 56.1 mmol) and 5-triethoxysilylnorbornene (1.59 g, 6.21 mmol) was added lithium tetrakis(pentafluorophenyl)borate·2.5 Et$_2$O (0.5 mg, 0.0006 mmol). This mixture was diluted to a total volume 18 ml with toluene. A mixture of (allyl)palladium chloride dimer (0.000031 mmol) and triphenylphosphine (0.000063 mmol) in toluene and added to the monomer solution. The mixture was heated to 65° C. for 4 hours. The resulting mixture was poured into acetone to precipitate the polymer which was filtered and dried in vacuo overnight. Yield 2.3 g (23%).

EXAMPLE 86

To a mixture of butylnorbornene (4.2 g, 28.1 mmol) and 5-triethoxysilylnorbornene (0.8 g, 3.1 mmol) was added lithium tetrakis(pentafluorophenyl)borate·2.5 Et$_2$O (0.5 mg, 0.0006 mmol). This mixture was diluted to a total volume 100 ml with toluene. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.2 g (24%).

EXAMPLE 87

To a mixture of butylnorbornene (4.2 g, 28.1 mmol) and 5-triethoxysilylnorbornene (0.8 g, 3.1 mmol) was added lithium tetrakis(pentafluorophenyl)borate·2.5 Et$_2$O) (0.5 mg, 0.0006 mmol). This mixture was diluted to a total volume 64 ml with toluene. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.3 g (26%).

EXAMPLE 88

To a mixture of butylnorbornene (4.2 g, 28.1 mmol) and 5-triethoxysilylnorbornene (0.8 g, 3.1 mmol) was added lithium tetrakis(pentafluorophenyl)borate·2.5 Et$_2$O (0.5 mg, 0.0006 mmol). This mixture was diluted to a total volume 100 ml with toluene. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 3.0 g (60%).

EXAMPLE 89

To a mixture of butylnorbornene (4.2 g, 28.1 mmol) and 5-triethoxysilylnorbornene (0.8 g, 3.1 mmol) was added lithium tetrakis(pentafluorophenyl)borate·2.5 Et$_2$O (0.5 mg, 0.0006 mmol). This mixture was diluted to a total volume 16 ml with toluene. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 4.5 g (90%).

EXAMPLE 90

To a mixture of butylnorbornene (4.2 g, 28.1 mmol) and 5-triethoxysilylnorbornene (0.8 g, 3.1 mmol) was added lithium tetrakis(pentafluorophenyl)borate·2.5 Et$_2$O (0.5 mg, 0.0006 mmol). This mixture was diluted to a total volume 100 ml with toluene. A mixture of (allyl)palladium chloride dimer (0.000062 mmol) and triphenylphosphine (0.00013 mmol) in toluene and added to the monomer solution. The mixture was heated to 65° C. for 18 hours. The resulting mixture was poured into acetone to precipitate the polymer which was filtered and dried in vacuo overnight. Yield 10.5 g (21%).

EXAMPLE 91

To a mixture of butylnorbornene (4.2 g, 28.1 mmol) and 5-triethoxysilylnorbornene (0.8 g, 3.1 mmol) was added lithium tetrakis(pentafluorophenyl)borate·2.5 Et$_2$O (0.5 mg, 0.0006 mmol). This mixture was diluted to a total volume 64 ml with toluene. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.25 g (25%).

EXAMPLE 92

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. About 28 μl of cyclopentene (0.32 mmol) was added. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.4 g (28%). Mw=2,530,000 and Mn=1,340,000 as determined by GPC methods.

EXAMPLE 93

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. About 144 μl of cyclopentene (1.64 mmol) was added. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 0.7 g (14%). Mw=1,230,000 and Mn=582,000 as determined by GPC methods.

EXAMPLE 94

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. About 305 μl of cyclopentene (3.46 mmol) was added. A mixture of (allyl)palladium chloride dimer (0.000062 mmol) and triphenylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 0.6 g (12%). Mw=802,000 and Mn=311,000 as determined by GPC methods.

EXAMPLE 95

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. A mixture of (allyl)palladium chloride dimer (0.000062 mmol) and triphenylphosphine (0.00013 mmol) in toluene and added to the monomer solution. The mixture was heated to 100° C. for 4 hours. The resulting mixture was poured into acetone to precipitate the polymer which was filtered and dried in vacuo overnight. Yield 4.1 g (82%).

EXAMPLE 96

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.3 mg, 0.0003 mmol). This mixture was diluted to a total volume 16 ml with toluene. A mixture of (allyl)palladium chloride dimer (0.00016 mmol) and tributylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 0.9 g (18%). Mw=1,920,000 and Mn=845,000 as determined by GPC methods.

EXAMPLE 97

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. A mixture of (allyl)palladium chloride dimer (0.00006 mmol) and tributylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.65 g (33%).

EXAMPLE 98

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (1.4 mg, 0.0016 mmol). This mixture was diluted to a total volume 16 ml with toluene. A mixture of (allyl)palladium chloride dimer (0.00016 mmol) and triphenylphosphine (0.00032 mmol) in toluene and added to the monomer solution. The mixture is was heated to 65° C. for 4 hours. The resulting mixture was poured into acetone to precipitate the polymer which was filtered and dried in vacuo overnight. Yield 3.55 g (71%).

EXAMPLE 99

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.3 mg, 0.0003 mmol). This mixture was diluted to a total volume 16 ml with toluene. A mixture of (allyl)palladium chloride dimer (0.00016 mmol) and tri-o-tolylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 0.25 g (5%).

EXAMPLE 100

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (1.4 mg, 0.0016 mmol). This mixture was diluted to a total volume 16 ml with toluene. A mixture of (allyl)palladium chloride dimer (0.00016 mmol) and tri-o-tolylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 0.75 g (15%). Mw 301,000 and Mn=133,000 as determined by GPC methods.

EXAMPLE 101

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.3 mg, 0.0003 mmol). This mixture was diluted to a total volume 16 ml with toluene. A mixture of (allyl)palladium chloride dimer (0.00016 mmol) and tricyclohexylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 0.3 g (6%). Mw=1,630,000 and Mn=816,000 as determined by GPC methods.

EXAMPLE 102

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. A mixture of (allyl)palladium chloride dimer (0.00006 mmol) and tricyclohexylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 4.9 g (98%).

EXAMPLE 103

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.3 mg, 0.0003 mmol). This mixture was diluted to a total volume 16 ml with toluene. A mixture of (allyl)palladium chloride dimer (0.00016 mmol) and tri-i-propylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 0.8 g (16%). Mw=1,770,000 and Mn=862,000 as determined by GPC methods.

EXAMPLE 104

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. A mixture of (allyl)palladium chloride dimer (0.00006 mmol) and tri-i-propylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.7 g (34%).

EXAMPLE 105

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (1.4 mg, 0.0016 mmol). This mixture was diluted to a total volume 16 ml with toluene. A mixture of (allyl)palladium chloride dimer (0.00016 mmol) and tri-i-propylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 3.7 g (74%).

EXAMPLE 106

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. A mixture of (β-pinenyl)palladium chloride dimer (Catalyst J, 0.00006 mmol) and tricyclohexylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 1.65 g (35%).

EXAMPLE 107

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (1.4 mg, 0.0016 mmol). This mixture was diluted to a total volume 16 ml with toluene. A mixture of (β-pinenyl)palladium chloride dimer (Catalyst J, 0.00016 mmol) and tricyclohexylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 4.9 g (98%).

EXAMPLE 108

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. A mixture of (allyl)palladium iodide dimer (Catalyst K, 0.00006 mmol) and tricyclohexylphosphine (0.00013 mmol) in toluene and added to the monomer solution. The mixture was heated to 65° C. for 4 hours. The resulting mixture was poured into acetone to precipitate the polymer which was filtered and dried in vacuo overnight. Yield 0.25 g (5%).

EXAMPLE 109

To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (1.4 mg, 0.0016 mmol). This mixture was diluted to a total volume 16 ml with toluene. A mixture of (allyl)palladium iodide dimer (Catalyst K, 0.00016 mmol) and tricyclohexylphosphine (0.00032 mmol) in toluene and added to the monomer solution. The mixture was heated to 65° C. for 4 hours. The resulting mixture was poured into acetone to precipitate the polymer which was filtered and dried in vacuo overnight. Yield 0.75 g (15%).

EXAMPLE 110

A mixture of butylnorbornene (4.6 g, 30.7 mmol) and 5-triethoxysilylnorbornene (0.4 g, 1.5 mmol), and dimethylanilinium tetrakis(pentafluorophenylborate) (0.0013 g, 0.0016 mmol) was prepared. This mixture was diluted to a total volume 10 ml with toluene. About 0.05 ml of a 0.00623 M toluene solution of (allyl)palladium (tricyclohexylphosphine)(methyl) was added. The mixture was heated to 65° C. for 4 hours. The resulting mixture was diluted with toluene and poured into acetone to precipitate the polymer which was filtered and dried in vacuo overnight. Yield 3.6 g (72%).

EXAMPLE 111

The experiment above was repeated using dimethylanilinium tetrakis(bis(3,5-trifluoromethyl)phenyl)borate instead of the tetrakis(pentafluorophenyl)borate salt. Yield 5.0 g (100%).

EXAMPLE 112

The experiment above was repeated using trityl tetrakis (pentafluorophenyl)borate instead of dimethylanilinium tetrakis(bis(3,5-trifluoromethyl)phenyl)borate. Yield 2.8 g (56%).

EXAMPLE 113

A mixture of butylnorbornene (4.6 g, 30.7 mmol) and 5-triethoxysilylnorbornene (0.4 g, 1.5 mmol) was prepared. This mixture was diluted to a total volume 10 ml with toluene. About 0.10 ml of a 3.11 mMol toluene solution of [(allyl)palladium(tricyclohexylphosphine)(ether)][tetrakis (bis(3,5-trifluoromethyl)phenyl)borate](Catalyst L) was added. The mixture was heated to 65° C. for 4 hours. The resulting mixture was poured into acetone to precipitate the polymer which was filtered and dried in vacuo overnight. Yield 1.4 g (28%).

EXAMPLE 114

A. To a mixture of butylnorbornene (4.6 g, 30.7 mmol) and 5-triethoxysilylnorbornene (0.4 g, 1.5 mmol) was added lithium tetrakis(pentafluorophenyl)borate·2.5 Et$_2$O (0.5 mg, 0.0006 mmol). This mixture was diluted to a total volume 16 ml with toluene. (Allyl)palladium(tricyclohexylphosphine) chloride (Catalyst A, 0.00013 mmol) was added to the monomer solution. The mixture was heated to 65° C. for 4 hours. The resulting mixture was poured into acetone to precipitate the polymer which was filtered and dried in vacuo overnight. Yield 0.54 g (11%).

B. (Comparative) The experiment above was repeated, except no lithium tetrakis(pentafluorophenyl)borate bis (diethyletherate) was added. No polymer was observed upon addition of the toluene reaction mixture to acetone.

C. (Comparative) The first experiment was repeated, except that (allyl)palladium chloride dimer (0.00007 mmol) was used instead of (allyl)palladium (tricyclohexylphosphine) chloride. No polymer was observed upon addition of the toluene reaction mixture to acetone.

EXAMPLE 115

To a 2.0 M solution of ethylnorbornene (2.0 g, 16 mmol) in toluene was added 0.20 ml of a 0.0016 m solution of lithium tetrakis(pentafluorophenyl)borate·2.5 Et$_2$O in toluene followed by 0.010 ml of a 0.0062 M solution of (allyl)palladium(tricyclohexylphosphine) triflate (Catalyst B). The solution was heated to 75° C. for 1 hour. The resulting viscous solution was diluted with toluene and poured into an excess of acetone to precipitate the polymer. Yield 1.5 g (74%).

EXAMPLE 116

A 1.3 M solution of norbornene (2.0 g, 21 mmol) in toluene was prepared. In a separate vial added about 100 μl of a 0.0088 M solution of lithium tetrakis (pentafluorophenyl)borate·2.5 Et$_2$O in toluene and about 100 μl of a 0.0018 M solution of (methallyl)nickel (tricyclohexylphosphine)(triflate) (Catalyst Q) in toluene were mixed. This mixture was added to the norbornene solution and heated to 65° C. for 18 hours. The resulting viscous solution was diluted with toluene and poured into an excess of methanol to precipitate the polymer. Yield 1.8 g (92%).

EXAMPLE 117

A solution of butylnorbornene (4.6 g, 31 mmol) and the ethylester of 5-carboxylic acid of norbornene (0.27 g, 1.6 mmol) in toluene (16 ml total) was prepared. In a separate vial added about 100 μl of a 0.0088 M solution of lithium tetrakis(pentafluorophenyl)borate·2.5 Et$_2$O in toluene and about 100 μl of a 0.0022 M solution of (allyl)palladium (tricyclohexylphoshine)(triflate) (Catalyst B) in toluene were mixed. This mixture was added to the monomer solution and heated to 65° C. for 18 hours. The resulting polymer puck was stirred in methanol, filtered, and dried. Yield 3.76 g (78%).

EXAMPLE 118

A mixture of butylnorbornene (5.0 g, 33 mmol) in 25 ml of oxygenated, deionized water was prepared. In a separate vial added about 150 μl of a 0.0088 m solution of lithium tetrakis(pentafluorophenyl)borate·2.5 Et$_2$O in toluene and about 125 μl of a 0.0022 M solution of (allyl)palladium (tricyclohexylphosphine)(triflate) (Catalyst B) in toluene were mixed. This mixture was added to the monomer mixture and heated to 65° C. for 18 hours. A lumpy, solid polymer puck, indicating high conversion, separated from the water.

EXAMPLE 119

A mixture of butylnorbornene (4.6 g, 30.7 mmol) and 5-triethoxysilylnorbornene (0.4 g, 1.5 mmol) was prepared. This mixture was diluted to a total volume 16 ml with toluene. Catalyst U (0.0002 g) was dissolved in toluene and added to the monomer mixture. The solution was heated to 65° C. for 64 hours. The mixture formed a puck indicating high conversion.

EXAMPLE 120

Butylnorbornene (4.58 g, 30.5 mmol) and 5-triethoxysilylnorbornene (0.34 g, 1.3 mmol) were diluted with toluene to 16 ml total solution. Lithium tetrakis (pentafluorophenyl)borate·2.5 Et$_2$O (1.2 mg, 0.0014 mmol), (allyl)palladium(trifluoroacetate) dimer (2.8 mg, 0.00014 mmol), and triphenylamine (2.7 mg, 0.00027 mmol) were premixed in 3 ml toluene and then added to the monomer mixture. The mixture was heated to 65° C. for 64 hours. Polymer was precipitated by adding the reaction mixture to acetone. Yield 0.68 g (14%).

EXAMPLE 121

Butylnorbornene (4.58 g, 30.5 mmol) and 5-triethoxysilylnorbornene (0.34 g, 1.3 mmol) were diluted with toluene to 16 ml total solution. Lithium tetrakis (pentafluorophenyl)borate·2.5 Et$_2$O (1.2 mg, 0.0014 mmol), (allyl)palladium(trifluoroacetate) dimer (2.8 mg, 0.00014 mmol), and triphenylstibine (3.8 mg, 0.00027 mmol) were premixed in 3 ml toluene and then added to the monomer mixture. The mixture was heated to 65° C. for 64 hours. Polymer was precipitated by adding the reaction mixture to acetone. Yield 0.57 g (11%).

EXAMPLE 122

Butylnorbornene (4.58 g, 30.5 mmol) and 5-triethoxysilylnorbornene (0.34 g, 1.3 mmol) were diluted with toluene to 16 ml total solution. (1,5-cyclooctadiene)palladium(methyl)chloride (100 μl of a 0.0027 M solution in toluene, 0.00027 mmol) and tricyclohexylphosphine (100 μl of a 0.0027 M solution in toluene, 0.00027 mmol) were mixed together. This solution was added to lithium tetrakis (pentafluorophenyl)borate·2.5 Et$_2$O (1.2 mg, 0.0014 mmol). This mixture was then added to the monomers and the mixture was heated to 65° C. Within 1–2 hours, a puck formed indicating high conversion.

EXAMPLE 123

Hexylnorbornene (5.44 g, 30.5 mmol) and 5-triethoxysilylnorbornene (0.41 g, 1.6 mmol) were diluted with toluene to 16 ml total solution along with lithium tetrakis(pentafluorophenyl)borate·2.5 Et$_2$O (1.4 mg, 0.0016 mmol). (Allyl)palladium(tricyclohexylphosphine)(triflate) (50 μl of a 0.0062 M solution in toluene, 0.00032 mmol) was added. This mixture was then added to the monomers and the mixture was heated to 65° C. Within 3 hours, the mixture become highly viscous. After 18 hours, the polymer was precipitated, filtered, and dried. Yield 5.54 g (95%).

EXAMPLE 124

Hexylnorbornene (5.16 g, 29.0 mmol), 5-triethoxysilylnorbornene (0.82 g, 3.2 mmol), and hexene-1 (0.26 g, 3.1 mmol) were diluted with toluene to 19 ml total volume along with lithium tetrakis (pentafluorophenyl)borate·2.5 Et$_2$O (1.4 mg, 0.0016 mmol). The contents were warmed to 65° C. and (allyl)palladium (tricyclohexylphosphine)(triflate) (0.00032 mmol) was added in toluene. After 18 hours, the viscous mixture was diluted with additional toluene and added to acetone. The precipitated polymer was filtered and dried. Yield 6.0 g (100%). Mw=1,079,000 and Mn=320,000 as determined by GPC methods.

EXAMPLE 125

Hexylnorbornene (5.16 g, 29.0 mmol), 5-triethoxysilylnorbornene (0.82 g, 3.2 mmol), and hexene-1 (0.52 g, 6.2 mmol) were diluted with toluene to 19 ml total volume along with lithium tetrakis (pentafluorophenyl)borate·2.5 Et$_2$O (1.4 mg, 0.0016 mmol). The contents were warmed to 65° C. and (allyl)palladium (tricyclohexylphosphine)(triflate) (0.00032 mmol) was added in toluene. After 18 hours, the viscous mixture was diluted with additional toluene and added to acetone. The precipitated polymer was filtered and dried. Yield 6.0 g (100%). Mw=762,000 and Mn=166,000 as determined by GPC methods.

EXAMPLE 126

Hexylnorbornene (3.73 g, 21.0 mmol), 5-triethoxysilylnorbornene (0.82 g, 3.2 mmol), cyclohexenylnorbornene (1.40 g, 8.1 mmol) and hexene-1 (0.13 g, 1.6 mmol) were diluted with toluene to 19 ml total volume along with lithium tetrakis(pentafluorophenyl)borate·2.5 Et$_2$O (1.4 mg, 0.0016 mmol). The contents were warmed to 65° C. and (allyl)palladium(tricyclohexylphosphine)(triflate) (0.00032 mmol) was added in toluene. After 18 hours, the viscous mixture was diluted with additional toluene and added to acetone. The precipitated polymer was filtered and dried. Yield 0.97 g (16%).

EXAMPLE 127

Hexylnorbornene (3.73 g, 21.0 mmol), 5-triethoxysilylnorbornene (0.82 g, 3.2 mmol), cyclohexenylnorbornene (1.40 g, 8.1 mmol) and hexene-1 (0.26 g, 3.2 mmol) were diluted with toluene to 19 ml total volume along with lithium tetrakis(pentafluorophenyl)borate·2.5 Et$_2$O (1.4 mg, 0.0016 mmol). The contents were warmed to 65° C. and (allyl)palladium(tricyclohexylphosphine)(triflate) (0.00032 mmol) was added in toluene. After 18 hours, the viscous mixture was diluted with additional toluene and added to acetone. The precipitated polymer was filtered and dried. Yield 0.89 g (15%). Mw=115,000 and Mn=50,000 as determined by GPC methods.

EXAMPLE 128

Hexylnorbornene (3.73 g, 21.0 mmol), 5-triethoxysilylnorbornene (0.82 g, 3.2 mmol), cyclohexenylnorbornene (1.40 g, 8.1 mmol) and hexene-1 (0.52 g, 6.4 mmol) were diluted with toluene to 19 ml total volume along with lithium tetrakis(pentafluorophenyl)borate·2.5 Et$_2$O (1.4 mg, 0.0016 mmol). The contents were warmed to 65° C. and (allyl)palladium(tricyclohexylphosphine)(triflate) (0.00032 mmol) was added in toluene. After 18 hours, the viscous mixture was diluted with additional toluene and added to acetone. The precipitated polymer was filtered and dried. Yield 0.89 g (15%). Mw=100,000 and Mn=40,000 as determined by GPC methods.

EXAMPLE 129

Hexylnorbornene (5.16 g, 29.0 mmol), 5-triethoxysilylnorbornene (0.82 g, 3.2 mmol), and hexene-1 (0.26 g, 3.2 mmol) were diluted with cyclohexane to 30 ml total volume along with lithium tetrakis (pentafluorophenyl)borate·2.5 Et$_2$O (1.4 mg, 0.0016 mmol). The contents were warmed to 65° C. and (allyl)palladium (tricyclohexylphosphine) (trifluoroacetate) (0.00027 mmol) was added in toluene. After 18 hours the polymer was precipitated into acetone, filtered and dried. Yield 3.6 g (60%).

EXAMPLE 130

Butylnorbornene (1.57 g, 10.5 mmol), 5-triethoxysilylnorbornene (0.41 g, 1.6 mmol), and dicyclopentadiene (0.53 g, 4.0 mmol) were diluted with toluene to 30 ml total volume along with lithium tetrakis (pentafluorophenyl)borate·2.5 Et$_2$O (0.7 mg, 0.0008 mmol). The contents were warmed to 65° C. and (allyl)palladium (tricyclohexylphosphine) (trifluoroacetate) (0.00016 mmol) was added in toluene. After 18 hours the mixture had gelled indicating high conversion.

EXAMPLE 131

Butylnorbornene (5.0 g, 33 mmol) was added to a deareated water (50 ml) solution of lithium tetrakis (pentafluorophenyl)borate·2.5 Et$_2$O (14.5 mg, 0.016 mmol). The mixture was placed into a blender under nitrogen. The catalyst, (allyl)palladium dimer (0.61 mg, 0.0017 mmol), and ligand, tricyclohexylphosphine (0.93 mg, 0.0033 mmol), in 0.5 ml of toluene was added to the blender. The mixture was stirred at high speed at room temperature for 6 min. The polymer formed was isolated by filtration and dried. Yield 0.9 g (18%).

EXAMPLE 132

Butylnorbornene (10.0 g, 66.7 mmol) and 0.17 ml of a 30% aqueous solution of sodium lauryl sulfate was added to a deareated water (100 ml) solution of lithium tetrakis (pentafluorophenyl)borate·2.5 Et$_2$O (29 mg, 0.033 mmol). The mixture was stirred rapidly with a mechanical stirrer for 5 minutes. The catalyst, (allyl)palladium dimer (1.22 mg, 0.00332 mmol), and ligand, tricyclohexylphosphine (1.86 mg, 0.00667 mmol), in 1.0 ml of toluene was added to the mixture. The mixture was stirred at room temperature for about 4 hours. A large portion of polymer with large particle size and a milky solution resulted. The large portion of polymer was dissolved in toluene, precipitated in acetone, filtered and dried to give 6.8 g (68%) of polymer. The milky solution, essentially an emulsion, was added to acetone (100 ml) to give 0.7 g (7%) of white powder after filtering and drying.

EXAMPLE 133

Butylnorbornene (10.0 g, 66.7 mmol) and 0.17 ml of a 30% aqueous solution of sodium lauryl sulfate was added to a deareated water (100 ml) solution of lithium tetrakis (pentafluorophenyl)borate·2.5 Et$_2$O (2.9 mg, 0.0033 mmol). The mixture was stirred rapidly with a mechanical stirrer for 1 hour. The catalyst, (allyl)palladium dimer (0.12 mg, 0.00033 mmol), and ligand, tricyclohexylphosphine (0.19 mg, 0.00067 mmol), in 0.1 ml of toluene was added to the mixture. The mixture was stirred at room temperature for about 4 hours. A milky solution resulted. The milky solution, essentially an emulsion, was added to acetone (100 ml) to give 0.25 g (2.5%) of white powder after filtering and drying.

EXAMPLE 134

Methylacetate of 5-norbornene methanol (5.0 g, 30 mmol) was added to a deareated water (100 ml) solution of lithium tetrakis(pentafluorophenyl)borate·2.5 Et$_2$O (13 mg, 0.015 mmol). The mixture was stirred rapidly with a magnetic stirrer. The catalyst, (allyl)palladium dimer (0.55 mg, 0.0015 mmol), and ligand, tricyclohexylphosphine (0.84 mg, 0.0030 mmol), in 0.1 ml of toluene was added to the mixture. The mixture was stirred at room temperature for about 4 hours at 65° C. A powdery polymer was subsequently precipitated. Yield 0.25 g (5%).

EXAMPLE 135

Butylnorbornene (5.0 g, 33 mmol) was added to a deareated water (100 ml) solution of lithium tetrakis (pentafluorophenyl)borate·2.5 Et$_2$O (2.9 mg, 0.0033 mmol) in the presence of 0.5 wt % sodium lauryl sulfate. The mixture was stirred rapidly with a magnetic stirrer. The catalyst, (allyl)palladium dimer (0.12 mg, 0.00033 mmol), and ligand, tricyclohexylphosphine (0.19 mg, 0.00067 mmol), in 0.1 ml of toluene was added to the mixture. The mixture was stirred at room temperature for 4 hours. A milky solution and precipitated polymer resulted. About 2.1 g (42% yield) of polymer was isolated.

EXAMPLE 136

Butylnorbornene (5.0 g, 33 mmol) was added to a deareated water (50 ml) solution of lithium tetrakis (pentafluorophenyl)borate·2.5 Et$_2$O (2.9 mg, 0.0033 mmol) in the presence of 1.0 wt % sodium lauryl sulfate. The mixture was stirred rapidly with a magnetic stirrer. The catalyst, (allyl)palladium dimer (0.12 mg, 0.00033 mmol), and ligand, tricyclohexylphosphine (0.19 mg, 0.00067 mmol), in 0.1 ml of toluene was added to the mixture. The mixture was stirred at room temperature for 4 hours. A milky solution and precipitated polymer resulted. About 1 g (20% yield) of polymer was isolated.

EXAMPLE 137

Butylnorbornene (5.0 g, 33 mmol) was added to a deareated water (100 ml) solution of lithium tetrakis (pentafluorophenyl)borate·2.5 Et$_2$O (2.9 mg, 0.0033 mmol) in the presence of 0.5 wt % sodium lauryl sulfate. The mixture was stirred rapidly with a mechanical stirrer. The catalyst, (allyl)palladium dimer (0.12 mg, 0.00033 mmol), and ligand, tricyclohexylphosphine (0.19 mg, 0.00067 mmol), in 0.1 ml of toluene was added to the mixture. The mixture was stirred at room temperature for 4 hours at 65° C. A milky solution and precipitated polymer resulted. About 3.3 g (66%) of polymer was isolated after dissolving the polymer in toluene and precipitating in acetone, filtering, and drying.

EXAMPLE 138

Butylnorbornene (5.0 g, 33 mmol) was added to a deareated water (5 ml) solution of lithium tetrakis (pentafluorophenyl)borate·2.5 Et$_2$O (5.4 mg, 0.0064 mmol) in the presence of 0.5 wt % sodium lauryl sulfate. The mixture was stirred rapidly with a magnetic stirrer. The catalyst, (allyl)palladium dimer (0.24 mg, 0.00064 mmol), and ligand, tricyclohexylphosphine (0.36 mg, 0.0013 mmol), in 100 ml of toluene was added to the mixture. The mixture was stirred at room temperature for 4 hours at 65° C. A milky solution and precipitated polymer resulted. The particle size of the polymer in the milky solution was determined to be about 181 nm with a polydispersity of 2.6. The amount of polymer contained in the water emulsion constituted about 0.31 g (6.2% yield). The precipitated polymer was dried overnight and gave 2.0 g (40%) yield.

EXAMPLE 139

(Allyl)palladium chloride dimer (0.0049 g, 0.013 mmol) and the sodium salt tri(m-sulfonatophenyl)phosphine (0.015 g, 0.026 mmol) were dissolved in 4 ml of deareated water. Butylnorbornene (5.0 g, 33 mmol) was added to a deareated water (50 ml) solution of lithium tetrakis (pentafluorophenyl)borate·2.5 Et$_2$O (5.4 mg, 0.0064 mmol). The mixture was stirred rapidly with a magnetic stirrer. About 100 μl of the aqueous catalyst solution was added to the monomer solution after heating the monomer mixture to

EXAMPLE 140

To a mixture of butylnorbornene (5.0 g, 33 mmol) and 5-triethoxysilylnorbornene (0.95 g, 3.7 mmol) was added 12 ml of toluene. Approximately 100 µl of a toluene stock solution of (allyl)palladium(tricyclohexylphosphine) trifluoroacetate (Catalyst C, 3.0 mMol) and 100 µl of a toluene stock solution of ether-free lithium tetrakis (pentafluorophenyl)borate (14.9 mMol) were combined together and diluted with 2 ml of toluene, then added to the monomer mixture. The mixture was heated to 80° C. for 1 hour. A solid puck formed, indicating high conversion.

EXAMPLE 141

To a mixture of butylnorbornene (5.0 g, 33 mmol) and 5-triethoxysilylnorbornene (0.95 g, 3.7 mmol) was added 12 ml of toluene. Approximately 100 µl of a toluene stock solution of (allyl)palladium(tricyclohexylphosphine) trifluoroacetate (Catalyst C, 3.0 mMol) and 100 µL of a toluene/THF (98:2) stock solution of potassium tetrakis(3,5-bis (trifluoromethyl)phenyl)borate (14.9 mMol) were combined together and diluted with 2 ml of toluene, then added to the monomer mixture. The mixture was heated to 80° C. for 1 hour. A solid puck formed, indicating high conversion.

EXAMPLE 142

To a mixture of butylnorbornene (5.0 g, 33 mmol) and 5-triethoxysilylnorbornene (0.95 g, 3.7 mmol) was added 12 ml of toluene. Approximately 100 µl of a toluene stock solution of (allyl)palladium(tricyclohexylphosphine) trifluoroacetate (Catalyst C, 3.0 mMol) and 100 µl of a toluene stock solution of sodium tetrakis [3,5-bis(1,1,1,3,3,3-hexafluoro-2-methoxy-2-propyl)phenyl]borate trihydrate (14.9 mMol) were combined together and diluted with 2 ml of toluene, then added to the monomer mixture. The mixture was heated to 80° C. for 1 hour. A solid puck formed, indicating high conversion.

EXAMPLE 143

To a mixture of butylnorbornene (5.0 g, 33 mmol) and 5-triethoxysilylnorbornene (0.95 g, 3.7 mmol) was added 12 ml of toluene. Approximately 10 µl of a toluene stock solution of (allyl)palladium(tricyclohexylphosphine) trifluoroacetate (Catalyst C, 3 mMol) and 100 µl of a toluene stock solution of sodium tetrakis[3,5-bis(1,1,1,3,3,3-hexafluoro-2-methoxy-2-propyl)phenyl]borate trihydrate (0.76 mMol) were combined together and diluted with 2 ml of toluene, then added to the monomer mixture. The mixture was heated to 80° C. for 18 hours. A viscous solution formed, which was diluted with toluene and precipitated into an excess of methanol to isolate the polymer. After filtration and drying in vacuo overnight a conversion of 2.32 g of polymer was obtained. Yield 39%. Mw=2,580,000 Mn=913,000 as determined by GPC methods.

EXAMPLE 144

To a mixture of butylnorbornene (5.0 g, 33 mmol) and 5-triethoxysilylnorbornene (0.95 g, 3.7 mmol) was added 12 ml of toluene. Approximately 100 µl of a toluene stock solution of (allyl)palladium(tricyclohexylphosphine) chloride (Catalyst A, 3.0 mMol) and 100 µL of a toluene stock solution of Ag[CB$_{11}$H$_6$Br$_6$] (14.9 mMol) were combined together and diluted with 2 ml of toluene in the absence of light. The solution was then filtered to remove AgCl and then added to the monomer mixture. The mixture was heated to 80° C. for 18 hours. A slightly viscous solution formed, which was diluted with toluene and precipitated into an excess of acetone to isolate the polymer. After filtration and drying in vacuo overnight, 0.34 g (6% yield) of polymer was obtained. Mw=253,000 Mn=87,000 as determined by GPC methods.

EXAMPLE 145

To a mixture of butylnorbornene (5.00 g, 33.0 mmol) and 5-triethoxysilylnorbornene (0.95 g, 3.7 mmol) was added 12 ml of dichloromethane. Approximately 100 µl of a toluene stock solution of (allyl)palladium(tricyclohexylphosphine) trifluoroacetate (Catalyst C, 3 mMol) was combined with lithium tetrakis(pentafluorophenyl)borate·2.5 Et$_2$O (0.0015 g, 0.0017 mmol) in 0.5 ml of toluene, then added to the monomer mixture. The mixture was reacted at 25° C. for 18 hours. A solid puck formed, indicating high conversion.

EXAMPLE 146

To a bottle containing 5-triethoxysilylnorbornene (9.47 g, 37.0 mmol) was added 12 ml of toluene. Approximately 100 µl of a toluene stock solution of (allyl)palladium (tricyclohexylphosphine) trifluoroacetate (Catalyst C, 3 mMol) and 100 µl of a toluene stock solution of ether-free lithium tetrakis(pentafluorophenyl)borate (14.9 mMol) were combined together and diluted with 2 ml of toluene, then added to the monomer mixture. The mixture was heated to 80° C. for 2 hours. A very viscous solution formed which was diluted with toluene and precipitated into an excess of methanol to isolate the polymer. After filtration and drying in vacuo overnight, a conversion of 3.84 g was obtained. Yield 41%. Mw=1,540,000 Mn=417,000 as determined by GPC methods.

EXAMPLE 147

To a mixture of butylnorbornene (5.00 g, 33.0 mmol) and 5-triethoxysilylnorbornene (0.95 g, 3.7 mmol) was added 12 ml of toluene, all having been stored for weeks in the air. Approximately 100 µl of a toluene stock solution of (allyl) palladium(tricyclohexylphosphine) trifluoroacetate (Catalyst C, 3 mMol) and 100 µl of a toluene stock solution of lithium tetrakis(pentafluorophenyl) borate (14.9 mMol) were combined together and diluted with 2 ml of toluene, then added to the monomer mixture. The mixture was heated to 80° C. for 18 hours. A slightly viscous solution resulted, which was diluted with toluene and precipitated into an excess of acetone to isolate the polymer. After filtration and drying in vacuo overnight, a conversion of 0.35 g was obtained. Yield 6%. Mw=772,000 Mn=420,000 as determined by GPC.

EXAMPLE 148

To a mixture of butylnorbornene (5.00 g, 33.0 mmol) and 5-triethoxysilylnorbornene (0.95 g, 3.7 mmol) was added 12 ml of toluene. Approximately 50 µl of a toluene stock solution of (allyl)palladiumchloride dimer (3.0 mMol) and 50 µl of a toluene stock solution of tris(trimethylsilyl) phosphite (6.0 mMol) were combined together and diluted with 2 ml of toluene, then added to a solution of ether-free lithium tetrakis(pentafluorophenyl)borate (0.0010 g, 0.0014 mmol) in 1 ml of toluene. The catalyst solution was then added to the monomer solution, and the mixture was heated (Starting text, top of column 77:)
65° C. After 1 hour, the precipitated polymer/water mixture was poured into methanol, filtered, and dried. Yield 4.45 g (89%).

to 80° C. for 18 hours. A viscous solution formed which was diluted with toluene and precipitated into an excess of acetone to isolate the polymer. After filtration and drying in vacuo overnight, a conversion of 2.35 g was obtained. Yield 39%.

EXAMPLE 149

To a mixture of butylnorbornene (5.00 g, 33.0 mmol) and 5-triethoxysilylnorbornene (0.95 g, 3.7 mmol) was added 12 ml of toluene. Approximately 50 μl of a toluene stock solution of (allyl)palladiumchloride dimer (3.0 mMol) and 50 μl of a toluene stock solution of tris(trimethylsilyl) phosphine (6.0 mMol) were combined together and diluted with 2 ml of toluene, then added to a solution of ether-free lithium tetrakis(pentafluorophenyl)borate (0.0010 g, 0.0014 mmol) in 1 ml of toluene. The catalyst solution was then added to the monomer solution, and the mixture was heated to 80° C. for 18 hours. A viscous solution formed which was diluted with toluene and precipitated into an excess of acetone to isolate the polymer. After filtration and drying in vacuo overnight, a conversion of 2.60 g was obtained. Yield 44%.

EXAMPLE 150

To a mixture of butylnorbornene (5.00 g, 33 mmol) and 5-triethoxysilylnorbornene (0.95 g, 3.7 mmol) was added 12 ml of toluene. Approximately 50 μl of a toluene stock solution of (allyl)palladiumchloride dimer (3.0 mMol) and 50 μl of a toluene stock solution of tri-o-xenylphosphite (6.0 mMol) were combined together and diluted with 2 ml of toluene, then added to a solution of ether-free lithium tetrakis(pentafluorophenyl)borate (0.0010 g, 0.0014 mmol) in 1 ml of toluene. The catalyst solution was then added to the monomer solution, and the mixture was heated to 80° C. for 18 hours. A slightly viscous solution formed which was diluted with toluene and precipitated into an excess of acetone to isolate the polymer. After filtration and drying in vacuo overnight, a conversion of 1.86 g was obtained. Yield 31%. Mw=96,000 Mn=31,000 as determined by GPC methods.

EXAMPLE 151

Butylnorbornene (5 g, 0.033 mol) and triethoxysilylnorbornene (0.95 g, 0.0037 mol) were dissolved in toluene (2 M solution of monomers). (Allyl)palladium (tricyclohexylphosphine)chloride (0.00031 mmol) and AgBF$_4$ (0.00031 mmol) were combined in toluene. The mixture was then added to the monomers. This mixture was heated to 80° C. for 18 hours. The mixture was then added to methanol. No polymer precipitated.

EXAMPLE 152

Butylnorbornene (5.0 g, 0.033 mol), triethoxysilylnorbornene (0.95 g, 0.0037 mol), and lithium tetrakis (pentafluorophenyl)borate·2.5 Et$_2$O (0.0013 g, 0.0015 mmol) were dissolved in toluene (2 M solution of monomers). (Allyl)palladium(tricyclohexylphosphine) chloride (0.00031 mmol) and AgBF$_4$ (0.00031 mmol) were combined in toluene. This solution was added to the monomers. This mixture was heated to 80° C. for 1 hour. A puck formed indicating high conversion.

EXAMPLE 153

Butylnorbornene (5.0 g, 0.033 mol) and lithium tetrakis (pentafluorophenyl)borate·2.5 Et$_2$O (0.0013 g, 0.0015 mmol) were dissolved in toluene (2 M solution of monomers). About 100 μl of an (allyl)palladiumchloride dimer (1.4 mmol) solution in toluene was added to a 100 μl solution of 1,3,5,7,9,11,13-heptacyclopentyl-15-[2-(diphenylphosphino)ethyl]pentacyclo[9.5.1.1$^{3,9}$.1$^{5,15}$.1$^{7,13}$] octasiloxane (2.8 mmol) solution in toluene. This mixture was added to the monomer mixture. After 5 minutes at room temperature a polymeric puck formed indicating high conversion.

EXAMPLE 154

Butylnorbornene (5.0 g, 0.033 mol) and lithium tetrakis (pentafluorophenyl)borate·2.5 Et$_2$O (0.0013 g, 0.0015 mmol) were dissolved in toluene (2 M solution of monomers). About 100 μl of an (allyl)palladiumchloride dimer (1.4 mmol) solution in toluene was added to a 100 μl solution of Sb(SPh)$_3$ (2.8 mmol) solution in toluene. This mixture was added to the monomer mixture. After 64 hours at 80° C. the mixture was poured into acetone to precipitate the polymer, which was filtered and dried. Yield 3.4 g (68%).

EXAMPLE 155

Butylnorbornene (5.0 g, 0.033 mol) and lithium tetrakis (pentafluorophenyl)borate·2.5 Et$_2$O (0.0013 g, 0.0015 mmol) were dissolved in toluene (2 M solution of monomers). About 100 μl of an (allyl)palladiumchloride dimer (1.4 mmol) solution in toluene was added to a 100 μo solution of tris(2,4-di-t-butyl)phenylphosphite (2.8 mmol) solution in toluene. This mixture was added to the monomer mixture. After 1 minute at room temperature a polymeric puck formed indicating high conversion.

EXAMPLE 156

Butylnorbornene (5.0 g, 0.033 mol) and lithium tetrakis (pentafluorophenyl)borate·2.5 Et$_2$O (0.0013 g, 0.0015 mmol) were dissolved in toluene (2 M solution of monomers). About 100 μl of an (allyl)palladiumchloride dimer (1.4 mmol) solution in toluene was added to a 100 μl solution of bis(trimethylsilyl)aminobis(trimethylsilylimino) phosphine (2.8 mmol) solution in toluene. This mixture was added to the monomer mixture. After heating the mixture to 80° C. for 2 hours the solution was added to acetone to precipitate the polymer. The polymer was filtered and dried. Yield 2.4 g (48%).

EXAMPLE 157

A 50 weight percent solution of butylnorbornene (5.0 g, 0.033 mol) was prepared in toluene. Lithium tetrakis (pentafluorophenyl)borate·2.5 Et$_2$O (0.0012 g, 0.0014 mmol) was combined with (allyl)palladiumchloride dimer (100 μl of a 1.4 mmol solution in toluene) and triphenylamine (100 μl of a 2.7 mmol solution in toluene) in toluene and added to the monomer mixture. A polymeric puck formed within 5–10 min at room temperature.

EXAMPLE 158

A 50 weight percent solution of butylnorbornene (5.0 g, 0.033 mol) was prepared in toluene. Lithium tetrakis (pentafluorophenyl)borate·2.5 Et$_2$O (0.0012 g, 0.0014 mmol) was combined with (allyl)platinum (tricyclohexylphosphine)triflate (100 μl of a 2.8 mmol solution in toluene) in toluene and added to the monomer mixture. The mixture was heated to 80° C. for 18 hours. The mixture was poured into acetone to precipitate the polymer. After filtering and drying, 0.15 g of polymer was isolated (3% yield).

EXAMPLE 159

To a thick-walled, septum-sealed glass vial, equipped with a magnetic stir-bar was added 5-butylnorbornene (7.95 g, 53 mmol), toluene (19 ml), palladium ethylhexanoate (82 µl, 0.35 µmol), tricyclohexylphosphine (28 µl, 0.35 µmol), tris(pentafluorophenyl)boron (126 µl, 6.36 µmol) and triethylaluminum (4.2 µl, 1.7 molar in cyclohexane), 7.0 µmol). (Ratio of monomer to palladium, 150,000:1) The resulting stirred solution was placed in a heated oil bath at 67° C. for a total of 3 hours. Within less than 30 minutes the colorless, clear solution was a highly viscous mass that could no longer be stirred. After 3 hours the colorless gel was isolated by breaking the flask, was cut into small pieces using a blade and the material was dissolved in boiling toluene (800 ml) over a period of several hours. The polymer was precipitated by pouring into excess methanol (1 liter), filtered and washed with excess methanol prior to drying to constant weight under vacuum at 80° C.

The dried, white, granular polymer was found to weigh 7.76 g (97.6% conversion). Proton NMR revealed the polymer to be free of any solvents or unconverted monomer.

EXAMPLE 160

To a thick-walled, septum-sealed glass vial, equipped with a magnetic stir bar was added 5-butylnorbornene (7.57 g, 50.4 mmol), triethoxysilylnorbornene (0.68 g, 2.6 mmol), toluene (20 ml), palladium ethylhexanoate (82 µl, 0.35 mol), tricyclohexylphosphine (28 µl, 0.35 mol), tris(pentafluorophenyl)boron (126 µl, 6.36 mol) and triethylaluminum (4.2 µl (1.7 molar in cyclohexane), 7.0 mol). (Ratio of monomers to palladium, 150,000:1). The resulting stirred solution was placed in a heated oil bath at 67° C. for a total of 4 hours. Within 60 minutes the colorless, clear solution was a highly viscous mass that could no longer be stirred. After 4 hours the colorless gel was isolated by breaking the flask, was cut into small pieces using a blade and the material was dissolved in hot toluene. The polymer was precipitated by pouring into excess acetone, filtered and washed with excess acetone prior to drying to constant weight under vacuum at 80° C. The dried, white, granular polymer was found to weigh 4.5 g (55% conversion). Proton NMR revealed the polymer to be a copolymer of butylnorbornene and triethoxysilylnorbornene.

EXAMPLE 161

To a thick-walled, septum-sealed glass vial, equipped with a magnetic stir bar was added 5-butylnorbornene (7.57 g, 50.4 mmol), triethoxysilylnorbornene (0.68 g, 2.6 mmol), toluene (10 ml), palladium ethylhexanoate (0.52 µmol), tricyclohexylphosphine (0.52 µmol), tris(pentafluorophenyl)boron (4.6 µmol) and triethylaluminum (5.2 µmol). (Ratio of monomers to palladium, 100,000:1.) The resulting stirred solution was placed in a heated oil bath at 65° C. for a total of 3 hours. Within 90 minutes the colorless, clear solution was a highly viscous mass that could no longer be stirred. After 3 hours the colorless gel was isolated by breaking the flask, was cut into small pieces using a blade and the material was dissolved in hot toluene. The polymer was precipitated by pouring into excess acetone, filtered and washed with excess acetone prior to drying to constant weight under vacuum at 80° C. The dried, white, granular polymer was found to weigh 5.7 g (70% conversion).

EXAMPLE 162

To a thick-walled, septum-sealed glass vial, equipped with a magnetic stir bar was added 5-butylnorbornene (7.57 g, 50.4 mmol), triethoxysilylnorbornene (0.68 g, 2.6 mmol), toluene (8 ml), palladium ethylhexanoate (2.6 µmol), tricyclohexylphosphine (2.6 µmol), tris(pentafluorophenyl)boron (23.4 µmol) and triethylaluminum (26 µmol). (Ratio of monomers to palladium, 20,000:1.) The resulting stirred solution was placed in a heated oil bath at 65° C. Within 30 seconds the reaction exothermed violently resulting in a solid mass that no longer stirred within 45 seconds indicating that very high conversion had been achieved despite the reaction time of less than 1 minute.

EXAMPLE 163

To a thick-walled, septum-sealed glass vial, equipped with a magnetic stir bar was added 5-butylnorbornene (7.57 g, 50.4 mmol), triethoxysilylnorbornene (0.68 g, 2.6 mmol), toluene (6 ml), bis(triphenylphosphine)palladium dichloride (0.9 mg, 2.6 µmol) in toluene (3 ml), tris(pentafluorophenyl)boron (0.46 ml 23.4 µmol) and triethylaluminum (16 µl (1.7 molar in cyclohexane), 26 µmol). (Ratio of monomers to palladium, 20,000:1) The resulting stirred solution was placed in a heated oil bath at 65° C. for a total of 3 hours. Within 60 minutes the colorless, clear solution was a highly viscous mass that could no longer be stirred. After 3 hours the colorless gel was isolated by breaking the flask, was cut into small pieces using a blade and the material was dissolved in hot toluene. The polymer was precipitated by pouring into excess acetone, filtered and washed with excess acetone prior to drying to constant weight under vacuum at 80° C. The dried, white, granular polymer was found to weigh 4.83 g (60% conversion). Proton NMR revealed the polymer to be a copolymer of butylnorbornene and triethoxysilylnorbornene. The molecular weight (Mw) of the resulting copolymer was found to be 845,000.

Comparative Example 164

To a thick-walled, septum-sealed glass vial, equipped with a magnetic stir bar was added 5-butylnorbornene (7.57 g, 50.4 mmol), triethoxysilylnorbornene (0.68 g, 2.6 mmol), toluene (8 ml), palladium ethylhexanoate (2.6 4 µmol), tris(pentafluorophenyl)boron (23.4 µmol) and triethylaluminum (26 µmol). (Ratio of monomers to palladium, 20,000:1). The resulting stirred solution was placed in heated oil bath at 65° C. for a total of 3 hours. The resulting polymer was precipitated by pouring into excess acetone, filtered and washed with excess acetone prior to drying to constant weight under vacuum at 80° C. The dried, white polymer was found to weigh less than 0.1 g (less than 1.5% conversion). This shows the dramatic improvement of added phosphine ligands on catalyst performance.

EXAMPLE 165

To a thick-walled, septum-sealed glass vial, equipped with a magnetic stir bar was added 5-butylnorbornene (7.95 g, 53 mmol), palladium ethylhexanoate (82 µl, 0.35 µmol), tricyclohexylphosphine (28 µl, 0.35 µmol), tris(pentafluorophenyl)boron (126 µl, 6.36 µmol) and triethylaluminum (4.2 µl (1.7 molar in cyclohexane), 7.0 µmol). (Ratio of monomer to palladium, 150,000:1). There was a rapid increase in viscosity. After 10 minutes the vial was placed in a heated oil bath at 70° C. for 30 minutes, then the temperature was ramped to 100° C. for a further 30 minutes, before being heated to 130° C. for a final period of 60 minutes. The colorless, transparent solid puck was allowed to cool and was then isolated by breaking the vial. The conversion of the puck was measured using TGA methods (DuPont analyzer heated at 10° C. per minute, under nitrogen, from 3° C. to 450° C. and measuring the weight loss at 350° C.). The conversion was found to be 92%.

EXAMPLE 166

A 50 weight percent solution of butylnorbornene (5.0 g, 0.033 mol) was prepared in toluene. Lithium tetrakis (pentafluorophenyl)borate·2.5 $Et_2O$ (0.0012 g, 0.0014 mmol) was combined with (allyl)palladiumchloride dimer (100 μl of a 1.4 mmol solution in toluene) and 2,6-di-t-butylpyridine (100 μl of a 2.9 mmol solution in toluene) in toluene and added to the monomer mixture. A polymeric puck formed within 5–10 min at room temperature.

EXAMPLE 167

To a solution of LiFABA (2.0 mg) and hexylnorbornene (20 g) in 30 ml of toluene was added bis (tricyclohexylphosphine)(hydrido)palladium(II) nitrate (0.8 mg) in 0.5 ml toluene. Ratio of monomer:procatalyst:activator was 100,000:1:2. The reaction was stirred for 3.5 hours at 55° C. during which time the reaction became a rubbery solid. The solid was dissolved in toluene. The product was precipitated in acetone and dried under vacuum to give 19.5 g, 97.5%) of white polymer. Mn (Daltons): 698,861, Mw (Daltons): 3,482,375, Polydispersity: 4.98.

EXAMPLE 168

To a solution of LiFABA (1.9 mg) and hexylnorbornene (18.5 g) and triethoxysilylnorbornene (1.5 g) in 30 ml of toluene was added bis(tricyclohexylphosphine)(hydrido) palladium(II) nitrate (0.8 mg) in 0.5 ml toluene. Ratio of monomer:procatalyst:activator was 100,000:1:2. The reaction was stirred for 3.5 hours at 55° C. during which time the reaction became a gel. The gel was dissolved in toluene. The product was precipitated in acetone and dried under vacuum to give 12.2 g, 61% of white polymer. Mn (Daltons): 1,959,122, Mw (Daltons): 4,394,532, Polydispersity: 2.2. Incorporation of triethoxysilylnorbornene was demonstrated by $^1H$ NMR in $C_6D_6$.

EXAMPLE 169

To a solution of LiFABA (1.2 mg) and butylnorbornene (10.0 g) in toluene (total solution volume 60 ml) was added (allyl)(tricyclohexylphosphine)palladium(II) triflate (0.15 mg) in 1.0 ml toluene. Ratio of monomer:procatalyst:activator was 250,000:1:5. The reaction was stirred for 4 hours at 65° C. during which time the reaction became a rubbery solid. The solid was dissolved in toluene. The product precipitated in acetone and dried under vacuum to give 5.0 g, 50% of white polymer. Molecular weight of product was too high to be measured by available GPC techniques.

EXAMPLE 170

To a solution of LiFABA (1.2 mg) and butylnorbornene (9.9 g) and butenylnorbornene (0.10 g) in toluene (total solution volume 60 ml) was added (allyl) (tricyclohexylphosphine)palladium(II) triflate (0.15 mg) in 1.0 ml toluene. Ratio of monomer:procatalyst:activator was 250,000:1:5. The reaction was stirred for 4 hours at 65° C. during which time the reaction became a rubbery solid. The solid was dissolved in toluene. The product precipitated in acetone and dried under vacuum to give 5.8 g, 58% of white polymer. Mn (Daltons): 290,492, Mw (Daltons): 1,167,790, Polydispersity: 4.0.

EXAMPLE 171

To a solution of LiFABA (1.2 mg) and butylnorbornene (9.5 g) and butenylnorbornene (0.50 g) in toluene (total solution volume 60 ml) was added (allyl) (tricyclohexylphosphine)palladium(II) triflate (0.15 mg) in 1.0 ml toluene. Ratio of monomer:procatalyst:activator was 250,000:1:5. The reaction was stirred for 4 hours at 65° C. The product was precipitated in acetone and dried under vacuum to give 1.5 g, 15% of white polymer. Mn (Daltons): 175,150, Mw (Daltons): 419,563, Polydispersity: 2.4.

EXAMPLE 172

To a solution of LiFABA (1.2 mg) and butylnorbornene (9.0 g) and butenylnorbornene (1.0 g) in toluene (total solution volume 60 ml) was added (allyl) (tricyclohexylphosphine)palladium(II) triflate (0.15 mg) in 1.0 ml toluene. Ratio of monomer:procatalyst:activator was 250,000:1:5. The reaction was stirred for 4 hours at 65° C. The product was precipitated in acetone and dried under vacuum to give 5.8 g, 58% of white polymer. Mn (Daltons): 61,438, Mw (Daltons): 157,953, Polydispersity: 2.6.

EXAMPLE 173

To a solution of LiFABA (1.2 mg) and butylnorbornene (7.5 g) and butenylnorbornene (2.5 g) in toluene (total solution volume 60 ml) was added (allyl) (tricyclohexylphosphine)palladium(II) triflate (0.15 mg) in 1.0 ml toluene. Ratio of monomer:procatalyst:activator was 250,000:1:5. The reaction was stirred for 4 hours at 65° C. The product was precipitated in acetone and dried under vacuum to give 4.1 g, 41% of white polymer. Mn (Daltons): 22,182, Mw (Daltons): 77,524, Polydispersity: 3.5.

EXAMPLE 174

To a solution of DANFABA (0.45 mg) and hexylnorbornene (10.0 g) in toluene (total solution volume was 33 ml) was added (allyl)(tricyclohexylphosphine) (perfluorophenyl)palladium(II) in 1.0 ml toluene. The reaction was stirred for 4 hours at 60° C., the product was precipitated in acetone and dried under vacuum to give a white polymer 1.5 g (15%).

EXAMPLE 175

To a mixture of butylnorbornene (8.41 g, 56.1 mmol) and 5-triethoxysilylnorbornene (1.59 g, 6.21 mmol) was added sodium tetraphenylborate (0.4 mg, 0.0013 mmol). This mixture was diluted with 32 ml of toluene. Approximately 50 μl of a toluene solution of (allyl)palladium chloride dimer (2.5 M) and 20 μl of a toluene solution of tricyclohexylphosphine (12.5 mmol) was diluted to about 1 ml total with toluene and added to the monomer solution. The mixture was heated to 65° C. for 4 hours. The resulting mixture was poured into acetone. No polymer precipitated.

EXAMPLE 176

A stock solution of (allyl)palladium chloride dimer (0.00623 M) and tricyclohexylphosphine (0.0125 M) in toluene was prepared. An 0.05 ml aliquot of this solution was added to a mixture of butylnorbornene (4.59 g, 30.6 mmol), 5-triethoxysilylnorbornene (0.41 g, 1.60 mmol), silica gel (1.0 g, calcined at 220° C. for 24 hours followed by 600° C. for 5 hours), and lithium tetrakis (pentafluorophenyl)borate·2.5$Et_2O$ (1.4 mg, 0.0016 mmol). The contents were heated to 65° C. for 45 minutes and then ramped to 150° C. and held for 15 minutes. The contents were then cooled room temperature. A very hard polymeric puck with suspended silica particles resulted.

EXAMPLE 177

A stock solution of (allyl)palladium chloride dimer (0.00623 M) and tricyclohexylphosphine (0.0125 M) in toluene was prepared. An 0.05 ml aliquot of this solution was added to a mixture of butylnorbornene (4.59 g, 30.6 mmol), 5-triethoxysilylnorbornene (0.41 g, 1.60 mmol), silica gel (0.3 g, calcined at 220° C. for 24 hours followed by 600° C. for 5 hours), and lithium tetrakis (pentafluorophenyl)borate·2.5Et$_2$O (1.4 mg, 0.0016 mmol). The contents were heated to 65° C. for 45 minutes and then ramped to 150° C. and held for 15 minutes. The contents were then cooled room temperature. A very hard polymeric puck with suspended silica particles resulted.

EXAMPLE 178

A stock solution of (allyl)palladium chloride dimer (0.00623 M) and tricyclohexylphosphine (0.0125 M) in toluene was prepared. An 0.05 ml aliquot of this solution was added to a mixture of butylnorbornene (4.59 g, 30.6 mmol), 5-triethoxysilylnorbornene (0.41 g, 1.60 mmol), and lithium tetrakis(pentafluorophenyl)borate·2.5Et$_2$O (1.4 mg, 0.0016 mmol). The contents were placed into a 150° C. bath and held for 30 minutes. The contents were then cooled room temperature. A very hard polymeric puck resulted.

EXAMPLE 179

A stock solution of (allyl)palladium chloride dimer (0.00623 M) and tricyclohexylphosphine (0.0125 M) in toluene was prepared. An 0.04 ml aliquot of this solution was added to a mixture of butylnorbornene (9.18 g, 61.2 mmol), 5-triethoxysilylnorbornene (0.82 g, 3.2 mmol), silica gel (2.00 g, calcined at 220° C. for 24 hours followed by 600° C. for 5 hours), and lithium tetrakis(pentafluorophenyl) borate·2.5Et$_2$O (1.4 mg, 0.0016 mmol). The contents were placed into a 150° C. bath and held for 30 minutes. The contents were then cooled room temperature. A very hard polymeric puck resulted with suspended silica particles.

EXAMPLE 180

A stock solution of (allyl)palladium chloride dimer (0.00623 M) and tricyclohexylphosphine (0.0125 M) in toluene was prepared. An 0.05 ml aliquot of this solution was added to a mixture of hexylnorbornene (5.44 g, 30.6 mmol), 5-triethoxysilylnorbornene (0.41 g, 1.60 mmol), and lithium tetrakis(pentafluorophenyl)borate·2.5Et$_2$O (1.4 mg, 0.0016 mmol). The mixture was allowed to stand at room temperature for 1.5 hours after which time the solution became quite viscous. This mixture was then poured onto a silicon wafer. The wafer was heated to about 265° C. by ramping the temperature from ambient to 170° C., then 200° C., then 225° C., then to 265° C. The wafer was then cooled and immersed in water to facilitate removal of the transparent film. From thin film tensile measurements (ASTM D1708-93), a modulus of 62,500±18,100 psi and elongation at break of 55±21%. No detectable monomer or toluene was observed by $^1$H NMR measurements.

EXAMPLE 181

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (7.16 g, 30.6 mmol), 5-triethoxysilylnorbornene (0.41 g, 1.60 mmol), and lithium tetrakis(pentafluorophenyl)borate·2.5Et$_2$O (1.4 mg, 0.0016 mmol). The mixture was allowed to stand at room temperature for 1.5 hours after which time the mixture became slightly viscous. This mixture was then poured onto a silicon wafer. The wafer was then heated to about 170° C.

The wafer was then cooled and immersed in water to facilitate removal of a transparent film. No detectable monomer or toluene was observed by $^1$H NMR measurements.

EXAMPLE 182

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (7.16 g, 30.6 mmol), 5-triethoxysilylnorbornene (0.41 g, 1.60 mmol), and lithium tetrakis(pentafluorophenyl)-borate·2.5Et$_2$O (1.4 mg, 0.0016 mmol). Some of this mixture was then poured onto a silicon wafer. The wafer was then heated to about 170° C. and held for 15 minutes. The wafer was then cooled and immersed in water to facilitate removal of a transparent film. From thin film tensile measurements (ASTM D1708-93), a modulus of 11,600±1950 psi and elongation at break of 185±11%.

The rest of the mixture prepared above was allowed to stand for 7 days at ambient temperature. The mixture became more viscous, yet mobile. A second film was cast onto a silicon wafer and heated identically to that above. From thin film tensile measurements (ASTM D1708-93), a modulus of 8700±1040 psi and elongation at break of 158±24%.

EXAMPLE 183

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (7.06 g, 30.6 mmol), 5-triethoxysilylnorbornene (0.41 g, 1.60 mmol), exo, trans, exo-norbornadiene dimer (0.06 g, 0.33 mmol) and lithium tetrakis(pentafluorophenyl)borate·2.5Et$_2$O (1.4 mg, 0.0016 mmol). After allowing the mixture to stand for about an hour, it was poured onto a silicon wafer. The wafer was then heated to about 170° C. and held for 30 minutes. The wafer was then cooled and immersed in water to facilitate removal of a transparent film. From thin film tensile measurements (ASTM D1708-93), a modulus of 7600±640 psi and elongation at break of 100±3%.

EXAMPLE 184

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (7.06 g, 30.6 mmol), 5-triethoxysilylnorbornene (0.41 g, 1.60 mmol), Irgafos® 168 (0.06 g, 0.33 mmol) and lithium tetrakis (pentafluorophenyl)borate·2.5Et$_2$O (1.4 mg, 0.0016 mmol). After allowing the mixture to stand for about two hours, it was poured onto a silicon wafer. The wafer was then heated to about 170° C. and held for 30 minutes. The wafer was then cooled and immersed in water to facilitate removal of a transparent film.

EXAMPLE 185

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (6.80 g, 29.1 mmol), 5-triethoxysilylnorbornene (0.39 g, 1.60 mmol), exo, trans, exo-norbornadiene dimer (0.59 g, 3.2 mmol) and lithium tetrakis(pentafluorophenyl)borate·2.5Et$_2$O (1.4 mg, 0.0016 mmol). The mixture was poured onto a silicon wafer to form a thin film of solution. The mixture was then heated to about 170° C. and held for 30 minutes. The wafer was then cooled and immersed in water to facilitate removal of the transparent film. From thin film tensile measurements (ASTM D1708-93), a modulus of 12400±2450 psi and elongation at break of 42±6%.

EXAMPLE 186

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (5.73 g, 24.5 mmol), 5-triethoxysilylnorbornene (0.37 g, 1.45 mmol), exo, trans, exo-norbornadiene dimer (1.18 g, 6.41 mmol) and lithium tetrakis(pentafluorophenyl)borate·2.5Et$_2$O (1.4 mg, 0.0016 mmol). The mixture was poured onto a silicon wafer to form a thin film. The mixture was then heated to about 170° C. and held for 30 minutes. The wafer was then cooled and immersed in water to facilitate removal of the transparent film. From thin film tensile measurements (ASTM D1708-93), a modulus of 43700 psi and elongation at break of 11%.

EXAMPLE 187

An 0.05 ml aliquot of a stock solution of (allyl)palladium (tricyclohexylphosphine) triflate (0.00623 M in toluene) was added to a mixture of hexylnorbornene (5.44 g, 30.6 mmol), 5-triethoxysilylnorbornene (0.41 g, 1.60 mmol), and lithium tetrakis(pentafluoro-phenyl)borate·2.5Et$_2$O (1.4 mg, 0.0016 mmol). This mixture was then poured onto a silicon wafer to form a thin film of solution. The mixture was then heated to about 270° C. for 15 minutes. The wafer was then cooled and immersed in water to facilitate removal of the transparent film. From thin film tensile measurements (ASTM D1708-93), a modulus of 62,000±3400 psi and elongation at break of 68±7%. Dynamic thermogravimetric analysis of the film (10° C./minute, from 35 to 460° C.) showed negligible weight loss at 350° C. (1.0%).

EXAMPLE 188

A stock solution of (allyl)palladium chloride dimer (0.00623 M) and tricyclohexylphosphine (0.0125 M) in toluene was prepared. An 0.05 ml aliquot of this solution was added to a mixture of decylnorbornene (7.16 g, 30.6 mmol), 5-triethoxysilylnorbornene (0.41 g, 1.60 mmol), and lithium tetrakis(pentafluorophenyl)-borate·2.5Et$_2$O (1.4 mg, 0.0016 mmol) which contained 6 weight percent barium titanate (Cabot). This mixture was then poured onto a silicon wafer. The wafer was then heated to about 170° C. and held for 30 minutes. The wafer was then cooled and immersed in water to facilitate removal of a film containing suspended barium titanate particles.

EXAMPLE 189

The above experiment was repeated except a 6 weight percent mixture of lead magnesium niobate-lead titanate (TAMTRON® Y5V183U from Tam Ceramics) was used instead of barium titanate. An opaque, beige film resulted.

EXAMPLE 190

Dimethylanilinium tetrakis(bis(3,5-trifluoromethyl)phenyl)borate (0.002 g, 0.0016 mmol) was added to 5.44 g (30.6 mmol). To this mixture was added about 0.05 ml of a 0.00623 M solution of (allyl)palladium (tricyclohexylphosphine)(methyl) in toluene. This mixture was poured onto a silicon wafer and heated to 270° C. for 15 minutes. A thin film was recovered.

EXAMPLE 191

A stock solution of (allyl)palladium (tricyclohexylphosphine) trifluoroacetate (0.00623 M) in toluene was prepared. An 0.05 ml aliquot of this solution was added to a mixture of decylnorbornene (7.16 g, 30.6 mmol), 5-triethoxysilylnorbornene (0.41 g, 1.6 mmol), and lithium tetrakis(pentafluorophenyl)-borate·2.5Et$_2$O (1.4 mg, 0.0016 mmol) which contained 40 weight percent of lead magnesium niobate (TAMTRON® Y5V183U from Tam Ceramics). This mixture was then poured onto a silicon wafer. The mixture was then heated to about 180° C. and held for 30 minutes. A film containing the lead magnesium niobate was recovered after cooling.

EXAMPLE 192

Lithium tetrakis(pentafluorophenyl)borate·2.5 Et$_2$O (1.4 mg, 0.0016 mmol) was added to hexylnorbornene (5.44 g, 30.6 mmol). To this mixture was added about 0.05 ml of a 0.00623 M solution of (allyl)palladium (tricyclohexylphosphine) trifluoroacetate in toluene. This mixture was poured onto a silicon wafer and heated to 270° C. for 30 minutes. A clear film was recovered.

EXAMPLE 193

A stock solution of (allyl)palladium (tricyclohexylphosphine) trifluoroacetate (0.00623 M) in toluene was prepared. An 0.1 ml aliquot of this solution was added to a mixture of decylnorbornene (7.16 g, 30.6 mmol), 5-triethoxysilylnorbornene (0.41 g, 1.6 mmol), and lithium tetrakis(pentafluorophenyl)-borate·2.5Et$_2$O (2.8 mg, 0.0032 mmol) which contained 40 weight percent of barium titanate (Cabot). This mixture was then poured onto a silicon wafer. The mixture was then heated to about 170° C. and held for 30 minutes. A film containing the barium titanate was recovered after cooling.

EXAMPLE 194

A stock solution of {2-[(dimethylamino)methyl]phenyl-C,N-}palladium(tricyclohexyl-phosphine) triflate (0.00623 M). An 0.75 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)-borate·2.5 Et$_2$O (2.1 mg, 0.0025 mmol). This mixture was then poured onto a silicon wafer. The mixture was then heated to about 270° C. A film was recovered after cooling.

EXAMPLE 195

A stock solution of (allyl)palladium (tricyclohexylphosphine) trifluoroacetate (0.00623 M) in toluene was prepared. An 0.1 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)-borate·2.5 Et$_2$O (2.8 mg, 0.0032 mmol). This mixture was then poured onto a silicon wafer. The mixture was then heated to about 170° C. and held for 30 minutes. A film was recovered after cooling.

EXAMPLE 196

A stock solution of (allyl)palladium (tricyclohexylphosphine) trifluoroacetate (0.00623 M) in toluene was prepared. An 0.1 ml aliquot of this solution was added to a mixture of hexylnorbornene (4.58 g, 25.7 mmol), 5-triethoxysilylnorbornene (1.65 g, 6.45 mmol), and lithium tetrakis(pentafluorophenyl)borate·2.5 Et$_2$O (2.8 mg, 0.0032 mmol). This mixture was then poured onto a silicon wafer. The mixture was then heated to about 270° C. and held for 15 minutes. A transparent film was recovered after cooling.

EXAMPLE 197

A stock solution of (allyl)palladium (tricyclohexylphosphine) trifluoroacetate (0.00623 M) in toluene was prepared. An 0.1 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.8 mg, 0.0032 mmol). This mixture was then poured onto a silicon wafer. The mixture was then heated to about 270° C. and held for 15 minutes. A film was recovered after cooling.

EXAMPLE 198

Approximately 0.18 ml of a deuterated benzene solution of (allyl)palladium(tricyclohexylphosphine)(methyl) (0.0072 M), N,N-dimethylanilinium tetrakis(pentafluorophenyl)borate (0.014 ml), and diethyl ether (0.0072 ml) was added to a mixture of hexylnorbornene (5.44 g, 30.6 mmol) and 5-triethoxysilylnorbornene (0.41 g, 1.6 mmol), and lithium tetrakis(pentafluorophenyl)borate·2.5Et$_2$O (2.8 mg, 0.0032 mmol) which had been sparged with air. This mixture was then poured onto a silicon wafer. The mixture was then heated to about 170° C. and held for 30 minutes. A film was recovered after cooling.

EXAMPLE 199

A stock solution of (allyl)palladium (tricyclohexylphosphine) chloride (0.00623 M) in toluene was prepared. An 0.2 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.2 mg, 0.0026 mmol) which had been sparged with air. This mixture was then poured onto a silicon wafer. The mixture was then heated to about 170° C. and held for 15 minutes. A film was recovered after cooling. Dynamic thermogravimetric analysis of the film (10° C./minute, from 35 to 460° C.) showed negligible weight loss at 350° C. (2.0%).

EXAMPLE 200

A stock solution of (allyl)palladium (tricyclohexylphosphine) chloride (0.00623 M) in toluene was prepared. An 0.1 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (1.1 mg, 0.0013 mmol) which had been sparged with air. This was then heated to about 170° C. and held for 4 hours. A hard polymer puck was recovered after cooling.

EXAMPLE 201

A stock solution of (allyl)palladium (tricyclohexylphosphine) trifluoroacetate (0.00623 M) in toluene was prepared. An 0.2 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.2 mg, 0.0026 mmol) which had been sparged with air. This mixture was then poured onto a silicon wafer. The mixture was then heated to about 170° C. and held for 15 minutes. A film was recovered after cooling which had a thickness of about 20 mils. Dynamic thermogravimetric analysis of the film (10° C./minute, from 35 to 460° C.) showed negligible weight loss at 350° C. (0.9%).

EXAMPLE 202

A stock solution of (allyl)palladium (tricyclohexylphosphine)trifluoroacetate (0.00623 M) in toluene was prepared. An 0.1 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (1.1 mg, 0.0013 mmol) which had been sparged with air. This mixture was heated to about 170° C. and held for 4 hours. A hard polymeric puck was recovered after cooling.

EXAMPLE 203

A stock solution of (allyl)palladium (tricyclohexylphosphine)trifluoroacetate (0.00623 M) in toluene was prepared. An 0.5 ml aliquot of this solution was added to a mixture of hexylnorbornene (5.44 g, 30.6 mmol), 5-glycidylether-2-norbornene (0.24 g, 1.6 mmol), and lithium tetrakis(pentafluorophenyl)borate·2.5 Et$_2$O (5.6 mg, 0.0067 mmol) which had been sparged with air. This mixture was then poured onto a silicon wafer in air. The mixture was then heated to about 170° C. and held for 15 minutes. A film was recovered after cooling.

EXAMPLE 204

A stock solution of (allyl)palladium (tricyclohexylphosphine)trifluoroacetate (0.00623 M) in toluene was prepared. An 0.5 ml aliquot of this solution was added to a mixture of hexylnorbornene (4.58 g, 25.7 mmol), 5-glycidylether-2-norbornene (0.97 g, 6.4 mmol), and lithium tetrakis(pentafluorophenyl)borate·2.5 Et$_2$O (5.6 mg, 0.0067 mmol) which had been sparged with air. This mixture was then poured onto a silicon wafer in air. The mixture was then heated to about 170° C. and held for 15 minutes. A film was recovered after cooling.

EXAMPLE 205

A stock solution of (allyl)palladium (tricyclohexylphosphine) trifluoroacetate (0.00623 M) in toluene was prepared. An 0.83 ml aliquot of this solution was added to a mixture of hexylnorbornene (10.9 g, 61.1 mmol) and 5-triethoxysilylnorbornene (0.82 g, 3.2 mmol). To a separate vial was added lithium tetrakis(pentafluorophenyl)borate·2.5 Et$_2$O (9.0 mg, 0.011 mmol), hexylnorbornene (10.9 g, 61.1 mmol) and 5-triethoxysilylnorbornene (0.82 g, 3.2 mmol). Each mixture was sparged with air. Equal volumes of solution from each vial were mixed and then poured onto a silicon wafer in air. The mixture was then heated to about 170° C. and held for 15 minutes. A transparent film resulted. Dynamic thermogravimetric analysis of the film (10° C./minute, from 35 to 460° C.) showed negligible weight loss at 350° C. (0.9%). The vials were then stored at ambient temperature in air. After 3 days, more of the solution was cast in the same manner. A transparent film resulted. Dynamic thermogravimetric analysis of the film (10° C./minute, from 35 to 460° C.) showed negligible weight loss at 350° C. (2.0%). The vials were stored again at ambient temperature in air. After 4 more days, more of the solution was cast in the same

EXAMPLE 206

A stock solution of (allyl)palladium (tricyclohexylphosphine) trifluoroacetate (0.00623 M) in toluene was prepared. An 0.0.10 ml aliquot of this solution was added to a mixture of hexylnorbornene (10.9 g, 61.1 mmol), 5-triethoxysilylnorbornene (0.82 g, 3.2 mmol), and lithium tetrakis(pentafluorophenyl)borate·2.5 Et$_2$O (2.2 mg, 0.0026 mmol), which had been saturated with disperse red number 1. This mixture was then filtered through a 0.2 μm filter and then was poured onto a silicon wafer in air. The mixture was then heated to about 170° C. and held for 15 minutes. A colored, transparent film resulted.

EXAMPLE 207

A stock solution of (allyl)palladium (tricyclohexylphosphine) trifluoroacetate (0.00623 M) in toluene was prepared. An 0.0.10 ml aliquot of this solution was added to a mixture of hexylnorbornene (10.9 g, 61.1 mmol), 5-triethoxysilylnorbornene (0.82 g, 3.2 mmol), and lithium tetrakis(pentafluorophenyl)borate·2.5 Et$_2$O (2.2 mg, 0.0026 mmol), which had been saturated with disperse orange number 1. This mixture was then filtered through a 0.2 μm filter and then was poured onto a silicon wafer in air. The mixture was then heated to about 170° C. and held for 15 minutes. A colored, transparent film resulted.

EXAMPLE 208

A stock solution of (allyl)palladium (tricyclohexylphosphine) trifluoroacetate (0.00623 M) in toluene was prepared. An 0.0.10 ml aliquot of this solution was added to a mixture of hexylnorbornene (10.9 g, 61.1 mmol), 5-triethoxysilylnorbornene (0.82 g, 3.2 mmol), and lithium tetrakis(pentafluorophenyl)borate·2.5 Et$_2$O (2.2 mg, 0.0026 mmol), which had been saturated with disperse blue number 14. This mixture was then filtered through a 0.2 μm filter and then was poured onto a silicon wafer in air. The mixture was then heated to about 170° C. and held for 15 minutes. A colored, transparent film resulted.

EXAMPLE 209

A stock solution of (allyl)palladium (tricyclohexylphosphine) trifluoroacetate (0.00623 M) in toluene was prepared. An 0.0.10 ml aliquot of this solution was added to a mixture of hexylnorbornene (10.9 g, 61.1 mmol), 5-triethoxysilylnorbornene (0.82 g, 3.2 mmol), and lithium tetrakis(pentafluorophenyl)borate·2.5 Et$_2$O (2.2 mg, 0.0026 mmol), which had been saturated with disperse yellow number 7. This mixture was then filtered through a 0.2 μm filter and then was poured onto a silicon wafer in air. The mixture was then heated to about 170° C. and held for 15 minutes. A colored, transparent film resulted.

EXAMPLE 210

A stock solution of (allyl)palladium (tricyclohexylphosphine) trifluoroacetate (0.00623 M) in toluene was prepared. An 0.0.10 ml aliquot of this solution was added to a mixture of hexylnorbornene (10.9 g, 61.1 mmol), 5-triethoxysilylnorbornene (0.82 g, 3.2 mmol), and lithium tetrakis(pentafluorophenyl)borate·2.5 Et$_2$O (2.2 mg, 0.0026 mmol), which had been saturated with copper naphthalocyanine. This mixture was then filtered through a 0.2 μm filter and then was poured onto a silicon wafer in air. The mixture was then heated to about 170° C. and held for 15 minutes. A colored, transparent film resulted.

EXAMPLE 211

A stock solution of (allyl)palladium (tricyclohexylphosphine) trifluoroacetate (0.00623 M) in toluene was prepared. An 0.2 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.2 mg, 0.0026 mmol), and 5 weight percent Kraton® G1652. This mixture was then poured onto a silicon wafer in air. The wafer was then heated to about 170° C. and held for 15 minutes. A slightly opaque film was recovered after cooling.

EXAMPLE 212

A stock solution of (allyl)palladium (tricyclohexylphosphine) trifluoroacetate (0.00623 M) in toluene was prepared. An 0.2 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.2 mg, 0.0026 mmol), and 10 weight percent Kraton® G1652. This mixture was then poured onto a silicon wafer in air. The wafer was then heated to about 170° C. and held for 15 minutes. A markedly opaque film was recovered after cooling.

EXAMPLE 213

A stock solution of (allyl)palladium (tricyclohexylphosphine) trifluoroacetate (0.00623 M) in toluene was prepared. An 0.2 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.2 mg, 0.0026 mmol), and 2 weight percent Kraton® 1101. This mixture was then poured onto a silicon wafer in air. The film was then heated to about 170° C. and held for 15 minutes. An opaque film was recovered after cooling.

EXAMPLE 214

A stock solution of (allyl)palladium (tricyclohexylphosphine) trifluoroacetate (0.00623 M) in toluene was prepared. An 0.2 ml aliquot of this solution was added to a mixture of hexylnorbornene (5.44 g, 30.6 mmol), 5-triethoxysilylnorbornene (0.41 g, 1.6 mmol), and lithium tetrakis(pentafluorophenyl)borate·2.5 Et$_2$O (2.2 mg, 0.0026 mmol), and 2 weight percent Kraton® 1726. This mixture was then poured onto a silicon wafer in air. The wafer was then heated to about 170° C. and held for 15 minutes. A transparent film was recovered after cooling.

EXAMPLE 215

To a mixture of norbornene (4.84 g, 51.5 mmol) and 5-triethoxysilylnorbornene (3.30 g, 12.9 mmol) was added lithium tetrakis(pentafluorophenyl)borate·2.5 Et$_2$O (2.8 mg, 0.0032 mmol). To this mixture was added (allyl)palladium (tricyclohexylphosphine) triflate (0.10 ml of a 0.0062 M solution in toluene). This mixture was allowed to stand at room temperature until it became viscous. It was then poured, in air, onto a silicon wafer. The wafer ramped up to 170° C. over 20 minutes and then held at this temperature for an additional 5 minutes. A film was recovered after cooling the wafer.

EXAMPLE 216

In air, lithium tetrakis(pentafluorophenyl)borate·2.5 Et$_2$O (3.3 mg, 0.0038 mmol) was dissolved in 5.5 g of ethylnor- (manner. A transparent film resulted. Dynamic thermogravimetric analysis of the film (10° C./minute, from 35 to 460° C.) showed still negligible weight loss at 350° C. (2.7%).)

bornene (45 mmol) and 0.61 g of 5-triethoxysilylnorbornene (2.4 mmol). To this mixture was added (allyl)palladium (tricyclohexylphosphine) trifluoroacetate (0.30 ml of a 0.0062 M solution in toluene). The mixture was cast onto a silicon wafer in air and heated to 170° C. for 20 minutes. A transparent film resulted.

EXAMPLE 217

A stock solution of (allyl)palladium (tricyclohexylphosphine)(trifluoroacetate) (0.00623 M) in toluene was prepared. Lithium tetrakis(pentafluorophenyl)borate·2.5 $Et_2O$ (5.6 mg, 0.0064 mmol) was weighed into a bottle. This bottle was opened to the ambient air and 5-triethoxysilylnorbornene (8.26 g, 32.2 mmol) was added to this bottle. Then, 0.52 ml of the palladium stock solution was added to the bottle containing the lithium salt and the monomer. This solution was heated to 46° C. with stirring while lead magnesium niobate-lead titanate (6.56 g, TAMTRON® Y5V183U from Tam Ceramics) was added. The mixture was heated at 70° C. and stirred at 300 rpm for 7.5 minutes. Then the contents were poured onto an oxidized silicon wafer that had been coated with an 8000 Å thick aluminum metal layer. This wafer was heated to 170° C. for 15 minutes. The wafer was quenched in water. While the aluminum delaminated from the silicon wafer the film continued to adhere to the aluminum film indicating good adhesion of the polymer to the aluminum metal.

The permittivity of the film averaged 5.0 over 1 MHz to 1.1 GHz frequency range, while the loss tangent averaged 0.016 over the same frequency range.

EXAMPLE 218

A stock solution of (allyl)palladium (tricyclohexylphosphine)(triflate) (0.00623 M) in toluene was prepared. Lithium tetrakis(pentafluorophenyl)borate·2.5 $Et_2O$ (0.0089 grams) was weighed into a bottle. This bottle was opened to the ambient air and 5-triethoxysilylnorbornene (10.18 g, 39.7 mmol) was added to this bottle. Then 0.15 ml of palladium stock solution was added to the bottle containing the lithium salt and the monomer. This mixture was heated to 52° C. with stirring (100 to 500 rpm) while lead magnesium niobate-lead titanate (24.43 g, TAMTRON® Y5VI 83U from Tam Ceramics) was added. After 8.5 minutes at 52° C., the solution was ramped to 70° C. in 3 minutes.

After dwelling for 4.5 minutes at 70° C., the mixture was poured from the bottle into a 3 inch diameter ring resting on top of a 4 inch oxidized silicon wafer coated with 8000 Å of aluminum (aluminum had been coated by evaporation). The wafer was ramped from 70° C. to 170° C. in 4 minutes. The mixture was heated for 15 minutes at 170° C. Then, the wafer and ring were removed from the hotplate and quenched in water. As the film contracted, due to its exposure to lukewarm water, the aluminum delaminated from the wafer, but the aluminum remained adhered to the film. This indicates that the adhesion of aluminum is better to the film produced than to the thin (8000 Angstroms) layer of silicon dioxide on top of the silicon wafer.

The permittivity of the film averaged 9.8 over 1 MHz to 1.1 GHz frequency range, while the loss tangent averaged 0.023 over the same frequency range.

EXAMPLE 219

A stock solution of (allyl)palladium (tricyclohexylphosphine)(trifluoroacetate) (0.0249 M) in methylene chloride was prepared. Lithium tetrakis(pentafluorophenyl)borate·2.5 $Et_2O$ (0.011 grams) was weighed into a bottle. This bottle was opened to the ambient air and 5-triethoxysilylnorbornene (8.24 g, 32.2 mmol) was added to the bottle. Approximately 0.26 ml of the catalyst stock solution was added to the above mixture. The mixture was allowed to stir at 90° C. for about 1 minute, then lead magnesium niobate-lead titanate (32.96 g, TAMTRON® Y5V183U from Tam Ceramics) was added. The mixture was allowed to stir for an additional 10 minutes at 90° C. The mixture was then poured onto polyimide film and heated to 90° C. for 15 minutes and then heated to 180° C. for 30 minutes. A composite film resulted.

The permittivity of the film averaged 15.8 over 1 MHz to 1.1 GHz frequency range, while the loss tangent averaged 0.016 over the same frequency range.

EXAMPLE 220

A stock solution of (allyl)palladium (tricyclohexylphosphine)(trifluoroacetate) (0.0249 M) in methylene chloride was prepared. Lithium tetrakis(pentafluorophenyl)borate·2.5 $Et_2O$ (0.011 g) was weighed into a bottle. This bottle was opened to the ambient air and 5-triethoxysilylnorbornene (8.24 g, 32.2 mmol) was added to the bottle. Approximately 0.26 ml of the catalyst stock solution was added to the above mixture. The mixture was allowed to stir at 90° C. for about 1 minute, then lead magnesium niobate-lead titanate (24.72 g, TAMTRON® Y5V183U from Tam Ceramics) was added. The mixture was allowed to stir for an additional 10 minutes at 90° C. The mixture was then poured onto polyimide film and heated to 90° C. for 15 minutes and then heated to 180° C. for 30 minutes. A composite film resulted.

The permittivity of the film averaged 10.8 over 1 MHz to 1.1 GHz frequency range, while the loss tangent averaged 0.014 over the same frequency range.

EXAMPLE 221

Hexylnorbornene (10.88 g, 61.1 mmol), 5-triethoxysilylnorbornene (0.82 g, 3.2 mmol), and lithium tetrakis(pentafluorophenyl)borate·2.5 $Et_2O$ (0.011 g, 0.013 mmol) were combined in air. Approximately 0.51 ml of a 0.0125 M stock solution of (allyl)palladium (tricyclohexylphosphine)(trifluoroacetate) (0.0064 mmol) in toluene was added to the monomer mixture. Next, 35.1 g of lead magnesium niobate-lead titanate (24.72 g, TAMTRON® Y5V183U from Tam Ceramics) was added with vigorous stirring. The mixture was heated to 90° C. for about 10 minutes. After pouring the resulting mixture onto a silicon wafer, the mixture was heated to 90° C. for 15 minutes and then to 180° C. for 30 minutes. A composite film resulted.

The permittivity of the film averaged 6.8 over 1 MHz to 1.1 GHz frequency range, while the loss tangent averaged 0.002 over the same frequency range.

EXAMPLE 222

Lead magnesium niobate-lead titanate (24.72 g, TAMTRON® Y5V183U from Tam Ceramics) was crushed in a Siebtechnik reciprocating grinder for 1 minute. Then a solution of 5-triethoxysilylnorbornene (8.24 g, 32.2 mol), lithium tetrakis(pentafluorophenyl)borate·2.5 $Et_2O$ (0.011 grams, 0.013 mmol), and (allyl)palladium (tricyclohexylphosphine)(trifluoroacetate) (0.0064 mmol) was added to the lead magnesium niobate-lead titanate. The mixture was milled for an additional 3 minutes. The resulting smooth paste was spread onto a glass plate with a doctor blade with a setting of 20 mils. The plate was placed under vacuum and heated to 250° C. over 75 minutes and held at held for 1 hour. Then the plate was cooled under vacuum overnight to give thin composite film was a smooth surface. Examination of cross-sectioned film revealed homogeneous dispersion of the composite.

EXAMPLE 223

Hexylnorbornene (5.44 g, 31.0 mmol), 5-triethoxynorbornene (0.41 g, 1.6 mol), and lithium tetrakis(pentafluorophenyl)borate·2.5Et$_2$O (2.8 mg, 0.0032 mmol) were mixed together in air. To this mixture was added (allyl)palladium(tricyclohexylphosphine)(trifluoroacetate) (0.00064 mmol) as a stock solution (0.0249 ml) in methylene chloride. The resulting mixture was heated to 70° C. for about 10 minutes until significant thickening of the solution was observed. The mixture was then poured onto a glass plate and drawn with a doctor blade. The plate was placed in an oven and slowly ramped to 140° C. and held there for 1 hour. After cooling, the thin film was removed from the glass plate with the aid of cool water. A transparent film measuring about 7 mils thick was recovered. The thickness of the film can be adjusted by changing the doctor blade setting.

EXAMPLE 224

Hexylnorbornene (5.44 g, 30.6 mmol), 5-triethoxysilylnorbornene (0.41 g, 1.6 mmol), and divinyl-terminated polydimethylsiloxane (0.31 g, Gelest DMS-V05), and lithium tetrakis(pentafluorophenyl)borate·2.5Et$_2$O (2.8 mg, 0.0032 mmol) were combined in air. Approximately 0.10 ml of a 0.0062 M toluene solution of (allyl)palladium(tricyclohexylphosphine)(trifluoroacetate) (0.00062 mmol). The mixture was then poured onto a silicon wafer and heated to 90° C. for 15 minutes and then heated to 170° C. for 15 minutes. A transparent film was recovered.

EXAMPLE 225

The experiment was carried out as in the above example, except that different polydimethylsiloxanes were used.

a. Divinyl-terminated polydimethylsiloxane (0.31 g, Gelest DMS-V22, Mn=9400) was used. A very opaque, almost white film was recovered.

b. Divinyl-terminated polydimethylsiloxane (0.31 g, Gelest DMS-V00, Mn=186) was used. A transparent film was recovered.

c. Dimethyl-terminated polydimethylsiloxane (0.31 g, Gelest DMS-T05, Mn=770) was used. A transparent film was recovered.

d. Divinyl-terminated polydimethyldiphenylsiloxane (0.31 g, Gelest PDV-1625, Mn=9500) was used. An opaque film was recovered.

e. Divinyl-terminated polydimethylmonomethylmonovinylsiloxane (0.31 g, Gelest VMM-010) was used. An opaque film was recovered.

EXAMPLE 226 a. Hexylnorbornene (5.44 g, 30.6 mmol), 5-triethoxysilylnorbornene (0.41 g, 1.6 mmol), and divinyl-terminated polydimethylsiloxane (0.31 g, Gelest DMS-V22, Mn=9400), and lithium tetrakis(pentafluorophenyl)borate·2.5Et$_2$O (2.8 mg, 0.0032 mmol) were combined in air. Approximately 0.10 ml of a 0.0062 M methylene chloride solution of allyl)palladium(tricyclohexylphosphine)(trifluoroacetate) (0.00062 mmol). The mixture was heated to 80° C. for about 10 minutes until it became somewhat viscous. The mixture was then poured onto a glass plate and spread with a doctor blade set a 14 mils. The plate was heated to 90° C. under vacuum and held for 30 minutes. Then the plate was heated to 170° C. and held for 15 minutes. An opaque film was recovered.

b. Hexylnorbornene (5.44 g, 30.6 mmol), 5-triethoxysilylnorbornene (0.41 g, 1.6 mmol), and divinyl-terminated polydimethylsiloxane (0.31 g, Gelest DMS-V00, Mn=186), and lithium tetrakis(pentafluorophenyl)borate·2.5Et$_2$O (2.8 mg, 0.0032 mmol) were combined in air. Approximately 0.10 ml of a 0.0062 M methylene chloride solution of (allyl)palladium(tricyclohexylphosphine)(trifluoroacetate) (0.00062 mmol). The mixture was heated to 80° C. for about 10 minutes and it became somewhat viscous. The mixture was then poured onto a glass plate and spread with a doctor blade set at 14 mils. The plate was heated to 90° C. under vacuum and held for 30 minutes. Then the plate was heated to 170° C. and held for 15 minutes. A transparent film was recovered.

EXAMPLE 227

Hexylnorbornene (5.44 g, 30.6 mmol), 5-triethoxysilylnorbornene (0.41 g, 1.6 mmol), tetracyclododecadiene (0.27 g), Irganox® 1076 (0.03 g), divinyl-terminated polydimethylsiloxane (0.32 g, Gelest DMS-V05, Mn=770), and lithium tetrakis(pentafluorophenyl)borate·2.5Et$_2$O (5.6 mg, 0.0064 mmol) were combined in air. The mixture was briefly sonicated to aid in dissolution of the antioxidant. Approximately 0.054 ml of a 0.025 M methylene chloride solution of (allyl)palladium (tricyclohexylphosphine)(trifluoroacetate) (0.0014 mmol). The mixture was heated to 80° C. for about 5 minutes and it became somewhat viscous. The mixture was then poured onto a glass plate and spread with a doctor blade set at 16 mils. The plate was heated to 75° C. under vacuum and held for 20 minutes. Then the plate was heated to 150° C. and held for 10 minutes. A transparent film was recovered.

EXAMPLE 228

Hexylnorbornene (5.44 g, 30.6 mmol), 5-triethoxysilylnorbornene (0.41 g, 1.6 mmol), and sodium tetrakis(3,5-bis(trifluoromethyl)phenyl)borate (2.9 mg, 0.0032 mmol) were combined in air. Approximately 0.10 ml of a 0.0062 M toluene solution of (allyl)palladium (tricyclohexylphosphine)(trifluoroacetate) (0.00062 mmol). The mixture was then poured onto a silicon wafer and heated to 90° C. for 15 minutes and then heated to 170° C. for 15 minutes. A transparent film was recovered.

EXAMPLE 229

A. Hexylnorbornene (5.44 g, 30.6 mmol), 5-triethoxysilylnorbornene (0.41 g, 1.6 mmol), and lithium tetrakis(pentafluorophenyl)borate·2.5Et$_2$O (1.5 mg, 0.0016 mmol), and 0.10 ml of a 0.0031 M stock solution of (allyl)palladium(tricyclohexylphosphine)(triflate) in toluene (0.00031 mmol) were combined in air in a Class 1000 clean room. The mixture was then filtered through a 0.2 μ Teflon® frit with the aid of a syringe into a clean test tube. The test tube was then heated to 90° C. held for 30 minutes and then ramped up to 170° C. and held for 1 hour. The test tube was cooled and the ends of the polymeric cylinder were cut off and polished with #4000 sandpaper to give a completely transparent cylinder of 5 cm length.

B. The above experiment was repeated, except that the following amounts of cocatalyst and catalyst were used: lithium tetrakis(pentafluorophenyl)borate·2.5Et$_2$O (0.9 mg, 0.0011 mmol), and 0.07 ml of a 0.0031 M stock solution of (allyl)palladium(tricyclohexylphosphine)(triflate) in toluene (0.00022 mmol). The test tube was cooled and the ends of the polymeric cylinder were cut off and polished with #4000 sandpaper to give a completely transparent cylinder of 5 cm length.

EXAMPLE 230

Butylnorbornene (5.90 g, 39 mmol) and triethoxysilylnorbornene (0.53 g, 2.1 mmol) were combined with lithium tetrakis(pentafluorophenyl)borate·2.5Et$_2$O (0.9 mg, 0.0011 mmol) in a vial. (Allyl)palladium(triisopropylphosphine)(triflate) (0.00021 mmol) in 67 μl of toluene was added to the vial. The vial was heated to 270° C. for 15 minutes to yield a hard plug of polymer.

EXAMPLE 231

Hexylnorbornene (5.44 g) and triethoxysilylnorbornene (0.41 g) were combined with lithium tetrakis(pentafluorophenyl)borate·2.5Et$_2$O (0.9 mg, 0.0011 mmol) in a vial in air. To this mixture was added (allyl)palladium(tricyclohexylphosphine)(triflate) (0.00022 mmol) from a 0.0031 M solution in toluene. The vial was heated to 90° C. for 30 minutes and then to 230° C. for 30 min. A clear polymer rod resulted.

EXAMPLE 232

Hexylnorbornene (5.44 g) and triethoxysilylnorbornene (0.41 g) were combined with lithium tetrakis(pentafluorophenyl)borate·2.5Et$_2$O (0.7 mg, 0.0008 mmol) in a vial in air. To this mixture was added (allyl)palladium(tricyclohexylphosphine)(triflate) (0.00016 mmol) from a 0.0031 M solution in toluene. The vial was heated to 90° C. for 30 minutes and then to 230° C. for 30 min. A clear polymer rod resulted.

EXAMPLE 233

Hexylnorbornene (5.44 g) and triethoxysilylnorbornene (0.41 g) were combined with lithium tetrakis(pentafluorophenyl)borate·2.5Et$_2$O (0.6 mg, 0.0006 mmol) in a vial in air. To this mixture was added (allyl)palladium(tricyclohexylphosphine)(triflate) (0.00013 mmol) from a 0.0031 M solution in toluene. The vial was heated to 90° C. for 30 minutes and then to 230° C. for 30 min. A clear polymer rod resulted.

EXAMPLE 234

Hexylnorbornene (4.3 g, 24 mmol), triethoxysilylnorbornene (0.41 g, 1.6 mmol), and ethylester of 5-norbornene carboxylic acid (1.07 g, 6.4 mmol) were combined with lithium tetrakis(pentafluorophenyl)borate·2.5Et$_2$O (1.1 mg, 0.013 mmol) in a vial. To this mixture was added (allyl)palladium(trinaphthylphosphine)(triflate) (0.0064 mmol) from a 0.013 M solution in toluene. The mixture was then poured onto a silicon wafer, heated to 90° C. for 15 minutes and then to 180° C. for 30 minutes. A film resulted that showed only 2.7 percent weight loss at 350° C. by TGA (10°/min).

EXAMPLE 235

Triethoxysilylnorbornene (8.24 g, 32 mmol) and lithium tetrakis(pentafluorophenyl)borate·2.5Et$_2$O (11 mg, 0.013 mmol) were mixed in a vial. To this mixture was added (allyl)palladium(tricyclohexylphosphine)(trifluoroacetate) (0.0064 mmol) from a 0.013 M solution in toluene. The mixture was then poured onto a polyimide film, heated to 90° C. for 15 minutes and then to 180° C. for 30 minutes. A film resulted that showed only 7.2 percent weight loss at 350° C. by TGA (10°/min).

EXAMPLE 236

Hexylnorbornene (5.16 g, 29 mmol), triethoxysilylnorbornene (0.41 g, 1.6 mmol), and benzylether of 5-norbornene methanol (0.34 g, 1.6 mmol) were combined with lithium tetrakis(pentafluorophenyl)borate·2.5Et$_2$O (14 mg, 0.016 mmol) were mixed together. The catalyst, (allyl)palladium(tricyclohexylphosphine)trifluoroacetate (0.00032 mmol, 0.13 ml of a 0.025 M solution in methylene chloride), was added to the mixture. The mixture was poured onto a silicon wafer and heated to 90° C. for 15 minutes and then to 170° C. for 15 minutes. A transparent film resulted.

EXAMPLE 237

Hexylnorbornene (5.16 g, 29 mmol), triethoxysilylnorbornene (0.41 g, 1.6 mmol), and phenylnorbornene (0.27 g, 1.6 mmol) were combined with lithium tetrakis(pentafluorophenyl)borate·2.5Et$_2$O (14 mg, 0.016 mmol). The catalyst, (allyl)palladium(tricyclohexylphosphine)trifluoroacetate (0.00032 mmol, 0.13 ml of a 0.025 M solution in methylene chloride), was added to the mixture. The mixture was poured onto a silicon wafer and heated to 90° C. for 15 minutes and then to 170° C. for 15 minutes. A film resulted.

EXAMPLE 238

Hexylnorbornene (5.44 g, 31 mmol), triethoxysilylnorbornene (0.41 g, 1.6 mmol), and Trilene® CP30 (Uniroyal Chemical Co.) (0.31 g) were combined with lithium tetrakis(pentafluorophenyl)borate·2.5Et$_2$O (2.8 mg, 0.00032 mmol) were mixed together. The catalyst, (allyl)palladium(tricyclohexylphosphine)trifluoroacetate (0.00064 mmol, 26 μl of a 0.025 M solution in methylene chloride), was added to the mixture. The mixture was poured onto a silicon wafer and heated to 90° C. for 15 minutes and then to 170° C. for 15 minutes. An opaque film resulted.

EXAMPLE 239

Hexylnorbornene (5.44 g, 31 mmol), triethoxysilylnorbornene (0.41 g, 1.6 mmol), and Trilene® CP40 (Uniroyal Chemical Co.) (0.31 g) were combined with lithium tetrakis(pentafluorophenyl)borate·2.5Et$_2$O (2.8 mg, 0.00032 mmol). The catalyst, (allyl)palladium(tricyclohexylphosphine)trifluoroacetate (0.00064 mmol, 26 μl of a 0.025 M solution in methylene chloride), was added to the mixture. The mixture was poured onto a silicon wafer and heated to 90° C. for 15 minutes and then to 170° C. for 15 minutes. An opaque film resulted.

EXAMPLE 240

Hexylnorbornene (5.44 g, 31 mmol), triethoxysilylnorbornene (0.41 g, 1.6 mmol), and Trilene® CP50 (Uniroyal Chemical Co.) (0.31 g) were combined with lithium tetrakis(pentafluorophenyl)borate·2.5Et$_2$O (2.8 mg, 0.00032 mmol)

were mixed together. The catalyst, (allyl)palladium (tricyclohexylphosphine)trifluoroacetate (0.00064 mmol, 26 μl of a 0.025 M solution in methylene chloride), was added to the mixture. The mixture was poured onto a silicon wafer and heated to 90° C. for 15 minutes and then to 170° C. for 15 minutes. An opaque film resulted.

EXAMPLE 241

Hexylnorbornene (5.44 g, 31 mmol), triethoxysilylnorbornene (0.41 g, 1.6 mmol), and Vistanex® LM—H—LC (Exxon) (0.12 g) were combined with lithium tetrakis(pentafluorophenyl)borate·2.5Et$_2$O (2.8 mg, 0.00032 mmol) were mixed together. The catalyst, (allyl)palladium (tricyclohexylphosphine)trifluoroacetate (0.00064 mmol, 50 μl of a 0.013 M solution in methylene chloride), was added to the mixture. The mixture was poured onto a silicon wafer and heated to 90° C. for 15 minutes and then to 170° C. for 15 minutes. A clear film resulted.

EXAMPLE 242

Hexylnorbornene (5.44 g, 31 mmol), triethoxysilylnorbornene (0.41 g, 1.6 mmol), and Vistanex® LM—MH (Exxon) (0.12 g) were combined with lithium tetrakis (pentafluorophenyl)borate·2.5Et$_2$O (2.8 mg, 0.00032 mmol). The catalyst, (allyl)palladium (tricyclohexylphosphine)trifluoroacetate (0.00064 mmol, 50 μl of a 0.013 M solution in methylene chloride), was added to the mixture. The mixture was poured onto a silicon wafer and heated to 90° C. for 15 minutes and then to 170° C. for 15 minutes. A clear film resulted.

EXAMPLE 243

Hexylnorbornene (5.44 g, 31 mmol), triethoxysilylnorbornene (0.41 g, 1.6 mmol), and Vistanex® MML-100 (Exxon) (0.12 g) were combined with lithium tetrakis(pentafluorophenyl)borate·2.5Et$_2$O (2.8 mg, 0.00032 mmol) were mixed together. The catalyst, (allyl)palladium (tricyclohexylphosphine)trifluoroacetate (0.000064 mmol, 50 μl of a 0.013 M solution in methylene chloride), was added to the mixture. The mixture was poured onto a silicon wafer and heated to 90° C. for 15 minutes and then to 170° C. for 15 minutes. A hazy film resulted.

EXAMPLE 244

Hexylnorbornene (5.44 g, 31 mmol), triethoxysilylnorbornene (0.41 g, 1.6 mmol), and Vistanex® MML-140 (Exxon) (0.12 g) were combined with lithium tetrakis (pentafluorophenyl)borate·2.5Et$_2$O (2.8 mg, 0.00032 mmol). The catalyst, (allyl)palladium (tricyclohexylphosphine)trifluoroacetate (0.00064 mmol, 50 μl of a 0.013 M solution in methylene chloride), was added to the mixture. The mixture was poured onto a silicon wafer and heated to 90° C. for 15 minutes and then to 170° C. for 15 minutes. A hazy film resulted.

EXAMPLE 245

Hexylnorbornene (5.44 g, 31 mmol), triethoxysilylnorbornene (0.41 g, 1.6 mmol), tetracyclododecadiene (0.27 g, 1.7 mmol) and Vistanex® LM—H—LC (Exxon) (0.12 g) were combined with lithium tetrakis(pentafluorophenyl)borate·2.5Et$_2$O (5.6 mg, 0.00064 mmol) were mixed together. The catalyst, (allyl)palladium (tricyclohexylphosphine)trifluoroacetate (0.00013 mmol, 0.10 ml of a 0.013 M solution in methylene chloride), was added to the mixture. The mixture was allowed to thicken in viscosity by standing at room temperature for about 30 minutes in air. The mixture was then poured onto a glass plate and pulled into a film using a doctor blade. The plate was placed into an oven at 65° C. for 30 minutes and then into an oven heated to 120° C. for 30 minutes under a slight vacuum. A clear film resulted. Using ASTM D1938-94, the film demonstrated an average tear force of 29.4 g at 0.18 mm thickness.

EXAMPLE 246

Hexylnorbornene (5.44 g, 31 mmol), triethoxysilylnorbornene (0.41 g, 1.6 mmol), tetracyclododecadiene (0.27 g, 1.7 mmol) and Vistanex® LM-MH (Exxon) (0.12 g) were combined with lithium tetrakis(pentafluorophenyl) borate·2.5Et$_2$O (5.6 mg, 0.00064 mmol). The catalyst, (allyl)palladium(tricyclohexylphosphine)trifluoroacetate (0.00013 mmol, 0.10 ml of a 0.013 M solution in methylene chloride), was added to the mixture. The mixture was allowed to thicken in viscosity by standing at room temperature for about 30 minutes in air. The mixture was then poured onto a glass plate and pulled into a film using a doctor blade. The plate was placed into an oven at 65° C. for 30 minutes and then into an oven heated to 120° C. for 30 minutes under a slight vacuum. A clear film resulted. Using ASTM D1938-94, the film demonstrated an average tear force of 21.6 g at 0.16 mm thickness.

EXAMPLE 247

Hexylnorbornene (5.44 g, 31 mmol), triethoxysilylnorbornene (0.41 g, 1.6 mmol), tetracyclododecadiene (0.27 g, 1.7 mmol) and Vistanex® LM-H-LC (Exxon) (0.24 g) were combined with lithium tetrakis(pentafluorophenyl) borate·2.5Et$_2$O (5.6 mg, 0.00064 mmol) were mixed together. The catalyst, (allyl)palladium (tricyclohexylphosphine)trifluoroacetate (0.00013 mmol, 0.10 ml of a 0.013 M solution in methylene chloride), was added to the mixture. The mixture was poured onto a silicon wafer and heated to 80° C. for 15 minutes and then heated to 170° C. for 15 minutes. A clear film resulted.

EXAMPLE 248

Hexylnorbornene (5.44 g, 31 mmol), triethoxysilylnorbornene (0.41 g, 1.6 mmol), tetracyclododecadiene (0.27 g, 1.7 mmol) and Vistanex® LM—MH (Exxon) (0.24 g) were combined with lithium tetrakis(pentafluorophenyl) borate·2.5Et$_2$O (5.6 mg, 0.00064 mmol). The catalyst, (allyl) palladium(tricyclohexylphosphine)trifluoroacetate (0.00013 mmol, 0.10 ml of a 0.013 M solution in methylene chloride), was added to the mixture. The mixture was poured onto a silicon wafer and heated to 80° C. for 15 minutes and then heated to 170° C. for 15 minutes. A clear film resulted.

EXAMPLE 249

Hexylnorbornene (5.44 g, 31 mmol), triethoxysilylnorbornene (0.41 g, 1.6 mmol), and Vistanex® LM—MH (Exxon) (0.12 g) were combined with lithium tetrakis (pentafluorophenyl)borate·2.5Et$_2$O (5.6 mg, 0.00064 mmol) were mixed together. The catalyst, (allyl)palladium (tricyclohexylphosphine)trifluoroacetate (0.00013 mmol, 100 μl of a 0.013 M solution in methylene chloride), was added to the mixture. The mixture was allowed to stand at room temperature until the viscosity increased. Then the mixture was poured onto a glass plate and pulled into a film using a doctor blade. The film was heated to 70° C. for 30 minutes and then to 120° C. for 30 minutes under a slight vacuum. The resulting film was transparent. Using ASTM D1938-94, the film demonstrated an average tear force of 31.9 g at 0.15 mm thickness.

EXAMPLE 250

Hexylnorbornene (5.44 g, 31 mmol), triethoxysilylnorbornene (0.41 g, 1.6 mmol), and Vistanex® LM—H—LC (Exxon) (0.12 g) were combined with lithium tetrakis (pentafluorophenyl)borate·2.5Et$_2$O (5.6 mg, 0.00064 mmol). The catalyst, (allyl)palladium (tricyclohexylphosphine)trifluoroacetate (0.00013 mmol, 100 µl of a 0.013 M solution in methylene chloride), was added to the mixture. The mixture was allowed to stand at room temperature until the viscosity increased. Then the mixture was poured onto a glass plate and pulled into a film using a doctor blade. The film was heated to 70° C. for 30 minutes and then to 120° C. for 30 minutes under a slight vacuum. The resulting film was transparent. Using ASTM D1938-94, the film demonstrated an average tear force of 20.5 g at 0.11 mm thickness. The film exhibited 1.6% weight loss at 325° C.

EXAMPLE 251

Hexylnorbornene (5.44 g, 31 mmol), triethoxysilylnorbornene (0.41 g, 1.6 mmol), and Vistanex® LM—MS—LC (Exxon) (0.12 g) were combined with lithium tetrakis (pentafluorophenyl)borate·2.5Et$_2$O (5.6 mg, 0.00064 mmol). The catalyst, (allyl)palladium (tricyclohexylphosphine)trifluoroacetate (0.00013 mmol, 100 µl of a 0.013 M solution in methylene chloride), was added to the mixture. The mixture was allowed to stand at room temperature until the viscosity increased. Then the mixture was poured onto a glass plate and pulled into a film using a doctor blade. The film was heated to 70° C. for 30 minutes and then to 120° C. for 30 minutes under a slight vacuum. The resulting film was transparent. Using ASTM D1938-94, the film demonstrated an average tear force of 39.9 g at 0.15 mm thickness.

EXAMPLE 252

Hexylnorbornene (5.44 g, 29 mmol) and 5-norbornene methanol (0.20 g, 1.6 mmol) were combined with lithium tetrakis(pentafluorophenyl)borate·2.5Et$_2$O (5.6 mg, 0.00064 mmol). The catalyst, (allyl)palladium(+-cyclohexylphosphine)trifluoroacetate (0.00013 mmol, 100 µl of a 0.013 M solution in methylene chloride), was added to the mixture. The mixture was poured onto a silicon wafer in the air and heated to 90° C. for 30 minutes then to 170° C. for 15 minutes. A clear film resulted.

EXAMPLE 253

Hexylnorbornene, triethoxysilylnorbornene, benzylether of 5-norbornene methanol, and tetracyclododecene in an 85:5:5:5 molar ratio, respectively, were mixed together along with lithium tetrakis(pentafluorophenyl) borate·2.5Et$_2$O. Ferrocene was added to this mixture until a saturation solution was obtained. To this mixture was added the catalyst, allyl)palladium(tricyclohexylphosphine) trifluoroacetate. The final monomers to catalyst to cocatalyst molar ratio was 25,000:1:2, respectively. The mixture was poured onto a silicon wafer and polymerized to give an orange-colored disk.

EXAMPLE 254

Component A was prepared by combining hexylnorbornene (28.1 mmol), triethoxysilylnorbornene (3.3 mmol), norbornadiene dimer (1.6 mmol), and (allyl)palladium (tricyclohexylphosphine)(trifluoroacetate) (1.3×10$^{-6}$ ml). Component B was prepared by dissolving lithium tetrakis (pentafluorophenyl)borate·2.5 Et$_2$O (3.0 mg, 3.4×10$^{-6}$ ml) in triethoxysilylnorbornene (3.3 mmol) followed by addition of hexylnorbornene (28.1 mmol), norbornadiene dimer (1.6 mmol). 6 ml of component A and 6 ml of component B were separately drawn into individual glass syringes, and combined after filtration through a 0.2 micron filter disk. The combined mixture was cast onto 7"×9" area of glass. The mixture was heated at 65° C. for 30 minutes, and cured at 180° C. for 1 hour leaving an optically transparent, odorless thin film.

EXAMPLE 255

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) (1.9×10$^{-6}$ ml). A 3 wt % blend was prepared by dissolving 0.26 g of a 90:10 hexylnorbornene:triethoxysilylnorbornene copolymer (Mw=360,000) into component A. Component B was prepared by dissolving lithium tetrakis (pentafluorophenyl)borate·2.5 Et$_2$O (4.7 mg, 5.4×10$^{-6}$ ml) in triethoxysilylnorbornene (4.6 mmol) followed by addition of hexylnorbornene (39.3 mmol), tetracyclododecene (2.3 mmol), and 0.09 g Irganox® 1076. A 3 wt % blend was prepared by dissolving 0.26 g of a 90:10 hexylnorbornene:triethoxysilylnorbornene copolymer (Mw=360,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 3.5% weight loss at 325° C.

EXAMPLE 256

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) (1.9×10$^{-6}$ mol). A 5 wt % blend was prepared by dissolving 0.43 g of a 90:10 hexylnorbornene:triethoxysilylnorbornene copolymer (Mw=360,000) into component A. Component B was prepared by dissolving lithium tetrakis (pentafluorophenyl)borate·2.5 Et$_2$O (4.7 mg, 5.4×10$^{-6}$ ml) in triethoxysilylnorbornene (4.6 mmol) followed by addition of hexylnorbornene (39.3 mmol), tetracyclododecene (2.3 mmol), and 0.09 g Irganox® 1076. A 5 wt % blend was prepared by dissolving 0.43 g of a 90:10 hexylnorbornene:triethoxysilylnorbornene copolymer (Mw=360,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 5.6% weight loss at 325° C.

EXAMPLE 257

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) ($1.9 \times 10^{-6}$ ml). A 7 wt % blend was prepared by dissolving 0.60 g of a 90:10 hexylnorbornene:triethoxysilylnorbornene copolymer (Mw=360,000) into component A. Component B was prepared by dissolving lithium tetrakis (pentafluorophenyl)borate·2.5 Et$_2$O (4.7 mg, $5.4 \times 10.6$ ml) in triethoxysilylnorbornene (4.6 ml) followed by addition of hexylnorbornene (39.3 mmol), tetracyclododecene (2.3 mmol), and 0.09 g Irganox® 1076. A 7 wt % blend was prepared by dissolving 0.60 g of a 90:10 hexylnorbornene: triethoxysilylnorbornene copolymer (Mw=360,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation.

EXAMPLE 258

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) ($1.9 \times 10^{-6}$ ml). A 10 wt % blend was prepared by dissolving 0.85 g of a 90:10 hexylnorbornene:triethoxysilylnorbornene copolymer (Mw=270,000) into component A. Component B was prepared by dissolving lithium tetrakis (pentafluorophenyl)borate·2.5 Et$_2$O (4.7 mg, $5.4 \times 10^{-6}$ ml) in triethoxysilylnorbornene (4.6 mmol) followed by addition of hexylnorbornene (39.3 mmol), tetracyclododecene (2.3 mmol), and 0.09 g Irganox 1076. A 10 wt % blend was prepared by dissolving 0.85 g of a 90:10 hexylnorbornene: triethoxysilylnorbornene copolymer (Mw=270,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 3.5% weight loss at 325° C.

EXAMPLE 259

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) ($1.9 \times 10^{-6}$ ml). A 6 wt % blend was prepared by dissolving 0.50 g of a 90:10 hexylnorbornene:triethoxysilylnorbornene copolymer (Mw=270,000) into component A. Component B was prepared by dissolving lithium tetrakis (pentafluorophenyl)borate·2.5 Et$_2$O (4.7 mg, $5.4 \times 10^{-6}$ ml) in triethoxysilylnorbornene (4.6 mmol) followed by addition of hexylnorbornene (39.3 mmol), tetracyclododecene (2.3 mmol), and 0.09 g Irganox® 1076. A 6 wt % blend was prepared by dissolving 0.50 g of a 90:10 hexylnorbornene: triethoxysilylnorbornene copolymer (Mw=270,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 2.7% weight loss at 325° C.

EXAMPLE 260

Component A was prepared by combining hexylnorbornene (39.3 mmol), triethoxysilylnorbornene (4.6 mmol), tetracyclododecene 2.3 mmol), 0.09 g Irganox® 1076, and (allyl)palladium(tricyclohexylphosphine)(trifluoroacetate) ($1.9 \times 10^{-6}$ ml). A 3 wt % blend was prepared by dissolving 0.26 g of a 90:10 hexylnorbornene:triethoxysilylnorbornene copolymer (Mw=270,000) into component A. Component B was prepared by dissolving lithium tetrakis (pentafluorophenyl)borate·2.5 Et$_2$O (4.7 mg, $5.4 \times 10^{-6}$ ml) in triethoxysilylnorbornene (4.6 mmol) followed by addition of hexylnorbornene (39.3 mmol), tetracyclododecene (2.3 mmol), and 0.09 g Irganox® 1076. A 3 wt % blend was prepared by dissolving 0.26 g of a 90:10 hexylnorbornene: triethoxysilylnorbornene copolymer (Mw=270,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 2.5% weight loss at 325° C.

EXAMPLE 261

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) ($1.9 \times 10^{-6}$ ml). A 12 wt % blend was prepared by dissolving 1.18 g of a 90:10 hexylnorbornene:triethoxysilylnorbornene copolymer (Mw=208,000) into component A. Component B was prepared by dissolving lithium tetrakis (pentafluorophenyl)borate·2.5 Et$_2$O (4.7 mg, $5.4 \times 10^{-6}$ ml) in triethoxysilylnorbornene (4.6 mmol) followed by addition of hexylnorbornene (39.3 mmol), tetracyclododecene (2.3 mmol), and 0.09 g Irganox® 1076. A 12 wt % blend was prepared by dissolving 1.18 g of a 90:10 hexylnorbornene: triethoxysilylnorbornene copolymer (Mw=208,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 3.0% weight loss at 325° C.

EXAMPLE 262

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) ($1.9 \times 10^{-6}$ ml). A 8 wt % blend was prepared by dissolving 0.75 g of a 90:10 hexylnorbornene:triethoxysilylnorbornene copolymer (Mw=208,000) into component A. Component B was prepared by dissolving lithium tetrakis (pentafluorophenyl)borate·2.5 Et$_2$O (4.7 mg, $5.4 \times 10^{-6}$ ml) in triethoxysilylnorbornene (4.6 mmol) followed by addition of hexylnorbornene (39.3 mmol), tetracyclododecene (2.3 mmol), and 0.09 g Irganox® 1076. An 8 wt % blend was prepared by dissolving 0.75 g of a 90:10 hexylnorbornene: triethoxysilylnorbornene copolymer (Mw=208,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 3.7% weight loss at 325° C.

EXAMPLE 263

Component A was prepared by combining hexylnorbornene (39.3 mmol), triethoxysilylnorbornene (4.6 mmol), tetracyclododecene (2.3 mmol), 0.09 g Irganox® 1076, and (allyl)palladium(tricyclohexylphosphine)(trifluoroacetate) ($1.9 \times 10^{-6}$ ml). A 4 wt % blend was prepared by dissolving 0.36 g of a 90:10 hexylnorbornene:triethoxysilylnorbornene copolymer (Mw=208,000) into component A. Component B was prepared by dissolving lithium tetrakis(pentafluorophenyl)borate*2.5 $Et_2O$ (4.7 mg, $5.4 \times 10^{-6}$ ml) in triethoxysilylnorbornene (4.6 mmol) followed by addition of hexylnorbornene (39.3 mmol), tetracyclododecene (2.3 mmol), and 0.09 g Irganox® 1076. A 4 wt % blend was prepared by dissolving 0.36 g of a 90:10 hexylnorbornene:triethoxysilylnorbornene copolymer (Mw=208,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 3.7% weight loss at 325° C.

EXAMPLE 264

Component A was prepared by combining hexylnorbornene (39.3 mmol), triethoxysilylnorbornene (4.4 mmol), 0.09 g Irganox® 1076, and (allyl)palladium(tricyclohexylphosphine)(trifluoroacetate) ($1.9 \times 10^{-6}$ ml). A 6 wt % blend was prepared by dissolving 0.75 g of a 90:10 hexylnorbornene:triethoxysilylnorbornene copolymer (Mw=270,000) into component A. Component B was prepared by dissolving lithium tetrakis(pentafluorophenyl)borate·2.5 $Et_2O$ (4.7 mg, $5.4 \times 10^{-6}$ ml) in triethoxysilylnorbornene (4.4 mmol) followed by addition of hexylnorbornene (39.3 mmol), and 0.09 g Irganox® 1076. A 6 wt % blend was prepared by dissolving 0.75 g of a 90:10 hexylnorbornene:triethoxysilylnorbornene copolymer (Mw=270,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film having dimple-like regions of phase separation. The film exhibited 1.7% weight loss at 325° C.

EXAMPLE 265

Component A was prepared by combining hexylnorbornene (39.3 mmol), triethoxysilylnorbornene (2.0 mmol), 0.08 g Irganox® 1076, and (allyl)palladium(tricyclohexylphosphine)(triflate) ($3.3 \times 10^{-6}$ ml). A 6 wt % blend was prepared by dissolving 0.75 g of a 95:5 butylnorbornene:triethoxysilylnorbornene copolymer (Mw=205,000) into component A. Component B was prepared by dissolving lithium tetrakis(pentafluorophenyl)borate·2.5 $Et_2O$ (4.6 mg, $5.3 \times 10^{-6}$ ml) followed by addition of hexylnorbornene (39.3 mmol), and 0.08 g Irganox® 1076. A 6 wt % blend was prepared by dissolving 0.75 g of a 95:5 butylnorbornene:triethoxysilylnorbornene copolymer (Mw=205,000) into component B. 6 ml of viscous component A and 6 ml of viscous component B were separately drawn into individual glass syringes, and combined. The combined solution was cast onto 7"×9" area of glass. The mixture was heated at 65° C. for 30 minutes, and cured at 180° C. for 1 hour leaving an optically transparent, odorless thin film. No regions of phase separation were observed.

EXAMPLE 266

Component A was prepared by combining hexylnorbornene (28 mmol), triethoxysilylnorbornene (1.5 mmol), and (allyl)palladium(tricyclohexylphosphine)(trifluoroacetate) ($1.7 \times 10^{-6}$ ml). A 6 wt % blend was prepared by dissolving 0.33 g of a 80:20 hexylnorbornene:triethoxysilylnorbornene copolymer (Mw=170,000) into component A. Component B was prepared by dissolving lithium tetrakis(pentafluorophenyl)borate·2.5 $Et_2O$ (3.0 mg, $3.4 \times 10^{-6}$ ml) in triethoxysilylnorbornene (1.5 mmol) followed by addition of hexylnorbornene (28 mmol). A 6 wt % blend was prepared by dissolving 0.33 g of a 80:20 hexylnorbornene:triethoxysilylnorbornene copolymer (Mw=170,000) into component B. 6 ml of viscous component A and 6 ml of viscous component B were separately drawn into individual glass syringes, and combined. The combined solution was cast onto a 7"×9" area. The mixture was heated at 65° C. for 30 minutes and cured at 180° C. for 1 hour leaving an optically transparent, odorless thin film. No regions of phase separation were observed.

EXAMPLE 267

Component A was prepared by combining hexylnorbornene (34 mmol), 5-triethoxysilylnorbornene (3.7 mmol), and (allyl)platinum(tricyclohexylphosphine) triflate ($4.5 \times 10^{-6}$ ml). Component B was prepared by dissolving lithium tetrakis(pentafluorophenyl)borate·2.5 $Et_2O$ (6.0 mg, $6.9 \times 10^{-6}$ ml) in 5-triethoxysilylnorbornene (3.7 mmol) followed by addition of hexylnorbornene (34 mmol). Components A and B were combined via syringe, heated while under nitrogen at 80° C. for 8 hours until a solid slightly opaque puck was obtained.

EXAMPLE 268

Component A was prepared by combining hexylnorbornene (34 mmol) and (methallyl) nickel (tricyclohexylphosphine) triflate ($5.5 \times 10^{-5}$ ml). Component B was prepared by dissolving lithium tetrakis(pentafluorophenyl)borate·2.5 $Et_2O$ (60.0 mg, $6.9 \times 10^{-5}$ ml) in 150 μl dichloromethane followed by addition of hexylnorbornene (34 mmol). Components A and B were combined via syringe and while under nitrogen at 80° C. for 8 hours until a solid, light orange puck was obtained.

EXAMPLE 269

Component A was prepared by combining hexylnorbornene (34 mmol) and (allyl)platinum (tricyclohexylphosphine) triflate ($3.8 \times 10^{-5}$ ml). Component B was prepared by dissolving lithium tetrakis(pentafluorophenyl)borate·2.5 $Et_2O$ (60.0 mg, $6.9 \times 10^{-5}$ ml) in 150 μl dichloromethane followed by addition of hexylnorbornene (34 mmol). Components A and B were combined via syringe, heated while under nitrogen at 80° C. for 8 hours until a solid slightly opaque puck was obtained.

EXAMPLE 270

Perfluorohexylnorbornene monomer (3 g, 7.3 mmol) was combined with lithium tetrakis(pentafluorophenyl)

borate·2.5Et$_2$O (3.0 mg, 0.0034 mmol). The mixture was sonicated in order to dissolve the solid in the monomer. The catalyst, (allyl)palladium(tricylcohexylphosphine) trifluoroacetate (0.03 ml of a 0.0128 M solution in methylene chloride) was added to the mixture. The mixture was then poured onto a mold placed on a hot plate maintained at 65° C. The solution was heated at 65° C. for 15 minutes, then at 90° C. for 15 minutes, then at 130° C. for 15 minutes, and finally at 180° C. for 30 minutes. A clear, transparent film was obtained, which was insoluble in organic solvents and perfluorinated solvents.

EXAMPLE 271

Hexylnorbornene (1 g, 5.6 mmol) and 5-(perfluorobutyl) norbornene (1.17 g, 3.7 mmol) were combined with lithium tetrakis(pentafluorophenyl)borate.2.5Et$_2$O (1.6 mg, 0.0018 mmol). To this mixture, the catalyst (allyl)palladium (tricylcohexylphosphine)trifluoroacetate (0.03 ml of a 0.0128 M solution in methylene chloride) was added. The mixture was allowed to increase in viscosity and then poured onto a glass plate and spread out using a doctor-blade. The glass plate was placed in an oven at 65° C. for 30 minutes and then under vacuum at 100° C. for 60 minutes. An optically clear film was obtained.

EXAMPLE 272

Synthesis of deuterated cyclopentadiene.

Method 1: This method is a modification of a procedure described in the literature: Renaud, R. N., Stephens, J. C J. Label. Compounds 1967, 3 (suppl. No. 1), 416–419.

A high pressure autoclave equipped with an agitator, was charged with freshly cracked cyclopentadiene (46.8 g, 0.71 mol). This was quickly followed by a solution of sodium carbonate (25 g, 0.24 mol) in deuterium oxide (100 g). The temperature is increased to 160° C. and maintained at that temperature for 40 hours. After the reactor had cooled to room temperature, the resulting emulsion was removed from the reactor and allowed to separate. The organic layer was then separated from the aqueous layer. It is cracked to obtain the deuterated cyclopentadiene.

Method 2: This method is modification of the procedure described in the literature: Lambert, J. B., Finzel, R. B. J. Am. Chem. Soc. 1983, 105, 1954–1958.

To a mixture of freshly cracked cyclopentadiene (50 g) and dimethyl sulfoxide (40 ml), maintained at 0° C., was added a NaOD/D$_2$O mixture. The NaOD/D$_2$O mixture was obtained by adding sodium metal (10 g) to deuterium oxide (60 ml) while maintaining the temperature below 10° C. The mixture was allowed to stir vigorously for 1 hour. The top layer, which contained the cyclopentadiene was then separated and stirred with a fresh mixture of NaOD/D$_2$O. This process was repeated a total of 4 times. The final product (35 ml) was then distilled.

EXAMPLE 273

Deuterocyclopentadiene (10 g, 0.14 mol) was combined with 1H, 1H, 2H-perfluoro-1-octene (50 g, 0.15 mol). The mixture was allowed to stir at 0° C. for 2 hours and was heated to reflux for 2 hours. After the solution had cooled down, the product was obtained by vacuum distillation. Obtained pure product, 1,2,3,4,7,7-hexadeutero-5-(perfluorobutyl) norbornene (30 g, 52% yield).

EXAMPLE 274

Hexylnorbornene (2 g, 11.2 mmol) and 1,2,3,4,7,7-hexadeutero-5-(perfluorobutyl)norbornene (3.6 g, 11.2 mmol) were combined with lithium tetrakis (pentafluorophenyl)borate.2.5Et$_2$O (3.9 g, 0.0044 mmol). To this mixture, the catalyst (allyl)palladium (tricylcohexylphosphine)trifluoroacetate (0.07 ml of a 0.0128 M solution in methylene chloride) was added. The solution was allowed to increase in viscosity and then poured onto a glass plate and spread out using a doctor-blade. The glass plate was placed in an oven at 65° C. for 30 minutes and under vacuum at 100° C. for 60 minutes. An optically clear film was obtained.

EXAMPLE 275

Hexylnorbornene (6 g, 34 mmol), triethoxysilylnorbornene (0.66 g, 2.6 mmol), tetracylcododecane (2.05 g, 12.8 mmol) and tetracyclododecadiene (0.41 g, 2.6 mmol) were combined with lithium tetrakis(pentafluorophenyl) borate.2.5Et$_2$O (3.0 mg, 0.0034 mmol). To this mixture, the catalyst (allyl)palladium(tricylcohexylphosphine) trifluoroacetate (0.05 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 200° C. and the mixture was maintained at this temperature for 90 minutes. An optically clear rod of the polymer was obtained by carefully breaking the test tube.

EXAMPLE 276

Hexylnorbornene (6 g, 34 mmol), triethoxysilylnorbornene (0.62 g, 2.4 mmol) and tetracylcododecane (1.9 g, 11.8 mmol) were combined with lithium tetrakis (pentafluorophenyl)borate.2.5Et$_2$O (3.0 mg, 0.0034 mmol). To this mixture, the catalyst (allyl)palladium (tricylcohexylphosphine)trifluoroacetate (0.05 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 200° C. and the mixture was maintained at this temperature for 90 minutes. A clear rod of the polymer was obtained by carefully breaking the test tube.

Hexylnorbornene (5 g, 28.1 mmol), triethoxysilylnorbornene (0.39 g, 1.5 mmol) and benzylether of 5-norbornene methanol (0.35 g, 1.6 mmol) were combined with lithium tetrakis(pentafluorophenyl)borate.2.5Et$_2$O (2.3 mg, 0.0026 mmol). To this mixture, the catalyst (allyl)palladium (tricylcohexylphosphine)trifluoroacetate (0.05 ml of a 0.01280 M solution in methylene chloride) was added. The solution was filtered through a 0.2 micron PTFE syringe filter into a test tube. This was then placed in an oil bath maintained at 90° C. for 60 minutes. The temperature was then increased to 200° C. and the solution was maintained at this temperature for 90 minutes. An optically clear rod of the polymer was obtained by carefully breaking the test tube.

EXAMPLE 277

Hexylnorbornene (6 g, 33.7 mmol), triethoxysilylnorbornene (1.1 g, 4.3 mmol), benzylether of 5-norbornene methanol (0.45 g, 2.1 mmol) and tetracyclodecadiene (0.33 g, 2.1 mmol) were combined with lithium tetrakis (pentafluorophenyl)borate.2.5Et$_2$O (1.8 mg, 0.0021 mmol). To this mixture, the catalyst (allyl)palladium (tricylcohexylphosphine)trifluoroacetate (0.07 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 180° C. and the mixture was maintained at this temperature for 120 minutes. An optically clear rod of the polymer was obtained by carefully breaking the test tube.

2-methyl propylnorbornene (7.0 g, 46 mmol), triethoxysilylnorbornene (1.33 g, 5.2 mmol) and Irganox® 1076 (0.8 g, 1 wt %) (Ciba Geigy) were combined with lithium tetrakis(pentafluorophenyl)borate.2.5Et$_2$O (5.6 mg, 0.0063 mmol). To this mixture, the catalyst (allyl)palladium (tricylcohexylphosphine)trifluoroacetate (0.1 ml of a 0.0128 M solution in methylene chloride) was added. This mixture was filtered through a 0.2 micron PTFE filter and poured onto a mold on a glass plate and placed in an oven maintained at 65° C. for 30 minutes. The glass plate was then heated at 180° C. for 60 minutes. Obtained an optically clear film.

EXAMPLE 278

Hexylnorbornene (4.7 g, 26 mmol), 2-methyl propylnorbornene (4.0 g, 26 mmol), triethoxysilylnorbornene (1.50 g, 6.0 mmol) and Irganox® 1076 (1.2 g, 1 wt %) (Ciba-Geigy) were combined with lithium tetrakis(pentafluorophenyl)borate.2.5Et$_2$O (6.3 mg, 0.0072 mmol). To this mixture, the catalyst (allyl)palladium(tricylcohexylphosphine) trifluoroacetate (0.11 ml of a 0.0128 M solution in methylene chloride) was added. This mixture was filtered through a 0.2 micron PTFE filter and poured onto a mold on a glass plate and placed in an oven maintained at 65° C. for 30 minutes. The glass plate was then heated at 180° C. for 60 minutes. An optically clear film was obtained.

EXAMPLE 279

Hexylnorbornene (12.0 g, 67.4 mmol), triethoxysilylnorbornene (2.05 g, 8.0 mmol), norbornadiene dimer (0.74 g, 4.0 mmol) were combined with lithium tetrakis (pentafluorophenyl)borate.2.5Et$_2$O (5.5 mg, 0.0063 mmol). To this mixture was added an antioxidant, Irganox® 1076 (0.15 g) (Ciba Geigy). The catalyst, (allyl)palladium (tricylcohexylphosphine)trifluoroacetate (0.25 ml of a 0.0128 M solution in methylene chloride) was added to the mixture. The mixture was then poured onto a mold on a glass plate and heated in an oven at 65° C. for 30 minutes. It was then heated at 180° C. for 60 minutes. The film obtained was optically clear.

EXAMPLE 280

Component A was prepared by combining hexylnorbornene (28.1 mmol) triethoxysilylnorbornene (3.3 mmol), and (allyl)palladium(tricyclohexylphosphine) (trifluoroacetate) (2.5×10$^{-6}$ ml). Component B was prepared by dissolving lithium tetrakis(pentafluorophenyl)borate·2.5 Et$_2$O (5×10$^{-6}$ ml) in triethoxysilylnorbornene (3.3 mmol) followed by addition of hexylnorbornene (28.1 mmol). 6 ml of component A and 6 ml of component B were separately drawn into individual glass syringes, and combined after filtration through a 0.2 μm filter disk. The combined solution was cast onto 7"×9" area of glass. The cast solution was heated at 65° C. for 30 minutes in an air recirculating oven. This film was then cut into 12 pieces and then cured at the following temperatures (160, 170 and 180° C.) in an air recirculating oven and removed at 15 minute intervals to form optically transparent thin films. These films were then analyzed using thermogravimetric analysis (nitrogen purge, analysis heating rate is 10° C./minute). See table below.

| | Temperature (C.) | Time (min) | % loss @ 250 | % loss @ 300 | % loss @ 320 |
|---|---|---|---|---|---|
| A | 180 | 15 | 1.67 | 2.36 | 2.78 |
| B | 180 | 30 | 0.84 | 1.66 | 2.11 |
| C | 180 | 45 | 0.68 | 1.35 | 1.79 |
| D | 180 | 60 | 0.65 | 1.35 | 1.79 |
| E | 170 | 15 | 1.71 | 2.45 | 2.93 |
| F | 170 | 30 | 0.86 | 1.65 | 2.09 |
| G | 170 | 45 | 0.27 | 1.23 | 1.63 |
| H | 170 | 60 | 0.47 | 1.23 | 1.68 |
| I | 160 | 15 | 1.83 | 2.79 | 3.19 |
| J | 160 | 30 | 0.61 | 1.70 | 2.04 |
| K | 160 | 45 | 0.37 | 1.37 | 1.76 |
| L | 160 | 60 | 0.34 | 1.16 | 1.61 |

EXAMPLE 281

Hexylnorbornene (5 g, 28.1 mmol), triethoxysilyl norbornene (0.39 g, 1.5 mmol) and benzylether of 5-norbornene methanol (0.35 g, 1.6 mmol) were combined with lithium tetrakis(pentafluorophenyl)borate·2.5Et$_2$O (2.3 mg, 0.0026 mmol). To this mixture, the catalyst (allyl)palladium (tricyclohexylphosphine)trifluoroacetate (0.05 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 200° C. and the mixture was maintained at this temperature for 90 minutes. An optically clear rod of the polymer was obtained by carefully breaking the test tube.

EXAMPLE 282

Hexylnorbornene (6 g, 33.7 mmol), triethoxysilyl norbornene (1.1 g, 4.3 mmol), benzylether of 5-norbornene methanol (0.45 g, 2.1 mmol) and tetracyclodecadiene (0.33 g, 2.1 mmol) were combined with lithium tetrakis (pentafluorophenyl)borate·2.5Et$_2$O (1.8 mg, 0.0021 mmol). To this mixture, the catalyst (allyl)palladium (tricyclohexylphosphine)trifluoroacetate (0.07 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 180° C. and the mixture was maintained at this temperature for 120 minutes. An optically clear rod of the polymer was obtained by carefully breaking the test tube.

EXAMPLE 283

Hexylnorbornene (5 g, 28.1 mmol.) and triethoxysilylnorbornene (0.38 g, 1.5 mmol.) were combined with lithium tetrakis(pentafluorophenyl)borate·2.5Et$_2$O (1.2 mg, 0.001 mmol). To this mixture, the catalyst (allyl)palladium (tricyclohexylphosphine)trifluoroacetate (0.05 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 200° C. and the mixture was maintained at this temperature for 90 minutes. An optically clear rod of the polymer was obtained by carefully breaking the test tube.

EXAMPLE 284

Hexylnorbornene (5 g, 28.1 mmol.), triethoxysilylnorbornene (0.85 g, 3.3 mmol.) and tetracyclododecadiene (0.26 g, 1.64 mmol.) were combined with lithium tetrakis(pentafluorophenyl)borate·2.5Et$_2$O (1.4 mg, 0.001 mmol). To this mixture, the catalyst (allyl)palladium(tricyclohexylphosphine)trifluoroacetate (0.05 ml of a 0.0128 M solution in methylene chloride) was added. The mixture was filtered through a 0.2 micron PTFE syringe filter into a test tube. This was then placed in an oil bath maintained at 90° C. for 60 minutes. The temperature was then increased to 200° C. and the mixture was maintained at this temperature for 90 minutes. An optically clear rod of the polymer was obtained by carefully breaking the test tube.

EXAMPLE 285

Palladium(II) trifluoroacetate (0.50 g, 1.5 mmol), allyl-tributyltin (0.50 g, 1.5 mmol), and tricyclohexylphosphine (0.42 g, 1.5 mmol) were mixed in toluene under nitrogen. After about an 1–½ hours, some black precipitate formed. The mixture was filtered though Celite®. The resulting orange solution was stored in the freezer overnight. The next day, the solution was refiltered through Celite®. The solvent was removed in vacuo from the filtrate. The resulting solid was washed with pentane. A colorless solid was obtained. Yield 0.39 g. $^{31}$P NMR (CD$_2$Cl$_2$): δ 41.6 (s) and unidentified peak at 24.2 (s, approx. 20% of the total). $^1$H NMR (CD$_2$Cl$_2$): δ 5.47 (m, 1H), 4.79 (t, 1H), 3.83 (d of d, 1H), 3.25 (s, 1H), 2.51 (d, 1H), and peaks from 1.9 to 1.0 due to tricyclohexylphosphine.

EXAMPLE 286

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of palladium(II) acetate (0.28 μmol) and tricyclohexylphosphine (0.28 μmol) in fluorobenzene. The mixture was heated to 80° C. for 10 minutes. An immobile polymer puck resulted, suggesting high conversion.

EXAMPLE 287

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of palladium(II) trifluoroacetate (0.28 μmol) and tricyclohexylphosphine (0.28 μmol) in fluorobenzene. The mixture was heated to 80° C. for 10 minutes. An immobile polymer puck resulted, suggesting high conversion.

EXAMPLE 288

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of palladium(II) acetylacetonate (0.28 μmol) and tricyclohexylphosphine (0.28 μmol) in fluorobenzene. The mixture was heated to 80° C. for 10 minutes. An immobile polymer puck resulted, suggesting high conversion.

EXAMPLE 289

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of palladium(0) bis(tricyclohexylphosphine) is (0.28 μmol) in toluene. The mixture was heated to 80° C. overnight. An immobile polymer puck resulted, suggesting high conversion.

EXAMPLE 290

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of bis(tricyclohexylphosphine)palladium dichloride (0.28 μmol) in methylene chloride. The mixture was heated to 65° C. for 18 hours. An immobile polymer puck resulted, suggesting high conversion.

EXAMPLE 291

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of bis(triethylphosphine)palladium dichloride (0.28 μmol) in methylene chloride. The mixture was heated to 65° C. for 18 hours. An immobile polymer puck resulted, suggesting high conversion.

EXAMPLE 292

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of bis(triphenylphosphine)palladium dichloride (0.28 μmol) in methylene chloride. The mixture was heated to 65° C. for 18 hours. An immobile polymer puck resulted, suggesting high conversion.

EXAMPLE 293

To a mixture of butylnorbornene (5.0 g, 33 mmol) was added lithium tetrakis(penta-fluorophenyl)borate·2.5 Et$_2$O (1.2 mg, 0.0014 mmol). This 20 mixture was diluted to 16 ml with toluene. To this mixture was added 50 μL of a 5.5 mMol solution of bis(tri-o-tolylphosphine)palladium dichloride (0.28 μmol) in methylene chloride. The mixture was heated to 65° C. for 18 hours. An immobile polymer puck resulted, suggesting high conversion.

EXAMPLE 294

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of bis(tributylphosphine)nickel dibromide (0.28 μmol) in methylene chloride. The mixture was heated to 65° C. for 18 hours. An immobile polymer puck resulted, suggesting high conversion.

EXAMPLE 295

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with toluene. To this mixture was added 50 μL of a 5.5 mMol solution of bis(triphenyllphosphine)nickel dibromide (0.28 μmol) in methylene chloride. The mixture was heated to 65° C. for 18 hours. A viscous solution resulted. The solution was diluted with toluene and poured into an excess of acetone to precipitate the polymer. The polymer was filtered, and dried under vacuum at 65° C. Yield 4 g (80%).

EXAMPLE 296

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 mL with toluene. To this mixture was added 50 µL of a 5.5 mMol solution of nickel bis(cyclooctadiene) (0.28 µmol) in methylene chloride and 2-(diphenylphosphino)benzoic acid (0.28 µmol). The mixture was heated to 65° C. for 18 hours. The solution was diluted with toluene and poured into an excess of acetone to precipitate the polymer. The polymer was filtered, and dried under vacuum at 65° C. Yield 1 g (20%).

EXAMPLE 297

Palladium(II) acetate (0.0056 g) and tricyclohexylphosphine (0.0088 g) were dissolved in hexylnorbornene (50 g, 0.28 mol) and triethoxysilylnorbornene (8.0 g, 0.031 mol). Lithium tetrakis(pentafluorophenyl)borate·2.5Et$_2$O (0.065 g) was dissolved in hexylnorbornene (50 g, 0.28 mol) and triethoxysilylnorbornene (8.0 g, 0.031 mol). Equal volumes of each solution were mixed together. The solution was allowed to thicken and was then poured onto a glass plate. The plate was placed into an oven at 65° C. for 10 min, then heated to 160° C. for one hour. A transparent film resulted. The film exhibited 2.1% weight loss at 320° C. by TGA (10° C./min). The film exhibited a glass transition temperature of 278° C. as determined by the tan δ peak in its DMA trace.

EXAMPLE 298

Palladium(II) acetate (0.0056 g) was in hexylnorbornene (50 g, 0.28 mol) and triethoxysilylnorbornene (8.0 g, 0.031 mol). Lithium tetrakis(pentafluorophenyl)borate·2.5Et$_2$O (0.065 g) and tricyclohexylphosphine (0.0088 g) were dissolved in hexylnorbornene (50 g, 0.28 mol) and triethoxysilylnorbornene (8.0 g, 0.031 mol). Equal volumes of each solution were mixed together. The solution was allowed to thicken and was then poured onto a glass plate. The plate was placed into an oven at 65° C. for 10 min, then heated to 160° C. for one hour. A transparent film resulted. The film exhibited 3.3% weight loss at 320° C. by TGA (10° C./min). The film exhibited a glass transition temperature of 274° C. as determined by the tan δ peak in its DMA trace.

EXAMPLE 299

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and tetraphenylbiphosphine (0.28 µmol) in methylene chloride. The mixture was heated to 65° C. for 18 hours. An immobile polymer puck resulted, suggesting high conversion.

EXAMPLE 300

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and 1,2-bis(diphenylphosphino)propane (0.28 µmol) in methylene chloride. The mixture was heated to 65° C. for 18 hours. The solution was poured into an excess of acetone. No significant amounts of polymer were obtained.

EXAMPLE 301

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and 1,2-bis(diphenylphosphino)propane (0.28 µmol) in methylene chloride. The mixture was heated to 65° C. for 18 hours. Addition of the mixture to an excess of acetone gave no polymer.

EXAMPLE 302

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and (R)-(+)-2,2'-bis(diphenylphosphino)-1,1'-binaphthyl (0.28 µmol) in methylene chloride. The mixture was heated to 65° C. for 18 hours. An immobile polymer puck resulted, suggesting high conversion.

EXAMPLE 303

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and 1,2-bis(dicyclohexylphosphino)ethane (0.28 µmol) in methylene chloride. The mixture was heated to 65° C. for 18 hours. A viscous solution resulted. The solution was diluted with toluene and poured into an excess of acetone to precipitate the polymer. The polymer was filtered, and dried under vacuum at 65° C. Yield 4 g (80%).

EXAMPLE 304

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and 1,2-bis(diphenylphosphino)methane (0.28 µmol) in methylene chloride. The mixture was heated to 65° C. for 18 hours. A viscous solution resulted. The solution was diluted with toluene and poured into an excess of acetone to precipitate the polymer. The polymer was filtered, and dried under vacuum at 65° C. Yield 1.6 g (32%).

EXAMPLE 305

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumtrifluoroacetate dimer (0.14 µmol) and 1,2-bis(dicyclohexylphosphino)methane (0.28 µmol) in methylene chloride. The mixture was heated to 65° C. for 18 hours. A viscous solution resulted. The solution was diluted with toluene and poured into an excess of acetone to precipitate the polymer. The polymer was filtered, and dried under vacuum at 65° C. Yield 2.9 g (58%).

EXAMPLE 306

To a mixture of butylnorbornene (5.0 g, 33 mmol) was added lithium tetrakis(penta-fluorophenyl)borate·2.5 Et$_2$O (1.2 mg, 0.0014 mmol). This mixture was diluted to 16 ml with cyclohexane. To this mixture was added 50 µL of a 2.8 mMol solution of (allyl)palladiumrifluoroacetate dimer (0.14 µmol) and 1,2-bis(diphenylphosphino)ethane (0.28 µmol) in methylene chloride. The mixture was heated to 65° C. for 18 hours. The solution was diluted with toluene and poured into an excess of acetone to precipitate the polymer.

The polymer was filtered, and dried under vacuum at 65° C. Yield 2.9 g (58%).

EXAMPLE 307

In a glove box, under an inert atmosphere (nitrogen), [(1,5-cyclooctadiene)Pd(Me)(Cl)] ($3.02 \times 10^{-7}$ mol) was placed into a 25 ml round bottom flask and dissolved in ca. 5 ml $CH_2Cl_2$. To this was added 1 equivalent of $PPh_3$. Then, 1 equivalent of sodium [tetrakis(bis(3,5-trifluoromethyl) phenyl)borate] was added to the solution. Norbornene (0.106 mol) was added, and the mixture was gently swirled. The flask was placed onto a stir plate. Polymerization was complete (the mixture solidified) within 2 minutes. Polymer product was obtained by diluting in methanol, then decanting off liquid and drying under reduced pressure at room temperature. Approximately 100% yield was obtained ($1.05 \times 10^6$ turnovers/hr). Molecular weight was not determined due to the insolubility of the product.

EXAMPLE 308

In a glove box, under an inert atmosphere (nitrogen), [(1,5-cyclooctadiene)Pd(Me)(Cl)] ($1.13 \times 10^{-7}$ mol) was placed into a 25 ml round bottom flask and dissolved in ca. 5 mL $CH_2Cl_2$. To this was added 1 equivalent of $PPh_3$. Then, 1 equivalent of sodium [tetrakis(bis(3,5-trifluoromethyl) phenyl)borate] was added to the solution. Dicyclopentadiene (0.106 mol) was added, and the mixture was gently swirled. The flask was placed onto a stir plate. Polymerization was complete (the mixture solidified) within 5 minutes. Polymer product was obtained by diluting in methanol, then decanting off liquid and drying under reduced pressure at room temperature. Approximately 100% yield was obtained. Molecular weight was not determined due to the insolubility of the product.

What is claimed is:

1. A polymer composition consisting essentially of polycyclic repeating units wherein at least a portion of said repeating units are represented by the formula:

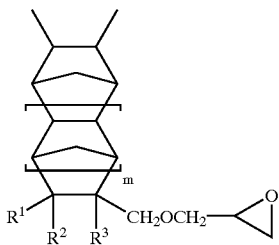

wherein m represents an integer from 0 to 5; $R^1$ to $R^3$ represents hydrogen, substituted and unsubstituted linear and branched $C_1$–$C_{10}$ alkyl, linear and branched $C_1$–$C_{10}$ haloalkyl, substituted and unsubstituted linear and branched $C_2$–$C_{10}$ alkenyl, linear and branched $C_2$–$C_{10}$ haloalkenyl, substituted and unsubstituted linear and branched $C_2$–$C_{10}$ alkynyl, substituted and unsubstituted $C_4$–$C_{12}$ cycloalkyl, substituted and unsubstituted $C_4$–$C_{12}$ halocycloalkyl, substituted and unsubstituted $C_4$–$C_{12}$ cycloalkenyl, substituted and unsubstituted $C_4$–$C_{12}$ halocycloalkenyl, substituted and unsubstituted $C_6$–$C_{12}$ aryl, substituted and unsubstituted $C_6$–$C_{12}$ haloaryl and substituted and unsubstituted $C_7$–$C_{24}$ aralkyl, $R^1$ and $R^2$ can be taken together to represent a $C_1$–$C_{10}$ alkylidenyl group, $-(CH_2)_nC(O)NH_2$, $-(CH_2)_nC(O)Cl$, $-(CH_2)_nC(O)OR^5$, $-(CH_2)_{2n}-C(O)OR^5$, $-(CH_2)_n-OR^5$, $-(CH_2)_n-OC(O)R^5$, $-(CH_2)_n-C(O)R^5$, $-(CH_2)_nSiR^5$, $-(CH_2)_nSi(OR^5)_3$, $-(CH_2)_nC(O)OR^6$, and the group:

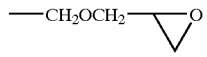

wherein n independently represents an integer from 0 to 10 and $R^5$ independently represents hydrogen, linear and branched $C_1$–$C_{10}$ alkyl, linear and branched, $C_2$–$C_{10}$ alkenyl, linear and branched $C_2$–$C_{10}$ alkynyl, $C_5$–$C_{12}$ cycloalkyl, $C_6$–$C_{14}$ aryl, and $C_7$–$C_{24}$ aralkyl; $R^6$ represents a radical selected from $-C(CH_3)_3$, $-Si(CH_3)_3$, $-CH(R^7)OCH_2CH_3$, $-CH(R^7)OC(CH_3)_3$ dicyclopropylmethyl, dimethylcyclopropylmethyl, or the following cyclic groups:

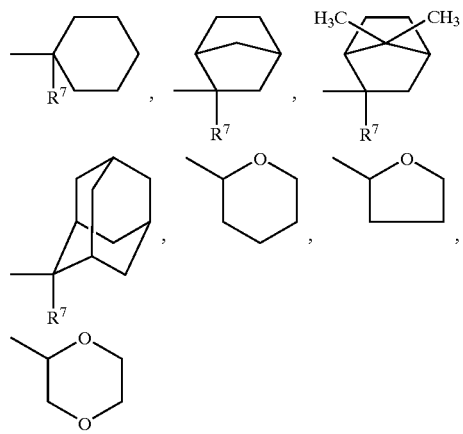

wherein $R^7$ represents hydrogen or a linear or branched ($C_1$–$C_5$) alkyl group.

2. The polymer composition of claim 1 wherein said polymer further comprises at least one repeating unit represented by the formula:

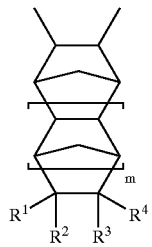

$R^1$ to $R^4$ independently represent hydrogen, substituted and unsubstituted linear and branched $C_1$–$C_{10}$ alkyl, linear and branched $C_1$–$C_{10}$ haloalkyl, substituted and unsubstituted linear and branched $C_2$–$C_{10}$ alkenyl, linear and branched $C_2$–$C_{10}$ haloalkenyl, substituted and unsubstituted linear and branched $C_2$–$C_{10}$ alkynyl, substituted and unsubstituted $C_4$–$C_{12}$ cycloalkyl, substituted and unsubstituted $C_4$–$C_{12}$ halocycloalkyl, substituted and unsubstituted $C_4$–$C_{12}$ cycloalkenyl, substituted and unsubstituted $C_4$–$C_{12}$ halocycloalkenyl, substituted and unsubstituted $C_6$–$C_{12}$ aryl, substituted and unsubstituted $C_6$–$C_{12}$ haloaryl and substituted and unsubstituted $C_7$–$C_{24}$ aralkyl, $R^1$ and $R^2$ or $R^3$ and $R^4$ can be taken together to represent a $C_1$–$C_{10}$ alkylidenyl group, $-(CH_2)_nC(O)NH_2$, $-(CH_2)_nC(O)Cl$, $-(CH_2)_nC(O)OR^5$, $-(CH_2)_n-C(O)OR^5$, $-(CH_2)_n-OR^5$, $-(CH_2)_n-OC(O)R^5$, $-(CH_2)_n-OC(O)OR^5$, $-(CH_2)_nSiR^5$, $-(CH_2)_nSi(OR^5)_3$, $-(CH_2)_nC(O)OR^6$, and the group:

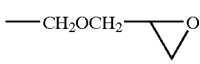

wherein n independently represents an integer from 0 to 10 and $R^5$ independently represents hydrogen, linear and branched $C_1$–$C_{10}$ alkyl, linear and branched, $C_2$–$C_{10}$ alkenyl, linear and branched $C_2$–$C_{10}$ alkynyl, $C_5$–$C_{12}$ cycloalkyl, $C_6$–$C_{14}$ aryl, and $C_7$–$C_{24}$ aralkyl; $R^6$ represents a radical selected from —C(CH$_3$)$_3$, —Si(CH$_3$)$_3$, —CH(R$^7$)OCH$_2$CH$_3$, —CH(R$^7$)OC(CH$_3$)$_3$, dicyclopropylmethyl, dimethylcyclopropylmethyl, or the following cyclic groups:

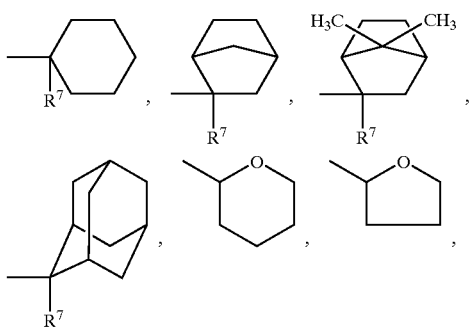

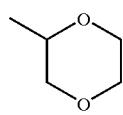

wherein $R^7$ represents hydrogen or a linear or branched ($C_1$–$C_5$) alkyl group; $R^1$ and $R^4$ together with the two ring carbon atoms to which they are attached can represent a substituted or unsubstituted cycloaliphatic group containing 4 to 30 ring carbon atoms, a substituted or unsubstituted aryl group containing 6 to 18 ring carbon atoms and combinations thereof; $R^1$ and $R^4$ can be taken together to form the divalent bridging group, —C(O)—Q—(O)C—, which when taken together with the two ring carbon atoms to which they are attached form a pentacyclic ring, wherein Q represents an oxygen atom or the group N(R$^8$), wherein $R^8$ is selected from hydrogen, halogen, linear and branched $C_1$–$C_{10}$ alkyl, and $C_6$–$C_{18}$ aryl.

* * * * *